(12) United States Patent
Yasui et al.

(10) Patent No.: US 8,794,219 B2
(45) Date of Patent: Aug. 5, 2014

(54) EGR CONTROL APPARATUS FOR INTERNAL COMBUSTION ENGINE

(75) Inventors: Yuji Yasui, Saitama-ken (JP); Eiji Hashimoto, Saitama-ken (JP); Hisao Haga, Saitama-ken (JP); Koichi Nakajima, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 378 days.

(21) Appl. No.: 13/116,567

(22) Filed: May 26, 2011

(65) Prior Publication Data

US 2011/0308503 A1    Dec. 22, 2011

(30) Foreign Application Priority Data

Jun. 18, 2010  (JP) ................................. 2010/139596

(51) Int. Cl.
*F02B 47/08*  (2006.01)
*F02M 25/07*  (2006.01)
(52) U.S. Cl.
USPC ................. 123/568.21; 123/568.11; 701/108; 60/605.2
(58) Field of Classification Search
USPC ............. 123/568.11, 568.12, 568.13, 568.16, 123/568.2, 568.21, 698; 701/108, 114; 60/285, 311, 599, 605.2
See application file for complete search history.

(56) References Cited

U.S. PATENT DOCUMENTS

| | | | | |
|---|---|---|---|---|
| 5,205,260 A | * | 4/1993 | Takahashi et al. | 123/494 |
| 5,845,627 A | * | 12/1998 | Olin et al. | 123/676 |
| 6,109,249 A | * | 8/2000 | Wild et al. | 123/568.21 |
| 6,820,599 B2 | * | 11/2004 | Kurtz et al. | 123/568.21 |
| 7,185,641 B2 | * | 3/2007 | Suzuki | 123/520 |
| 7,195,006 B2 | * | 3/2007 | Khair et al. | 123/568.12 |
| 7,367,188 B2 | * | 5/2008 | Barbe et al. | 60/605.2 |
| 7,380,400 B2 | * | 6/2008 | Barbe et al. | 60/605.2 |
| 7,398,649 B2 | * | 7/2008 | Bauer et al. | 60/605.2 |

(Continued)

FOREIGN PATENT DOCUMENTS

| | | |
|---|---|---|
| EP | 1 318 438 A2 | 6/2003 |
| JP | 2004-150319 A | 5/2004 |

(Continued)

OTHER PUBLICATIONS

Halder J et al, "Der neue 2,0-I-TDI-Motor von Volkswagen für niedrigste Abgasgrenzwerte—Teil 1", MTZ Motortechnische Zeitschrift, Vieweg Verlag, Wiesbaden, May 1, 2008, pp. 386-395, vol. 69, No. 5, , DE.

*Primary Examiner* — Thomas Moulis
*Assistant Examiner* — Joseph Dallo
(74) *Attorney, Agent, or Firm* — Arent Fox LLP

(57) ABSTRACT

An EGR control apparatus for an internal combustion engine, which is capable of properly controlling an inert gas amount of two types of EGR gas supplied to cylinders of the engine via two paths different from each other, thereby making it possible to ensure a stable combustion state, reduced exhaust emissions, and improve operability. The EGR control apparatus includes low-pressure and high-pressure EGR devices, and an ECU. The ECU controls the low-pressure and high-pressure EGR gas amounts according to engine speed and demanded torque, and when a combination of engine speed and demanded torque is in a predetermined region, the low-pressure and high-pressure EGR gas amounts are controlled such that inert gas in low-pressure EGR gas exceeds in amount inert gas in high-pressure EGR gas, and the former more exceeds the latter as engine speed is higher or demanded torque is larger.

4 Claims, 25 Drawing Sheets

(56) References Cited

U.S. PATENT DOCUMENTS

| | | | |
|---|---|---|---|
| 7,493,762 B2* | 2/2009 | Barbe et al. | 60/605.2 |
| 8,005,605 B2* | 8/2011 | Yasui | 701/109 |
| 2007/0079614 A1 | 4/2007 | Barbe et al. | |
| 2007/0246028 A1 | 10/2007 | Fujita et al. | |
| 2008/0000230 A1* | 1/2008 | Strauser | 60/605.2 |
| 2011/0088674 A1* | 4/2011 | Shutty et al. | 123/568.21 |

FOREIGN PATENT DOCUMENTS

| | | |
|---|---|---|
| JP | 2007-315371 A | 12/2007 |
| JP | 2007-321658 A | 12/2007 |
| JP | 2008-057449 A | 3/2008 |
| JP | 2009-002184 A | 1/2009 |
| WO | WO 2008/001194 A1 | 1/2008 |

* cited by examiner

EGR CONTROL APPARATUS FOR INTERNAL COMBUSTION ENGINE

BACKGROUND OF THE INVENTION

1. Field of the Invention

The present invention relates to an EGR control apparatus for an internal combustion engine, which controls the amounts of two types of EGR gas in the engine in which the two types of EGR gas are supplied to cylinders thereof via two paths different from each other.

2. Description of the Related Art

Conventionally, as an EGR control apparatus for an internal combustion engine, one disclosed in Japanese Laid-Open Patent Publication (Kokai) No. 2004-150319 is known. This engine is a diesel engine, and is provided with a turbocharger, a low-pressure EGR device, a high-pressure EGR device, and so forth. The low-pressure EGR device recirculates part of exhaust gases from an exhaust passage on the downstream side of a turbine of the turbocharger and a catalytic device into an intake passage on the upstream side of a compressor of the turbocharger, as low-pressure EGR gas, while the high-pressure EGR device recirculates part of exhaust gases from the exhaust passage on the upstream side of the turbine of the turbocharger into the intake passage on the downstream side of the compressor of the turbocharger, as high-pressure EGR gas.

In the EGR control apparatus, the low-pressure EGR device and the high-pressure EGR device are driven according to the operating conditions of the engine, to thereby execute EGR control for controlling the respective amounts of the low-pressure EGR gas and the high-pressure EGR gas. Specifically, the EGR control is performed such that in a low-to-medium speed and low-to-medium load region, the high-pressure EGR gas is mainly recirculated, and the insufficient amount thereof is supplemented with the low-pressure EGR gas, and that in a low-to-medium speed and high-load region, only the low-pressure EGR gas is recirculated. Further, in a high-speed and low-to-high-load region, the EGR control is performed such that only the high-pressure EGR gas is recirculated.

In the case of an engine driven for lean burn operation, such as the diesel engine disclosed in Japanese Laid-Open Patent Publication (Kokai) No. 2004-150319, not only inert gas but also fresh air are contained in the EGR gas. However, when the amount of the EGR gas is controlled without taking the above fact into account, as in the EGR control apparatus disclosed in Japanese Laid-Open Patent Publication (Kokai) No. 2004-150319, the amount of inert gas supplied to the cylinders becomes short or excessive, which can make the combustion state of the engine unstable or result in increased exhaust emissions. In that case, operability is degraded.

SUMMARY OF THE INVENTION

It is an object of the present invention to provide an EGR control apparatus for an internal combustion engine, which is capable of properly controlling an inert gas amount of two types of EGR gas supplied to cylinders of the engine via two paths different from each other, thereby making it possible to ensure a stable combustion state and reduced exhaust emissions, and improve operability.

To attain the above object, in a first aspect of the present invention, there is provided an EGR control apparatus for an internal combustion engine, in which a first EGR device supplies part of burned gases to cylinders as a first EGR gas via an intake passage, and a second EGR device supplies another part of the burned gases to cylinders as a second EGR gas via a path shorter than a path of the first EGR device, comprising engine speed-detecting means for detecting engine speed which is rotational speed of the engine, load parameter-detecting means for detecting a load parameter representative of load on the engine, and EGR control means for controlling an amount of the first EGR gas and an amount of the second EGR gas via the first EGR device and the second EGR device, respectively, according to the detected engine speed and the detected load parameter, wherein the EGR control means controls the amount of the first EGR gas and the amount of the second EGR gas such that when a combination of the load represented by the load parameter and the engine speed is in a predetermined region, a first inert gas amount which is an amount of inert gas in the first EGR gas supplied to the cylinders exceeds a second inert gas amount which is an amount of inert gas in the second EGR gas supplied to the cylinders, and the first inert gas amount more exceeds the second inert gas amount as the engine speed is higher or the load represented by the load parameter is larger.

With the configuration of the EGR control apparatus according to the first aspect of the present invention, the first EGR gas amount and the second EGR gas amount are controlled according to the detected engine speed and detected load parameter, via the first EGR device and the second EGR device, respectively. In this case, the second EGR gas is supplied to the cylinders by the second EGR device via a shorter path than the first EGR gas is supplied to the same by the first EGR device, and hence the second EGR gas reaches the cylinders in a higher-temperature state than the first EGR gas does. In other words, the first EGR gas reaches the cylinders in a lower-temperature state than the second EGR gas does.

In contrast, according to this EGR control apparatus, the first EGR gas amount and the second EGR gas amount are controlled such that when the combination of the load represented by the load parameter and the engine speed is in the predetermined region, the first inert gas amount which is the amount of inert gas in the first EGR gas supplied to the cylinders exceeds the second inert gas amount which is the amount of inert gas in the second EGR gas supplied to the cylinders. Therefore, if the predetermined region is set to such a region that a large amount of low-temperature inert gas is required so as to lower the in-cylinder gas temperature or the compression end temperature, e.g. a region of high engine speed and high load, it is possible to supply, in such a region, a large amount of a lower-temperature one of the first inert gas and the second inert gas to the cylinders, whereby it is possible to lower the in-cylinder gas temperature and the compression end temperature.

In addition, the first EGR gas amount and the second EGR gas amount are controlled such that as the engine speed is higher or the load represented by the load parameter is larger, the first inert gas amount more exceeds the second inert gas amount. Therefore, as the degree of demand of lower-temperature inert gas is higher because of the engine speed being higher or the load being larger, it is possible to appropriately supply a larger amount of low-temperature inert gas to the cylinders in accordance therewith. Further, under a high-engine speed condition or a high-load condition, the amount of intake air to the cylinders increases and time taken for gases in the intake passage to be conveyed to the cylinders is reduced, and hence it is possible to speedily supply the first inert gas and the second inert gas to the cylinders. With the above configuration, it is possible to appropriately control the amount of inert gas in the EGR gas supplied to the cylinders according to the degree of demand of low-temperature inert gas. This makes it possible to secure a stable combustion state, reduce exhaust emissions, and improve operability (throughout the specification, "detection" as in "detection of the engine speed" and "detection of the load parameter" is by no means limited to direct detection of these parameters, but includes calculation of values thereof, and "supply of part of burned gases to the cylinders via a short path" includes causing part of burned gases to remain in combustion chambers of the cylinders without discharging the part out of the combustion chambers, and "inert gas amount" and "EGR amount" includes a flow rate of inert gas and a flow rate of EGR gas, respectively.)

To attain the above object, in a second aspect of the present invention, there is provided an EGR control apparatus for an internal combustion engine, in which a first EGR device supplies part of burned gases to cylinders as a first EGR gas via an intake passage, and a second EGR device supplies another part of the burned gases to cylinders as a second EGR gas via a path shorter than a path of the first EGR device, comprising first EGR control input-calculating means for calculating a first EGR control input for controlling the first EGR device, using a predetermined first feedback control algorithm, such that a first difference which is a difference between an amount of inert gas in the first EGR gas and a predetermined first target value converges to 0, first EGR control means for controlling the first EGR device using the calculated first EGR control input, second EGR control input-calculating means for calculating a second EGR control input for controlling the second EGR device, using a predetermined second feedback control algorithm, such that a second difference which is a difference between a total amount of inert gases in the first EGR gas and the second EGR gas which are supplied to the cylinders and a predetermined second target value converges to 0, and second EGR control means for controlling the second EGR device using the calculated second EGR control input, wherein with the predetermined first feedback control algorithm and the predetermined second feedback control algorithm, a rate of convergence of the first difference to 0 and a rate of convergence of the second difference to 0 are set such that the rate of convergence of the second difference to 0 is higher than the rate of convergence of the first difference to 0.

With the configuration of this EGR control apparatus according to the second aspect of the present invention, using the predetermined first feedback control algorithm, the first EGR control amount for controlling the first EGR device is calculated such that the first difference which is the difference between the amount of inert gas in the first EGR gas and the predetermined first target amount converges to 0, and the first EGR device is controlled using the calculated first EGR control input. Further, using the predetermined second feedback control algorithm, the second EGR control input for controlling the second EGR device is calculated such that the second difference which is the difference between the total amount of inert gases in the first EGR gas and the second EGR gas supplied to the cylinders converges to 0, and using the calculated second EGR control input, the second EGR device is controlled. Further, with the predetermined first feedback control algorithm and the predetermined second feedback control algorithm, the rate of convergence of the first difference to 0 and that of convergence of the second difference to 0 are set such that the rate of convergence of the second difference to 0 is higher than the rate of convergence of the first difference to 0.

The second EGR device supplies the second EGR gas to the cylinders via a shorter path than the first EGR device supplies the first EGR gas to the cylinders, and has characteristics of shorter dead time and higher responsiveness than the first EGR device. Therefore, even when the rate of convergence of the second difference to 0 is set to be higher than the rate of convergence of the first difference to 0, the first EGR device and the second EGR device can positively realize such convergence rates because of the difference in responsiveness therebetween, whereby it is possible to prevent the control of the first EGR device by the first EGR control means and the control of the second EGR device by the second EGR control means from interfering with each other. In addition to this, it is possible for the second EGR device, which is high in responsiveness, to accurately supply an amount of inert gas which cannot be secured by the first EGR device alone, which is low in responsiveness. For the reasons described above, it is possible to secure a stable combustion state and reduced exhaust emission, and improve operability.

Preferably, the predetermined first feedback control algorithm and the predetermined second feedback control algorithm are predetermined response-designating control algorithms.

With the configuration of the preferred embodiment, using the predetermined response-designating control algorithms, the first EGR control input and the second EGR control input are calculated, respectively, such that the first difference and the second difference converge to 0. Therefore, it is possible to cause the first difference and the second difference to converge to 0 by exponential behaviors. This makes it possible to further improve the stability of the combustion state, further reduce exhaust emissions, and further improve operability.

The above and other objects, features, and advantages of the present invention will become more apparent from the following detailed description taken in conjunction with the accompanying drawings.

DETAILED DESCRIPTION OF PREFERRED EMBODIMENTS

Figure 1:
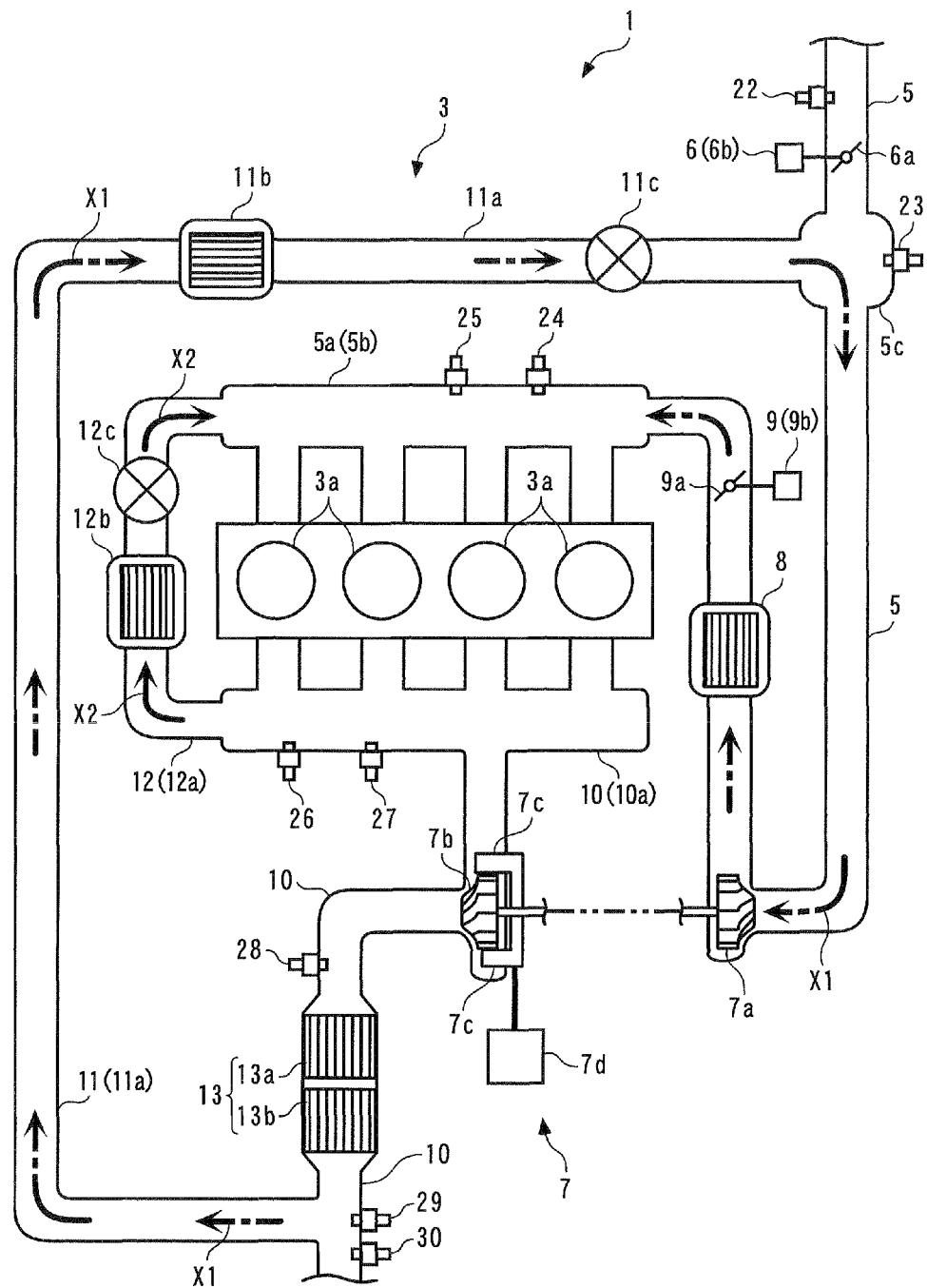
FIG. 1 is a schematic diagram of an EGR control apparatus according to a first embodiment of the present invention and an internal combustion engine to which the EGR control apparatus is applied.

The invention will now be described in detail with reference to the drawings showing preferred embodiments thereof. Referring to FIG. 2, an EGR control apparatus 1 for an internal combustion engine, according to a first embodiment of the present invention, includes an ECU 2. As will be described hereinafter, the ECU 2 controls the internal combustion engine (hereinafter simply referred to as "the engine") 3 shown in FIG. 1.

The engine 3 is a diesel engine that is installed on a vehicle, not shown, as a motive power source. The engine 3 is equipped with four cylinders 3a and fuel injection valves 4 (only one of which is shown in FIG. 2) provided for the respective cylinders 3a. The fuel injection valves 4 are electrically connected to the ECU 2, and the opening and closing timing of each fuel injection valve 4 is controlled by a control input signal from the ECU 2, whereby the fuel injection amount and fuel injection timing of the fuel injection valve 4 are controlled.

The engine 3 is provided with a crank angle sensor 20 and a coolant temperature sensor 21. The crank angle sensor 20 is formed by a magnet rotor and an MRE pickup, and delivers a CRK signal, which is a pulse signal, to the ECU 2 along with rotation of a crankshaft, not shown. Each pulse of the CRK signal is generated whenever the crankshaft rotates through a predetermined crank angle (e.g. 2°). The ECU 2 calculates a rotational speed NE of the engine 3 (hereinafter referred to as the "engine speed NE") based on the CRK signal. In the present embodiment, the crank angle sensor 20 corresponds to engine speed-detecting means and load parameter-detecting means.

Further, the coolant temperature sensor 21 is implemented e.g. by a thermistor, and detects an engine coolant temperature TW, which is the temperature of engine coolant circulating through a cylinder block of the engine 3 to deliver a signal indicative of the sensed engine coolant temperature TW to the ECU 2.

On the other hand, an air flow sensor 22, an intake shutter mechanism 6, an intake pressure sensor 23, a turbocharger 7, an intercooler 8, a high-pressure intake shutter mechanism 9, an intake chamber pressure sensor 24, and an intake chamber temperature sensor 25 are provided at respective locations of an intake passage 5 of the engine 3 from upstream to downstream in the mentioned order.

The intake shutter mechanism 6 includes an intake shutter 6a, an IS actuator 6b for driving the intake shutter 6a, and so forth. The intake shutter 6a is pivotally disposed in an intermediate portion of the intake passage 5 such that the degree of opening thereof is changed by the pivotal motion thereof to thereby change the flow rate of air passing through the intake shutter 6a. The IS actuator 6b is formed by combining a motor (not shown), and a reduction gear mechanism (not shown), and is electrically connected to the ECU 2. The ECU 2 controls a degree αin of opening of the intake shutter 6a (hereinafter referred to as the "intake shutter opening αin") via the IS actuator 6b.

Further, the air flow sensor 22 is formed by a hot-wire air flow meter, and detects a flow rate dGafm of fresh air (hereinafter referred to as the "fresh air flow rate dGafm") passing through the intake shutter 6a, to deliver a signal indicative of the detected fresh air flow rate dGafm to the ECU 2. The ECU 2 calculates the fresh air flow rate dGafm based on the detection signal output from the air flow sensor 22.

Furthermore, the intake pressure sensor 23 is implemented e.g. by a semiconductor pressure sensor, and detects a pressure Pin within the intake passage 5 on the upstream side of the intake shutter 6a (hereinafter referred to as the "intake pressure Pin"), to deliver a signal indicative of the detected intake pressure Pin to the ECU 2. This intake pressure Pin is detected as an absolute pressure.

On the other hand, the turbocharger 7 comprises a compressor blade 7a disposed in the intake passage 5 at a location downstream of the intake shutter 6a, a turbine blade 7b disposed in an intermediate portion of an exhaust passage 10, for rotating in unison with the compressor blade 7a, a plurality of variable vanes 7c (only two of which are shown), and a vane actuator 7d for actuating the variable vanes 7c.

In the turbocharger 7, as the turbine blade 7b is driven for rotation by exhaust gases flowing through the exhaust passage 10, the compressor blade 7a integrally formed with the turbine blade 7b rotates, whereby air within the intake passage 5 is pressurized. That is, a supercharging operation is executed.

Further, the variable vanes 7c are for varying boost pressure generated by the turbocharger 7, and are pivotally mounted on a wall of a portion of a housing, where the turbine blade 7b is accommodated. The variable vanes 7c are mechanically connected to the vane actuator 7d connected to the ECU 2. The ECU 2 changes a degree $\alpha tb$ of opening of the variable vanes 7c (hereinafter referred to as the "vane opening $\alpha tb$") via the vane actuator 7d to change the amount of exhaust gases blown to the turbine blade 7b, whereby the rotational speed of the turbine blade 7b, that is, the rotational speed of the compressor blade 7a, is changed to thereby control the boost pressure.

The intercooler 8 is of a water cooling type. When intake air passes through the intercooler 8, the intercooler 8 cools the intake air the temperature of which has been raised by the supercharging operation by the turbocharger 7.

Further, the high-pressure intake shutter mechanism 9 is configured similarly to the above-described intake shutter mechanism 6, and includes a high-pressure intake shutter 9a and a high-pressure IS actuator 9b for driving the high-pressure intake shutter 9a. In the high-pressure intake shutter mechanism 9, the high-pressure IS actuator 9b is driven by a control input signal from the ECU 2, whereby the degree of opening of the high-pressure intake shutter 9a is controlled.

In the control of the degree of opening of the high-pressure intake shutter 9a, normally, the high-pressure intake shutter 9a is held in a fully-open state, and only when predetermined operating conditions, described hereinafter, are satisfied, the degree of opening of the high-pressure intake shutter 9a is controlled to a slightly more closed state than the fully-open state. In the following description, the degree of opening of the high-pressure intake shutter 9a is referred to as the "high-pressure shutter opening $\alpha inHP$".

On the other hand, the intake chamber pressure sensor 24 is implemented e.g. by a semiconductor pressure sensor, and detects a pressure Pch within an intake chamber 5b of an intake manifold 5a (hereinafter referred to as the "intake chamber pressure Pch"), to deliver a signal indicative of the detected intake chamber pressure Pch to the ECU 2. This intake chamber pressure Pch is detected as an absolute pressure.

Further, the intake chamber temperature sensor 25 detects a temperature Tch within the intake chamber 5b of the intake manifold 5a (hereinafter referred to as the "intake chamber temperature Tch"), and delivers a signal indicative of the detected intake chamber temperature Tch to the ECU 2. This intake chamber temperature Tch is detected as an absolute temperature.

On the other hand, an exhaust manifold pressure sensor 26, an exhaust manifold temperature sensor 27, the above-described turbine blade 7b, a LAF sensor 28, a catalytic device 13, an exhaust pressure sensor 29, and an exhaust temperature sensor 30 are provided at respective locations of the exhaust passage 10 of the engine 3 from upstream to downstream in the mentioned order.

The exhaust manifold pressure sensor 26 is implemented e.g. by a semiconductor pressure sensor, and detects a pressure Pem within an exhaust manifold 10a (hereinafter referred to as the "exhaust manifold pressure Pem"), to deliver a signal indicative of the detected exhaust manifold pressure Pem to the ECU 2. This exhaust manifold pressure Pem is detected as an absolute pressure.

Further, the exhaust manifold temperature sensor 27 detects a temperature Tem within the exhaust manifold 10a (hereinafter referred to as the "exhaust manifold temperature Tem"), and delivers a signal indicative of the detected exhaust manifold temperature Tem to the ECU 2. This exhaust manifold temperature Tem is detected as an absolute temperature.

Furthermore, the LAF sensor 28 comprises zirconia and platinum electrodes, and linearly detects the concentration of oxygen in exhaust gases flowing through the exhaust passage 10, in a broad air-fuel ratio range from a rich region richer than a stoichiometric air-fuel ratio to a very lean region, to deliver a signal indicative of the sensed oxygen concentration to the ECU 2. The ECU 2 calculates a detected equivalent ratio $\phi$ as a detected value of the equivalent ratio of exhaust gases, based on the value of the detection signal from the LAF sensor 28.

The catalytic device 13 is for purifying exhaust gases flowing through the exhaust passage 10, and is formed by combining a DOC (diesel oxidation catalyst) 13a and a CSF (catalyzed soot filter) 13b.

Further, the exhaust pressure sensor 29 is disposed in the exhaust passage 10 at a location downstream of the catalytic device 13, and detects a pressure Pex of exhaust gases having passed through the catalytic device 13 (hereinafter referred to as the "exhaust pressure Pex"), to deliver a signal indicative of the sensed exhaust pressure Pex to the ECU 2. This exhaust pressure Pex is detected as an absolute pressure.

Further, similarly to the exhaust pressure sensor 29, the exhaust temperature sensor 30 as well is disposed in the exhaust passage 10 at a location downstream of the catalytic device 13, and detects a temperature Tex of exhaust gases having passed through the catalytic device 13 (hereinafter referred to as the "exhaust temperature Tex"), to deliver a signal indicative of the sensed exhaust temperature Tex to the ECU 2. This exhaust temperature Tex is detected as an absolute temperature.

Furthermore, the engine 3 is provided with a low-pressure EGR device 11 and a high-pressure EGR device 12. The low-pressure EGR device 11 (first EGR device) is for recirculating part of exhaust gases from the exhaust passage 10 into the intake passage 5, and comprises a low-pressure EGR passage 11a connected between the intake passage 5 and the exhaust passage 10, a low-pressure EGR cooler 11b for cooling recirculated gases flowing through the low-pressure EGR passage 11a (hereinafter referred to as the "low-pressure EGR gas"), and a low-pressure EGR control valve 11c for opening and closing the low-pressure EGR passage 11a. One end of the low-pressure EGR passage 11a opens into a portion of the exhaust passage 10 at a location downstream of the catalytic device 13, and the other end thereof opens into a connecting portion 5c of the intake passage 5 between the intake shutter 6a and the compressor blade 7a.

The low-pressure EGR control valve 11c is implemented by a linear solenoid valve the degree of opening of which is linearly varied between a maximum value and a minimum value thereof, and is electrically connected to the ECU 2. The ECU 2 changes the degree of opening of the low-pressure EGR control valve 11c to thereby control the amount of the recirculated low-pressure EGR gas, that is, the low-pressure EGR gas amount.

Figure 2:
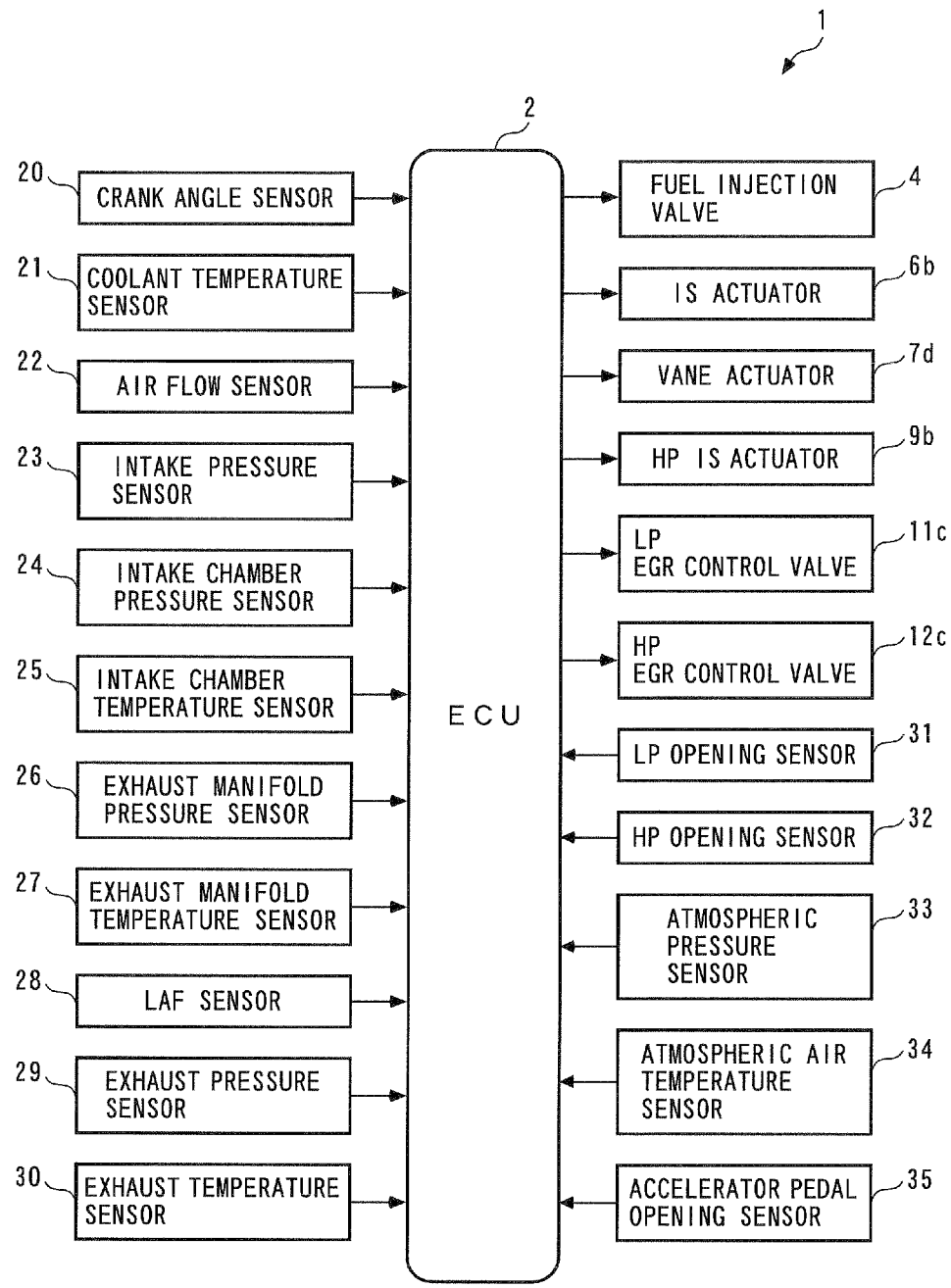
FIG. 2 is an electrical block diagram of the EGR control apparatus.

With the above-described arrangement, in the low-pressure EGR device 11, the low-pressure EGR gas flows into the low-pressure EGR passage 11a from the portion of the exhaust passage 10 at the location downstream of the catalytic device 13, flows in a direction indicated by an arrow X1 in FIG. 1, passes through the low-pressure EGR cooler 11b and the low-pressure EGR control valve 11c, and then flows into the connecting portion 5c of the intake passage 5. Subsequently, after passing through the compressor blade 7a and the intercooler 8 together with fresh air, the low-pressure EGR gas flows into the respective cylinders 3a via the intake manifold 5a.

On the other hand, similarly to the low-pressure EGR device 11, the high-pressure EGR device 12 (second EGR device) as well is for recirculating part of exhaust gases from the exhaust passage 10 into the intake passage 5, and comprises a high-pressure EGR passage 12a connected between the intake passage 5 and the exhaust passage 10, a high-pressure EGR cooler 12b for cooling recirculated gases flowing through the high-pressure EGR passage 12a (hereinafter referred to as the "high-pressure EGR gas"), and a high-pressure EGR control valve 12c for opening and closing the high-pressure EGR passage 12a. One end of the high-pressure EGR passage 12a opens into the exhaust manifold 10a of the exhaust passage 10, and the other end thereof opens into the intake manifold 5a of the intake passage 5.

The high-pressure EGR control valve 12c is implemented by a linear solenoid valve the degree of opening of which is linearly varied between a maximum value and a minimum value thereof, and is electrically connected to the ECU 2. The ECU 2 changes the degree of opening of the high-pressure EGR control valve 12c to thereby control the amount of the recirculated high-pressure EGR gas, that is, the high-pressure EGR gas amount.

With the above-described arrangement, in the high-pressure EGR device 12, the high-pressure EGR gas flows into the high-pressure EGR passage 12a from the exhaust manifold 10a, flows in a direction indicated by an arrow X2 in FIG. 1, passes through the high-pressure EGR cooler 12b and the high-pressure EGR control valve 12c, and then flows into the intake manifold 5a. Subsequently, the high-pressure EGR gas flows into the respective cylinders 3a via the intake manifold 5a together with the low-pressure EGR gas and fresh air.

Now, a path of the low-pressure EGR device 11, via which the low-pressure EGR gas flows into the cylinders 3a, is longer than a path of the high-pressure EGR device 12, via which the high-pressure EGR gas flows into the cylinders 3a, so that the low-pressure EGR gas takes a longer time period to flow into the cylinders 3a than the high-pressure EGR gas. That is, the low-pressure EGR device 11 has characteristics that response delay and dead time thereof are larger than those of the high-pressure EGR device 12. Therefore, in an EGR control process, described hereinafter, the high-pressure EGR device 12 is controlled such that the response delay characteristic and the dead time characteristic of the low-pressure EGR device 11 are compensated for by taking the characteristics of the two EGR devices 11 and 12 into account.

On the other hand, referring to FIG. 2, a low-pressure opening sensor 31, a high-pressure opening sensor 32, an atmospheric pressure sensor 33, an atmospheric air temperature sensor 34, and an accelerator pedal opening sensor 35 are connected to the ECU 2. The low-pressure opening sensor 31 detects a degree $\alpha LP$ of opening of the low-pressure EGR control valve 11c (hereinafter referred to as the "low-pressure opening $\alpha LP$"), and delivers a signal indicative of the sensed low-pressure opening $\alpha LP$ to the ECU 2. The high-pressure opening sensor 32 detects a degree $\alpha HP$ of opening of the high-pressure EGR control valve 12c (hereinafter referred to as the "high-pressure opening $\alpha HP$"), and delivers a signal indicative of the sensed high-pressure opening $\alpha HP$ to the ECU 2.

Further, the atmospheric pressure sensor 33 is implemented e.g. by a semiconductor pressure sensor, and detects an atmospheric pressure PA, and delivers a signal indicative of the detected atmospheric pressure PA to the ECU 2. Furthermore, the atmospheric air temperature sensor 34 detects an atmospheric air temperature TA, and delivers a signal indicative of the detected atmospheric air temperature TA to the ECU 2. The accelerator pedal opening sensor 35 detects a stepped-on amount AP of an accelerator pedal, not shown, (hereinafter referred to as the "accelerator pedal opening AP"), and delivers a signal indicative of the sensed accelerator pedal opening AP to the ECU 2. In the present embodiment, the accelerator pedal opening sensor 35 corresponds to the load parameter-detecting means.

The ECU 2 is implemented by a microcomputer comprising a CPU, a RAM, a ROM, and an I/O interface (none of which are specifically shown). The ECU 2 determines operating conditions of the engine 3 based on the detection signals from the aforementioned sensors 20 to 35, and carries out control processes including the EGR control process, as described hereinafter, based on the determined operating conditions.

In the present embodiment, the ECU 2 corresponds to engine speed-detecting means, the load parameter-detecting means, EGR control means, first EGR control input-calculating means, first EGR control means, second EGR control input-calculating means, and second EGR control means.

Next, a description will be given of the EGR control apparatus 1. The EGR control apparatus 1 is for controlling the low-pressure opening $\alpha LP$ and the high-pressure opening $\alpha HP$, i.e. for executing the EGR control, by a control method, described hereinafter. In the case of a diesel engine, such as the engine 3 according to the present embodiment, which is driven for lean burn operation, EGR gas normally contains not only inert gas but also fresh air. In contrast, it is generally known that when the amount of NOx emitted from the engine 3 into the exhaust passages 10 (hereinafter referred to as the "NOx emission amount") is taken into account, the NOx emission amount has a higher correlation with an inert gas ratio (ratio of the amount of inert gas to that of intake air) or an inert gas amount than with an EGR rate or an EGR amount.

Therefore, in an EGR control method according to the present embodiment, to reduce the NOx emission amount for reducing exhaust emissions, a method is employed in which inert gas in the EGR gas is taken in account. In the following description, the inert gas in the low-pressure EGR gas is referred to as the "low-pressure inert gas", and the inert gas in the high-pressure EGR gas is referred to as the "high-pressure inert gas".

Figure 3:
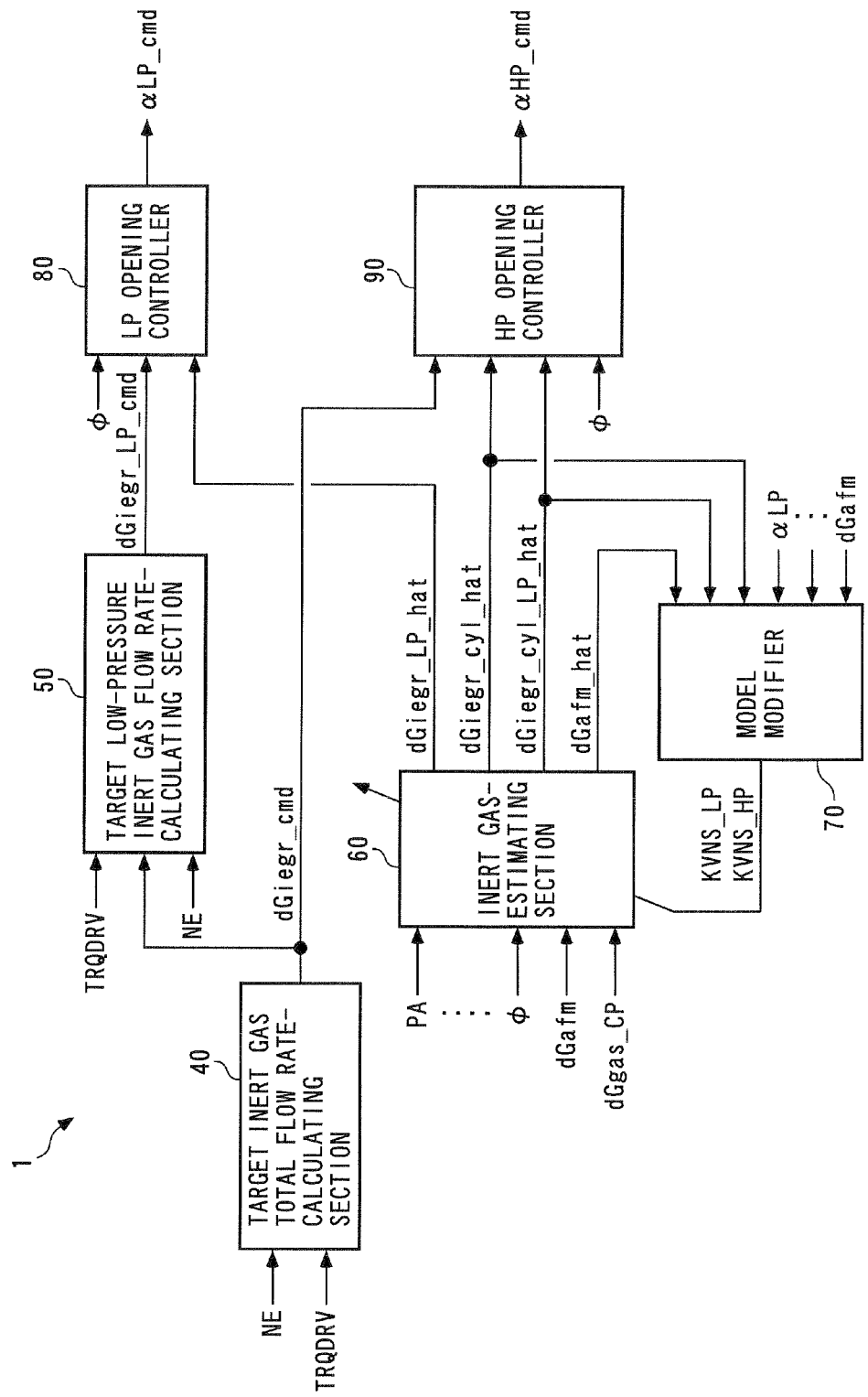
FIG. 3 is a functional block diagram of the EGR control apparatus.

Referring to FIG. 3, the EGR control apparatus 1 includes, a target inert gas total flow rate-calculating section 40, a target low-pressure inert gas flow rate-calculating section 50, an inert gas-estimating section 60, a model modifier 70, a low-pressure opening controller 80, and a high-pressure opening controller 90, all of which are implemented by the ECU 2.

First, the target inert gas total flow rate-calculating section 40 calculates a target inert gas total flow rate dGiegr_cmd. The target inert gas total flow rate dGiegr_cmd is a value which serves as the target of the total flow rate of inert gas supplied to the cylinders 3a by the two EGR devices 11 and 12, and is calculated by searching a map shown in FIG. 4 according to the engine speed NE and a demanded torque TRQDRV. The demanded torque TRQDRV represents a torque demanded of the engine 3 by a driver, that is, operating load, and is calculated by searching a map, not shown, according to the engine speed NE and the accelerator pedal opening AP.

Figure 4:
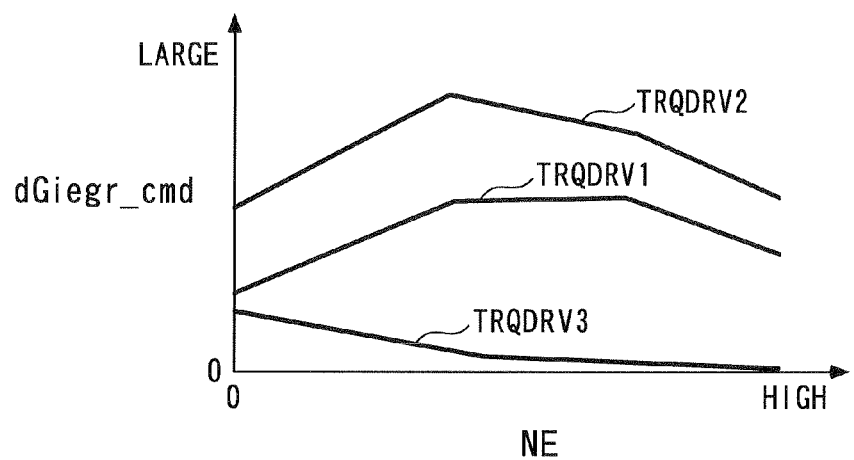
FIG. 4 is a view showing an example of a map for use in calculating a target inert gas total flow rate dGiegr_cmd.

Further, in FIG. 4, TRQDRV 1 to TRQDRV 3 represent predetermined values of the demanded torque TRQDRV set such that TRQDRV1<TRQDRV2<TRQDRV3 holds. This also applies to the description stated hereinafter. As shown in FIG. 4, in a high-load region (i.e. region where the demanded torque TRQDRV is large), the target inert gas total flow rate dGiegr_cmd is set to a smaller value than in a low-to-medium load region with a view to securing the demanded torque TRQDRV. In the present embodiment, the demanded torque TRQDRV corresponds to a load parameter.

Further, the target low-pressure inert gas flow rate-calculating section 50 calculates a target low-pressure inert gas flow rate dGiegr_LP_cmd by the following equation (1). In the present embodiment, the target low-pressure inert gas flow rate dGiegr_LP_cmd corresponds to a predetermined first target value.

$$dGiegr\_LP\_cmd(k)=dGiegr\_cmd(k)\cdot Riegr\_LP(k) \quad (1)$$

Figure 5:
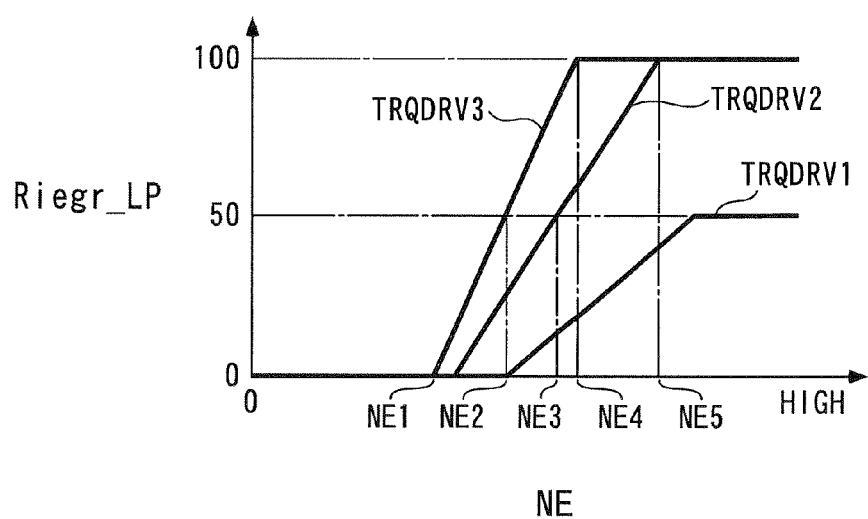
FIG. 5 is a view showing an example of a map for use in calculating a low-pressure-side distribution ratio Riegr_LP.

In the above equation (1), Riegr_LP represents a low-pressure-side distribution ratio Riegr_LP (in units of %), i.e. the distribution ratio of the low-pressure inert gas flow rate to the inert gas total flow rate. The low-pressure-side distribution ratio Riegr_LP is calculated by searching a map shown in FIG. 5 according to the engine speed NE and the demanded torque TRQDRV. In FIG. 5, NE1 to NE5 represent predetermined values of the engine speed NE, and are set such that NE1<NE2<NE3<NE4<NE5 holds.

As shown in FIG. 5, the low-pressure-side distribution ratio Riegr_LP is set to 0% irrespective of the demanded torque TRQDRV, i.e. the magnitude of load, in the low-engine speed region of NE≤NE1. This is because in the low-engine speed region, during deceleration of the vehicle, there is a fear that the control for compensating for the response delay characteristic and the dead time characteristic of the low-pressure EGR device 11 becomes late i.e. untimely, making the inert gas amount in the cylinders 3a too large. To avoid this inconvenience, the low-pressure-side distribution ratio Riegr_LP is set to 0% to thereby stop supply of the low-pressure inert gas to the cylinders 3a. On the other hand, in high-load and high-engine speed regions (a region of NE≥NE5 and TRQDRV≥TRQDRV2 and a region of NE≥NE4 and TRQDRV≥TRQDRV3), in order to lower gas temperature in the cylinders 3a and temperature at a TDC position to thereby reduce the amount of NOx emissions, the low-pressure-side distribution ratio Riegr_LP is set to 100% so as to supply a large amount of low-pressure inert gas to the cylinders 3a.

In addition, when the combination of the engine speed NE and the demanded torque TRQDRV is in a predetermined region, the low-pressure-side distribution ratio Riegr_LP is set such that Riegr_LP>50 holds and Riegr_LP is larger as the engine speed NE is higher or as the demanded torque TRQDRV is larger. In this case, as shown in FIG. 5, e.g. a region of TRQDRV=TRQDRV3 and NE2<NE≤NE4, a region of TRQDRV2≤TRQDRV≤TRQDRV3 and NE3<NE≤NE4, and a region of TRQDRV=TRQDRV2 and NE3<NE≤NE5 correspond to the predetermined region. In short, the predetermined region is a region in which the engine load is medium or higher and the engine speed is medium or higher.

In the above equation (1), data with a symbol (k) indicates that it is discrete data sampled or calculated at a predetermined control period ΔT (e.g. 10 msec in the present embodiment). The symbol k (k is a positive integer) indicates a position in the sequence of sampling or calculating cycles of respective discrete data. For example, the symbol k indicates that discrete data therewith is a value sampled or calculated in the current control timing, and a symbol k−1 indicates that discrete data therewith is a value sampled or calculated in the immediately preceding control timing. This also applies to discrete data referred to hereinafter. Further, in the following description, the symbol (k) provided for the discrete data is omitted as deemed appropriate.

On the other hand, the inert gas-estimating section 60 calculates various estimated values associated with low-pressure inert gas, high-pressure inert gas, fresh air, and so forth with calculation algorithms using models derived by a modeling method described hereinafter. Further, the model modifier 70 calculates modification values for modifying the models used by the inert gas-estimating section 60 with control algorithms referred to hereinafter.

Further, the low-pressure opening controller 80 calculates a target low-pressure opening αLP_cmd for controlling the low-pressure opening αLP using a control algorithm, referred to hereinafter. The high-pressure opening controller 90 calculates a target high-pressure opening αHP_cmd for controlling the high-pressure opening αHP using a control algorithm, referred to hereinafter.

Next, a description will be given of the above-described inert gas-estimating section 60. The inert gas-estimating section 60 calculates various estimated values using the models derived by the modeling method, referred to hereinafter. The modeling method models the balance of gases in the intake passage 5 using a physical equation. As described above, the high-pressure intake shutter 9a is held in a fully-open state during normal time, and hence in the modeling method, referred to hereinafter, modeling is executed assuming that the high-pressure intake shutter 9a can be ignored.

Figure 6:
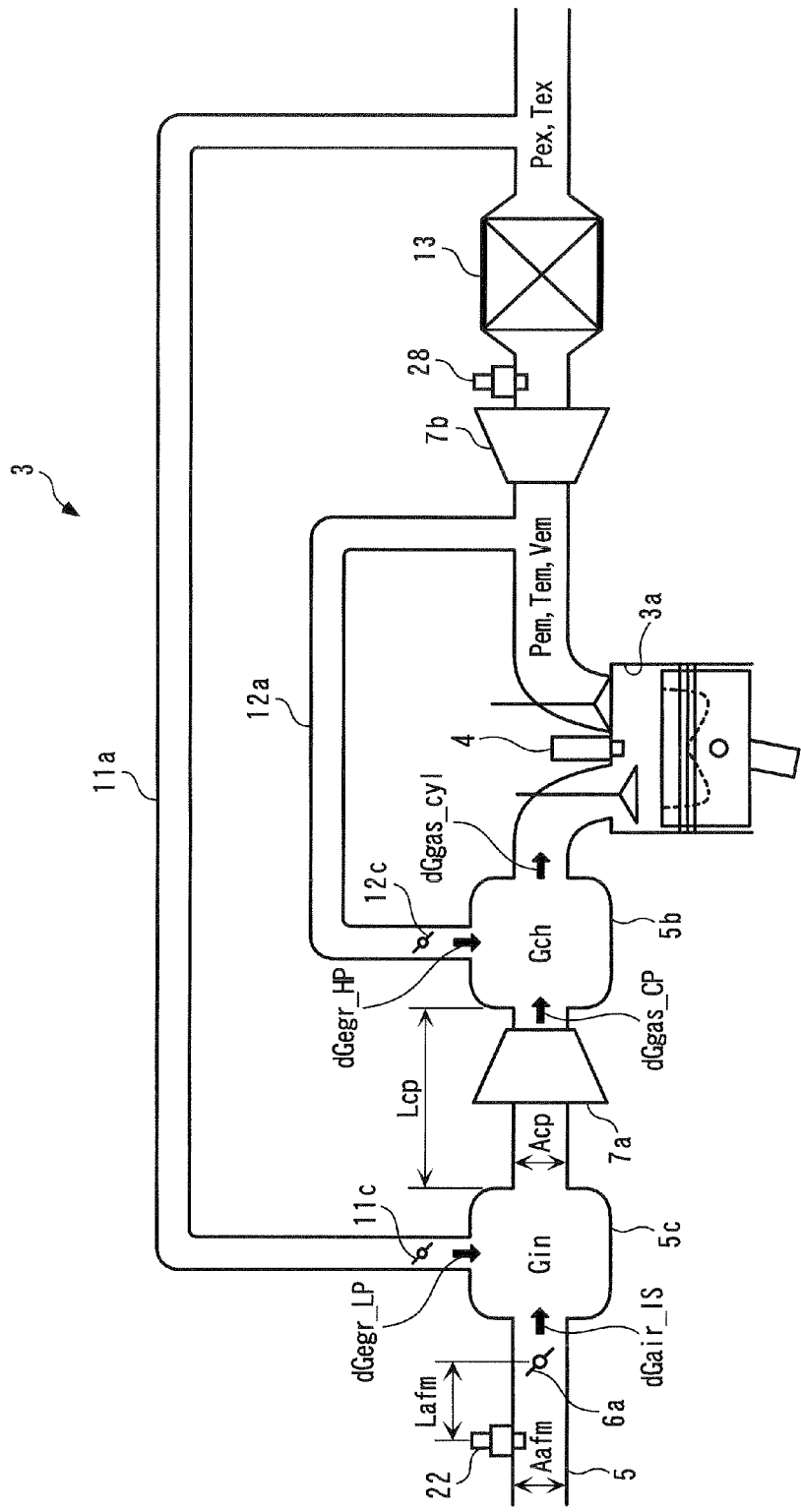
FIG. 6 is a diagram useful in explaining a modeling method.

Hereinafter, the modeling method will be described in detail with reference to FIG. 6. In the following description, gases including EGR gas and fresh air in the intake passage 5 are referred to as "gases in the intake passage 5". First, by modeling the balance of gases in the connecting portion 5c of the intake passage 5, there is obtained the following equation (2):

$$Gin(k)=Gin(k-1)+dGair\_IS(k-1)\cdot\Delta T+dGegr\_LP(k-1)\cdot\Delta T-dGgas\_CP(k-1)\cdot\Delta T \quad (2)$$

In the above equation (2), Gin represents the total amount of gases in the connecting portion 5c (hereinafter referred to as the "connecting portion total gas amount"), and dGegr_LP represents the flow rate of low-pressure EGR gas flowing from the low-pressure EGR device 11 into the connecting portion 5c (hereinafter referred to as the "low-pressure EGR gas flow rate"). Further, in the equation (2), dGair_IS represents the flow rate of fresh air passing through the intake shutter 6a (hereinafter referred to as the "IS passing fresh air flow rate"). The IS passing fresh air flow rate dGair_IS is determined by an intake pressure controller 110 (see FIG. 7), referred to hereinafter. Furthermore, in the equation (2), dGgas_CP represents the flow rate of gases flowing into the intake chamber 5b from the connecting portion 5c (hereinafter referred to as the "chamber gas flow rate"), and in the present embodiment, the chamber gas flow rate dGgas_CP is determined by a boost pressure controller 100 (see FIG. 7), referred to hereinafter.

Further, in the equation (2), an equation for calculating the low-pressure EGR gas flow rate dGegr_LP is derived using the following modeling method: First, assuming that the temperature of gases in the intake passage 5 is represented by Tin, the internal capacity of the intake passage 5 is represented by Vin, and a gas constant is represented by R, an intake pressure Pin, which is a pressure within the intake passage 5, is represented based on the relationship of Tin=TA and the equation of state of gas, by the following equation (3):

$$Pin(k) = \frac{Gin(k) \cdot R \cdot Tin(k)}{Vin} = \frac{Gin(k) \cdot R \cdot TA(k)}{Vin} \quad (3)$$

Furthermore, when the low-pressure EGR control valve 11c is regarded as a nozzle, and the equation of the nozzle is applied to the same, there are obtained the following equations (4) to (7):

$$dGegr\_LP(k) = A(\alpha LP) \cdot \sqrt{2 \cdot Pex(k) \cdot \rho ex(k)} \cdot \Psi\_LP(k) \quad (4)$$

When $\left\{\left(\frac{Pin(k)}{Pex(k)}\right) > \left(\frac{2}{\kappa+1}\right)^{\frac{\kappa}{\kappa-1}}\right\}$, (5)

$$\Psi\_LP(k) = \sqrt{\frac{\kappa}{\kappa-1}\left\{\left(\frac{Pin(k)}{Pex(k)}\right)^{\frac{2}{\kappa}} - \left(\frac{Pin(k)}{Pex(k)}\right)^{\frac{\kappa+1}{\kappa}}\right\}}$$

When $\left\{\left(\frac{Pin(k)}{Pex(k)}\right) \leq \left(\frac{2}{\kappa+1}\right)^{\frac{\kappa}{\kappa-1}}\right\}$, (6)

$$\Psi\_LP(k) = \left(\frac{2}{\kappa+1}\right)^{\frac{\kappa+1}{\kappa+1}} \sqrt{\frac{\kappa}{\kappa+1}}$$

$$\rho ex(k) = \frac{Pex(k)}{R \cdot Tex(k)} \quad (7)$$

In the above equation (4), $A(\alpha LP)$ represents an effective opening area of the low-pressure EGR control valve 11c determined by the low-pressure opening $\alpha LP$, and is calculated by searching a map, not shown, according to the low-pressure opening $\alpha LP$. Further, $\Psi\_LP$ represents a flow rate function defined by the above equations (5) and (6). In the equations (5) and (6), $\kappa$ represents a specific heat ratio. Furthermore, in the equation (4), $\rho ex$ ($\rho ex$) represents the density of low-pressure EGR gas upstream of the low-pressure EGR control valve 11c (i.e. on the side toward the exhaust passage 10), and is calculated by the above equation (7).

Figure 7:
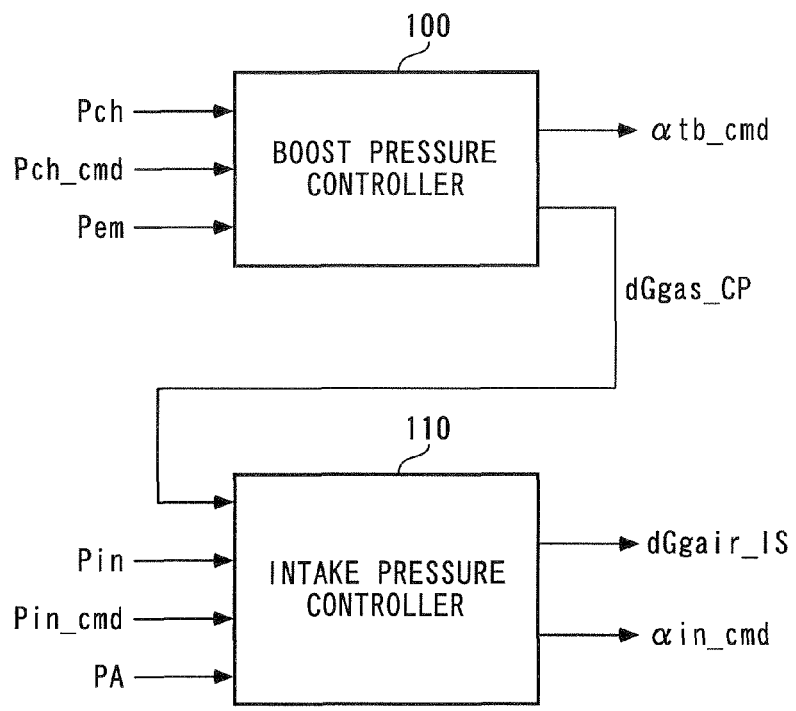
FIG. 7 is a block diagram of a boost pressure controller and an intake pressure controller.

Next, the aforementioned boost pressure controller 100 and intake pressure controller 110 will be described with reference to FIG. 7. Both the boost pressure controller 100 and the intake pressure controller 110 are implemented by the ECU 2, and control the intake chamber pressure Pch and the intake pressure Pin, respectively, as described hereinafter.

In the boost pressure controller 100, first, a chamber gas flow rate dGgas_CP is calculated with a sliding mode control algorithm expressed by the following equations (8) to (10):

$$Epch(k) = Pch(k) - Pch\_cmd(k) \quad (8)$$

$$\sigma pch(k) = Epch(k) - POLE\_pch \cdot Epch(k-1) \quad (9)$$

$$dGgas\_CP(k) = Krch\_pch \cdot \sigma pch(k) + Kadp\_pch \cdot \sum_{i=0}^{k} \sigma pch(i) \quad (10)$$

As shown in the equation (8), a follow-up error Epch is calculated as the difference between the intake chamber pressure Pch (i.e. the boost pressure) and a target boost pressure Pch_cmd. The target boost pressure Pch_cmd is calculated by searching a map, not shown, according to the engine speed NE and the demanded torque TRQDRV. Further, in the above equation (9), $\sigma pch$ represents a switching function, and POLE_pch represents a switching function-setting parameter. The switching function-setting parameter POLE_pch is for setting the convergence rate of the follow-up error Epch to 0, and is set such that the relationship of $-1<POLE\_pch<0$ holds. In this case, the convergence rate of the follow-up error Epch to 0 becomes higher as the switching function-setting parameter POLE_pch is closer to 0. Furthermore, in the above equation (10), Krch_pch represents a predetermined reaching law gain, and Kadp_pch represents a predetermined adaptive law gain.

A target vane opening $\alpha tb\_cmd$ is calculated using the chamber gas flow rate dGgas_CP calculated as above by the following equation (11):

$$\alpha tb\_cmd(k) = Ftb(dGas\_CP(k), Pch(k), Pem(k)) \quad (11)$$

In the above equation (11), Ftb represents a conversion function for converting the chamber gas flow rate dGgas_CP, the intake chamber pressure Pch, and the exhaust manifold pressure Pem to the target vane opening $\alpha tb\_cmd$. The target vane opening $\alpha tb\_cmd$ may be calculated by a map search method or a computing equation based on the equation of the nozzle, in place of the above equation (11).

In the boost pressure controller 100, the target vane opening $\alpha tb\_cmd$ is calculated by the above-described method, and further a control input signal corresponding to the target vane opening $\alpha tb\_cmd$ is supplied to the vane actuator 7d by the ECU 2, whereby the intake chamber pressure Pch is feedback-controlled such that it converges to the target boost pressure Pch_cmd.

On the other hand, the intake pressure controller 110 calculates the IS passing fresh air flow rate dGair_IS with a sliding mode control algorithm expressed by the following equations (12) to (14):

$$Epin(k) = Pin(k) - Pin\_cmd(k) \quad (12)$$

$$\sigma pin(k) = Epin(k) - POLE\_pin \cdot Epin(k-1) \quad (13)$$

$$dGair\_IS(k) = \\ Krch\_pin \cdot \sigma pin(k) + Kadp\_pin \cdot \sum_{i=0}^{k} \sigma pin(i) + dGgas\_CP(k-1) \quad (14)$$

As expressed by the above equation (12), a follow-up error Epin is calculated as the difference between the intake pressure Pin and a target intake pressure Pin_cmd, and the target intake pressure Pin_cmd is set to a value smaller than the exhaust pressure Pex by a predetermined value. Further, in the above equation (13), $\sigma pin$ represents a switching function, and POLE_pin represents a switching function-setting parameter. The switching function-setting parameter POLE_pin is set such that the relationship of $-1<POLE\_pch<POLE\_pin<0$ holds between the same and the switching function-setting parameter POLE_pch in the aforementioned equation (9). This is because the response of the intake shutter mechanism 6 is higher than that of the turbocharger 7, and accordingly, the convergence rate of the follow-up error Epin in the intake pressure controller 110 to 0 is set to be higher than the convergence rate of the follow-up error Epch in the boost pressure controller 100 to 0, to thereby prevent the feedback controls by the controllers 100 and 110 from interfering with each other.

Further, in the above equation (14), Krch_pin represents a predetermined reaching law gain, and Kadp_pin represents a predetermined adaptive law gain. Further, in the intake pressure controller 110, the chamber gas flow rate dGgas_CP forms a disturbance, so that the immediately preceding value dGgas_CP(k−1) of the chamber gas flow rate is included in the right side of the equation (14), as a feedforward term for compensating for such a disturbance.

Then, a target intake shutter opening αin_cmd is calculated using the IS passing fresh air flow rate dGair_IS calculated as above by the following equation (15):

$$\alpha\text{in\_cmd}(k) = F\text{in}(dG\text{air\_IS}(k), P\text{in}(k), PA(k)) \quad (15)$$

In the above equation (15), Fin represents a conversion function for converting the IS passing fresh air flow rate dGair_IS, the intake pressure Pin, and the atmospheric pressure PA to the target intake shutter opening αin_cmd. The target intake shutter opening αin_cmd may be calculated by the map search method or the computing equation based on the equation of the nozzle, in place of the above equation (15).

In the intake pressure controller 110, the target intake shutter opening αin_cmd is calculated by the above-described method, and further a control input signal corresponding to the target intake shutter opening αin_cmd is supplied to the IS actuator 6b by the ECU 2, whereby the intake pressure Pin is feedback-controlled such that it converges to the target intake pressure Pin_cmd.

Although in the boost pressure controller 100 and the intake pressure controller 110, described above, the chamber gas flow rate dGgas_CP and the IS passing fresh air flow rate dGair_IS are calculated with the sliding mode control algorithms, by way of example, this is not limitative, but the controllers 100 and 110 may be configured such that the above values are calculated with feedback control algorithms, such as a back stepping control algorithm, a model prediction control algorithm, and a PID control algorithm.

In the modeling method, the relationship between the above-mentioned IS passing fresh air flow rate dGair_IS and the aforementioned fresh air flow rate dGafm is modeled. First, assuming that the volume flow rate of fresh air within the intake passage 5 in the vicinity of the air flow sensor 22 is represented by dVafm, based on the equation of state of gas, there is obtained the following equation (16):

$$dVafm(k) = \frac{dGafm(k) \cdot R \cdot TA(k)}{PA(k)} \quad (16)$$

Here, assuming that the flow velocity of fresh air within the intake passage 5 in the vicinity of the air flow sensor 22 is represented by Wafm, and the cross-sectional area of the intake passage 5 is represented by Aafm, the flow velocity Wafm is calculated by the following equation (17):

$$Wafm(k) = \frac{dVafm(k)}{Aafm} \quad (17)$$

Next, assuming that the distance between the air flow sensor 22 and the intake shutter 6a is represented by Lafm, dead time dafm therebetween is calculated by the following equations (18) and (19):

$$\text{dafm\_temp}(k) = \frac{Lafm}{Wafm(k)} \quad (18)$$

$$\text{dafm}(k) = \text{Round}\left(\frac{\text{dafm\_temp}(k)}{\Delta T}\right) \quad (19)$$

In the above equation (18), dafm_temp represents the basic value of the dead time (in units of time), and in the above equation (19), Round represents a function for turning a value in parentheses into an integer. In this case, as shown in the equation (19), the dead time dafm is calculated by turning a value obtained by dividing the basic value dafm_temp by the control period ΔT into an integer, and hence the dead time dafm is calculated as a value obtained by converting the basic value dafm_temp to the number of times of execution of control.

Then, by using the dead time dafm calculated as above, the relationship between the fresh air flow rate dGafm and the IS passing fresh air flow rate dGair_IS is defined by the following equation (20):

$$dGafm(k) = dG\text{air\_IS}(k - dafm(k)) \quad (20)$$

Here, the relationship between the fresh air flow rate dGafm and the IS passing fresh air flow rate dGair_IS is defined by the above equation (20) because the air flow sensor 22 is influenced by a change in the degree of opening of the intake shutter 6a, in timing in which the dead time dafm has elapsed immediately after the change in the degree of opening thereof.

Further, an equation for calculating a flow rate dGiegr_LP of inert gas flowing from the low-pressure EGR device 11 into the connecting portion 5c of the intake passage 5 (hereinafter referred to as the "low-pressure inert gas flow rate dGiegr_LP") is derived by a modeling method, described hereinafter.

First, assuming that the volume flow rate of low-pressure EGR gas flowing through the low-pressure EGR passage 11a is represented by dVlp, based on the equation of state of gas, there is obtained the following equation (21):

$$dVlp(k) = \frac{dGegr\_LP(k) \cdot R \cdot Tex(k)}{Pex(k)} \quad (21)$$

Here, assuming that the flow velocity of the low-pressure EGR gas is represented by Wlp, and the cross-sectional area of the low-pressure EGR passage 11a is represented by Alp, the flow velocity Wlp is calculated by the following equation (22):

$$Wlp(k) = \frac{dVlp(k)}{Alp} \quad (22)$$

Next, assuming that the length of the low-pressure EGR passage 11a is represented by Llp, dead time dlp taken for exhaust gases to flow from the exhaust passage 10 to the connecting portion 5c of the intake passage 5 via the low-pressure EGR passage 11a is calculated by the following equations (23) and (24):

$$\text{dlp\_temp}(k) = \frac{Llp}{Wlp(k)} \quad (23)$$

$$dlp(k) = \text{Round}\left(\frac{\text{dlp\_temp}(k)}{\Delta T}\right) \quad (24)$$

In the above equation (23), dlp_temp represents the basic value of the dead time (in units of time). As shown in the equation (24), the dead time dlp is calculated by turning a value obtained by dividing the basic value dlp_temp by the control period ΔT into an integer, and therefore is calculated as a value obtained by converting the basic value dlp_temp to the number of times of execution of control.

Then, by using the dead time dlp calculated as above, it is possible to express the equation for calculating the low-pressure inert gas flow rate dGiegr_LP by the following equation (25):

$$dGiegr\_LP(k) = dGegr\_LP(k) \cdot \phi(k - dlp(k)) \quad (25)$$

Further, an equation for calculating a flow rate dGiegr_CP of inert gas flowing into the intake chamber $5b$ (hereinafter referred to as the "chamber inert gas flow rate dGiegr_CP") is derived by a modeling method, described hereinafter.

First, assuming that the volume flow rate of gases flowing through the intake passage 5 between the connecting portion $5c$ and the intake chamber $5b$ (hereinafter referred to as the "intermediate intake passage 5") is represented by dVcp, based on the equation of state of gas, there is obtained the following equation (26):

$$dVcp(k) = \frac{dGgas\_CP(k) \cdot R \cdot TA(k)}{Pin(k)} \quad (26)$$

Here, assuming that the flow velocity of gases within the intermediate intake passage 5 is represented by Wcp, and the cross-sectional area of the intermediate intake passage 5 is represented by Acp, the flow velocity Wcp is calculated by the following equation (27):

$$Wcp(k) = \frac{dVcp(k)}{Acp} \quad (27)$$

Next, assuming that the length of the intermediate intake passage 5 is represented by Lcp, dead time dcp taken for gases to flow from the connecting portion $5c$ to the intake chamber $5b$ via the intermediate intake passage 5 is calculated by the following equations (28) and (29):

$$dcp\_temp(k) = \frac{Lcp}{Wcp(k)} \quad (28)$$

$$dcp(k) = \text{Round}\left(\frac{dcp\_temp(k)}{\Delta T}\right) \quad (29)$$

In the above equation (28), dcp_temp represents the basic value of the dead time (in units of time). As shown in the equation (29), the dead time dcp is calculated by turning a value obtained by dividing the basic value dcp_temp by the control period $\Delta T$ into an integer, and therefore is calculated as a value obtained by converting the basic value dcp_temp to the number of times of execution of control.

Then, by using the dead time dcp calculated as above, it is possible to express an equation for calculating the chamber inert gas flow rate dGiegr_CP by the following equation (30):

$$dGiegr\_CP(k) = dGgas\_CP(k) \cdot Riegr\_in(k - dcp(k)) \quad (30)$$

In the above equation (30), Riegr_in represents an inert gas ratio within the intermediate intake passage 5 (hereinafter referred to as the "in-intermediate-passage inert gas ratio"), and an equation for calculation thereof is derived, as described hereinafter.

First, an equation for calculating an amount Giegr_in of inert gas within the intermediate intake passage 5 (hereinafter referred to as the "in-intermediate-passage inert gas amount Giegr_in") is defined by the following equation (31):

$$Giegr\_in(k) = Giegr\_in(k-1) + dGiegr\_LP(k-1)\cdot \Delta T - dGiegr\_CP(k-1)\cdot \Delta T \quad (31)$$

The in-intermediate-passage inert gas ratio Riegr_in is calculated by the following equation (32):

$$Riegr\_in(k) = \frac{Giegr\_in(k)}{Gin(k)} \quad (32)$$

On the other hand, the balance of gases in the intake chamber $5b$ is expressed by the following equation (33):

$$Gch(k) = Gch(k-1) + dGgas\_CP(k-1)\cdot \Delta T + dGegr\_HP(k-1)\cdot \Delta T - dGgas\_cyl(k-1)\cdot \Delta T \quad (33)$$

In the above equation (33), Gch represents the total amount of gases in the intake chamber $5b$ (hereinafter referred to as the "chamber total gas amount"), and dGegr_HP represents the flow rate of high-pressure EGR gas flowing from the high-pressure EGR device 12 into the intake chamber $5b$ (hereinafter referred to as the "high-pressure EGR gas flow rate"). Further, in the equation (33), dGgas_cyl represents the flow rate of gases flowing from the intake chamber $5b$ into the cylinders $3a$ (hereinafter referred to as the "in-cylinder gas flow rate"). A method of calculating the above three values Gch, dGegr_HP, and dGgas_cyl is derived in a manner described hereinafter.

First, the intake chamber pressure Pch is calculated by the following equation (34) based on the equation of state of gas:

$$Pch(k) = \frac{Gch(k) \cdot R \cdot Tch(k)}{Vch} \quad (34)$$

Further, when the high-pressure EGR control valve $12c$ is regarded as a nozzle, and the equation of the nozzle is applied to the same, there are obtained the following equations (35) to (38):

$$dGegr\_HP(k) = A(\alpha HP) \cdot \sqrt{2 \cdot Pem(k) \cdot \rho em(k)} \cdot \Psi\_HP(k) \quad (35)$$

$$\text{When}\left\{\left(\frac{Pch(k)}{Pem(k)}\right) > \left(\frac{2}{\kappa+1}\right)^{\frac{\kappa}{\kappa-1}}\right\}, \quad (36)$$

$$\Psi\_HP(k) = \sqrt{\frac{\kappa}{\kappa-1}\left\{\left(\frac{Pch(k)}{Pem(k)}\right)^{\frac{2}{\kappa}} - \left(\frac{Pch(k)}{Pem(k)}\right)^{\frac{\kappa+1}{\kappa}}\right\}}$$

$$\text{When}\left\{\left(\frac{Pch(k)}{Pem(k)}\right) \leq \left(\frac{2}{\kappa+1}\right)^{\frac{\kappa}{\kappa-1}}\right\}, \quad (37)$$

$$\Psi\_HP(k) = \left(\frac{2}{\kappa+1}\right)^{\frac{\kappa}{\kappa+1}} \sqrt{\frac{\kappa}{\kappa+1}}$$

$$\rho em(k) = \frac{Pem(k)}{R \cdot Tem(k)} \quad (38)$$

In the above equation (35), $A(\alpha HP)$ represents an effective opening area of the high-pressure EGR control valve $12c$ determined by the high-pressure opening $\alpha HP$, and is calculated by searching a map, not shown, according to the high-pressure opening $\alpha HP$. Further, $\Psi\_HP$ represents a flow rate function defined by the above equations (36) and (37). Furthermore, in the equation (35), $\rho$ e m represents the density of high-pressure EGR gas upstream of the high-pressure EGR control valve 12*c* (i.e. on the side toward the exhaust passage 10), and is calculated by the above equation (38).

Figure 8:
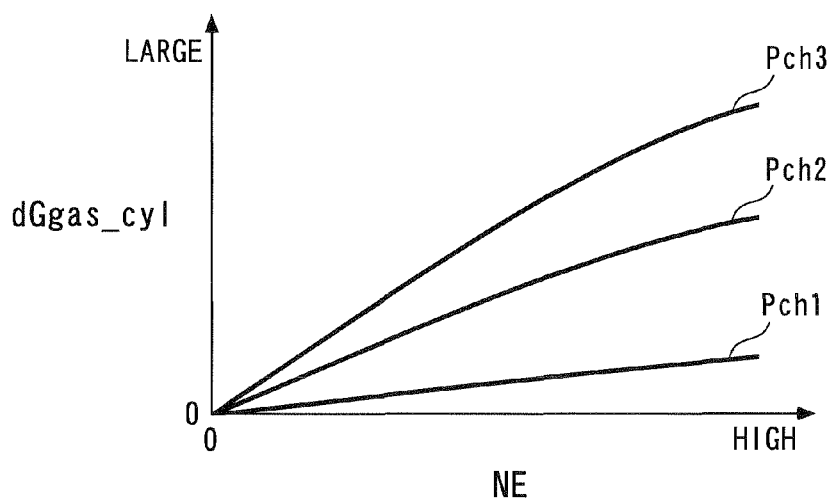
FIG. 8 is a view showing an example of a map for use in calculating an in-cylinder gas flow rate dGgas_cyl.

On the other hand, by mapping the relationship between the aforementioned in-cylinder gas flow rate dGgas_cyl, the engine speed NE, and the intake chamber pressure Pch, a map shown in FIG. 8 is obtained. In FIG. 8, Pch1 to Pch3 represent predetermined values of the intake chamber pressure Pch, and are set to values which satisfy the relationship of Pch1<Pch2<Pch3.

Further, an equation for calculating a flow rate dGiegr_HP of inert gas flowing from the high-pressure EGR device 12 into the intake chamber 5*b* (hereinafter referred to as the "high-pressure inert gas flow rate dGiegr_HP") is derived by a modeling method described hereinafter.

First, assuming that the volume flow rate of high-pressure EGR gas flowing through the high-pressure EGR passage 12*a* is represented by dVhp, there is obtained the following equation (39) based on the equation of state of gas:

$$dVhp(k) = \frac{dGegr\_HP(k) \cdot R \cdot Tem(k)}{Pem(k)} \quad (39)$$

Here, assuming that the flow velocity of the high-pressure EGR gas is represented by Whp, and the cross-sectional area of the high-pressure EGR passage 12*a* is represented by Ahp, the flow velocity Whp is calculated by the following equation (40):

$$Whp(k) = \frac{dVhp(k)}{Ahp} \quad (40)$$

Next, assuming that the length of the high-pressure EGR passage 12*a* is represented by Lhp, dead time dhp taken for gases to flow from the exhaust passage 10 to the intake chamber 5*b* via the high-pressure EGR passage 12*a* is calculated by the following equations (41) and (42):

$$dhp\_temp(k) = \frac{Lhp}{Whp(k)} \quad (41)$$

$$dhp(k) = \text{Round}\left(\frac{dhp\_temp(k)}{\Delta T}\right) \quad (42)$$

In the above equation (41), dhp_temp represents the basic value of the dead time (in units of time). As shown in the equation (42), the dead time dhp is calculated by turning a value obtained by dividing the basic value dhp_temp by the control period $\Delta T$ into an integer, and therefore is calculated as a value obtained by converting the basic value dhp_temp to the number of times of execution of control.

Then, by using the dead time dhp calculated as above, it is possible to express an equation for calculating the high-pressure inert gas flow rate dGiegr_HP by the following equation (43):

$$dGiegr\_HP(k) = dGegr\_HP(k) \cdot \phi(k - dhp(k)) \quad (43)$$

In the above equation (43), assuming that an inert gas ratio within the intake chamber 5*b* (hereinafter referred to as the "chamber inert gas ratio") is represented by Riegr_ch, a flow rate dGiegr_cyl of inert gas flowing from the intake chamber 5*b* into the cylinders 3*a* (hereinafter referred to as the "in-cylinder inert gas total flow rate dGiegr_cyl") is calculated by the following equation (44):

$$dGiegr\_cyl(k) = dGgas\_cyl(k) \cdot Riegr\_ch(k-1) \quad (44)$$

Further, the total amount of inert gas within the intake chamber 5*b* (hereinafter referred to as the "chamber inert gas total amount Giegr_ch") is calculated by the following equation (45):

$$Giegr\_ch(k) = Giegr\_ch(k-1) + dGiegr\_CP(k-1) \cdot \Delta T + dGiegr\_HP(k-1)\Delta T - dGiegr\_cyl(k-1) \cdot \Delta T \quad (45)$$

Furthermore, the chamber inert gas ratio Riegr_ch is calculated by the following equation (46):

$$Riegr\_ch(k) = \frac{Giegr\_ch(k)}{Gch(k)} \quad (46)$$

Then, an intake air amount Gcyl, which is the total amount of gases in the cylinders 3*a*, an in-cylinder inert gas total amount Giegr, which is the total amount of inert gas in the cylinders 3*a*, and an in-cylinder fresh air amount Gair, which is the amount of fresh air in the cylinders 3*a*, are calculated for each combustion cycle, respectively, by the following equations (47) to (49):

$$Gcyl(k) = dGgas\_cyl(k) \cdot \frac{Ncyl \cdot NE(k)}{2 \cdot 60} \quad (47)$$

$$Giegr(k) = dGiegr\_cyl(k) \cdot \frac{Ncyl \cdot NE(k)}{2 \cdot 60} \quad (48)$$

$$Gair(k) = Gcyl(k) - Giegr(k) \quad (49)$$

In the above equations (47) and (48), Ncyl represents the number of cylinders. In the case of the engine 3 according to the present embodiment, Ncyl=4 holds.

In the present embodiment, the equations (2) to (49) representative of the balance of gases within the intake passage 5 are derived by the above-described modeling methods. The inert gas-estimating section 60 calculates the estimated values of the aforementioned various parameters using the calculation algorithms based on the above equations (2) to (49), respectively, as described hereinafter. In the following description, values represented by parameters which are used in the above-described modeling methods and additionally have "_hat" attached to the ends of the parameters are used as estimated values of the parameters. Further, in addition to the estimated values of the parameters, an imaginary demanded value dGair_IS_v, referred to hereinafter, of the IS passing fresh air flow rate is referred to as the "estimated value".

Figure 9:
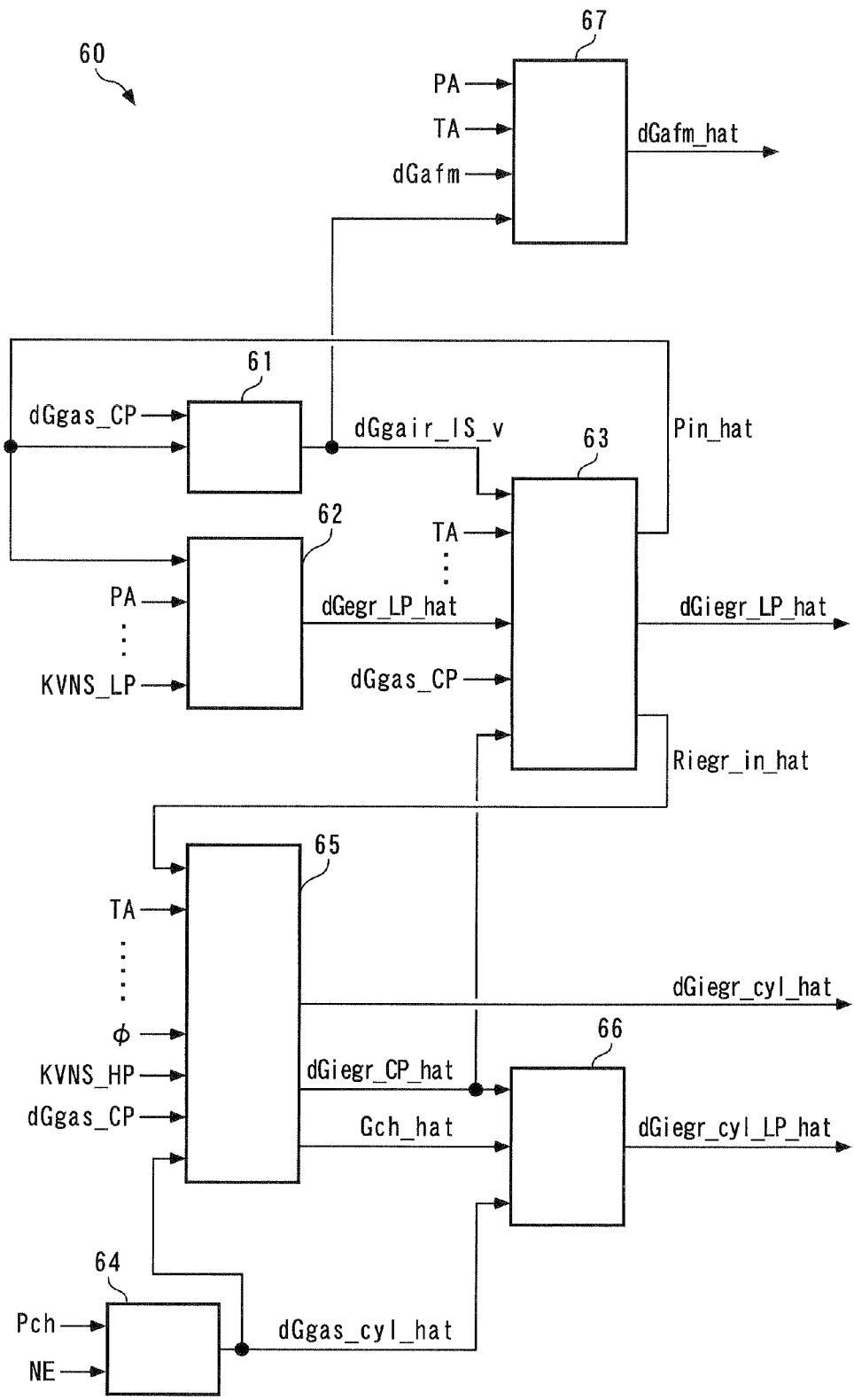
FIG. 9 is a diagram of an inert gas-estimating section.

Referring to FIG. 9, the inert gas-estimating section 60 includes an imaginary intake pressure controller 61, a low-pressure EGR gas flow rate-estimating section 62, an intake upstream-side parameter-estimating section 63, an in-cylinder gas flow rate-estimating section 64, an intake downstream-side parameter-estimating section 65, an in-cylinder low-pressure inert gas flow rate-estimating section 66, and a fresh air flow rate-estimating section 67.

First, the imaginary intake pressure controller 61 calculates the imaginary demanded value dGair_IS_v of the IS passing fresh air flow rate by the following equations (50) to (52):

$$\text{Epin\_hat}(k) = \text{Pin\_hat}(k) - \text{Pin\_cmd}(k) \tag{50}$$

$$\sigma\text{pin\_hat}(k) = \text{Epin\_hat}(k) - \text{POLE\_pin} \cdot \text{Epin\_hat}(k-1) \tag{51}$$

$$dGair\_IS\_v(k) = Krch\_pin \cdot \sigma\text{pin\_hat}(k) + \\ Kadp\_pin \cdot \sum_{i=0}^{k} \sigma\text{pin\_hat}(i) + dGgas\_CP(k-1) \tag{52}$$

The above equations (50) to (52) correspond to computing equations obtained by replacing the IS passing fresh air flow rate dGair_IS of the aforementioned computing equations (12) to (14) used in the intake pressure controller 110 with the imaginary demanded value dGair_IS_v of the IS passing fresh air flow rate, and at the same time replacing the two values Spin and σpin with the respective estimated values thereof. In the equation (50), an estimated value Pin_hat of the intake pressure is calculated by the intake upstream-side parameter-estimating section 63, as described hereinafter.

The imaginary intake pressure controller 61 of the inert gas-estimating section 60 calculates the imaginary demanded value dGair_IS_v of the IS passing fresh air flow rate by the above equations (50) to (52) for the following reason: When a modeling error is caused in a model used in the inert gas-estimating section 60, the value of the IS passing fresh air flow rate, calculated by the intake pressure controller 110, for holding the intake pressure Pin at the target intake pressure Pin_cmd, and the value of the IS passing fresh air flow rate, calculated by the intake pressure controller 110, for holding the estimated value Pin_hat of the intake pressure at the target intake pressure Pin_cmd, are different from each other. Therefore, the imaginary intake pressure controller 61 of the inert gas-estimating section 60 calculates the imaginary demanded value dGair_IS_v of the IS passing fresh air flow rate by using the above equations (50) to (52) in place of the aforementioned equations (12) to (14).

Next, the low-pressure EGR gas flow rate-estimating section 62 calculates an estimated value dGegr_LP_hat of the low-pressure EGR gas flow rate by the following equations (53) to (57).

$$dGegr\_LP\_hat\_temp(k) = A(\alpha LP)\sqrt{2 \cdot Pex(k) \cdot \rho ex(k)} \cdot \Psi\_LP(k) \tag{53}$$

$$\text{When } \left\{\left(\frac{\text{Pin\_hat}(k)}{Pex(k)}\right) > \left(\frac{2}{\kappa+1}\right)^{\frac{\kappa}{\kappa-1}}\right\}, \tag{54}$$

$$\Psi\_LP(k) = \sqrt{\frac{\kappa}{\kappa-1}\left\{\left(\frac{\text{Pin\_hat}(k)}{Pex(k)}\right)^{\frac{2}{\kappa}} - \left(\frac{\text{Pin\_hat}(k)}{Pex(k)}\right)^{\frac{\kappa+1}{\kappa}}\right\}}$$

$$\text{When } \left\{\left(\frac{\text{Pin\_hat}(k)}{Pex(k)}\right) \leq \left(\frac{2}{\kappa+1}\right)^{\frac{\kappa}{\kappa-1}}\right\}, \tag{55}$$

$$\Psi\_LP(k) = \left(\frac{2}{\kappa+1}\right)^{\frac{\kappa}{\kappa+1}} \sqrt{\frac{\kappa}{\kappa+1}}$$

$$\rho ex(k) = \frac{Pex(k)}{R \cdot Tex(k)} \tag{56}$$

$$dGegr\_LP\_hat(k) = KVNS\_LP(k) \cdot dGegr\_LP\_hat\_temp(k) \tag{57}$$

The above equation (53) corresponds to an equation obtained by replacing the low-pressure EGR gas flow rate dGegr_LP of the aforementioned equation (4) with a basic estimated value dGegr_LP_hat_temp of the low-pressure EGR gas flow rate. Further, the above equations (54) and (55) correspond to equations obtained by replacing the intake pressure Pin of the aforementioned equations (5) and (6) with the estimated value Pin_hat of the intake pressure Pin, and the equation (56) is identical to the aforementioned equation (7). That is, the basic estimated value dGegr_LP_hat_temp of the low-pressure EGR gas flow rate is calculated using the equation (53) as a model to which the equation of the nozzle is applied.

Further, in the above equation (57), KVNS_LP represents a low-pressure modification value, and is calculated by the model modifier 70, as described hereinafter. As expressed by the equation (57), the estimated value dGegr_LP_hat of the low-pressure EGR gas flow rate is calculated by multiplying the basic estimated value dGegr_LP_hat_temp by the low-pressure modification value KVNS_LP. More specifically, the estimated value dGegr_LP_hat of the low-pressure EGR gas flow rate is calculated by modifying the basic estimated value dGegr_LP_hat_temp calculated by the model equation (53) using the low-pressure modification value KVNS_LP. In this case, as described above, the equation (53) is the model to which the equation of the nozzle is applied, so that the above-described modification of the basic estimated value dGegr_LP_hat_temp using the low-pressure modification value KVNS_LP is equivalent to modification of the model.

Next, a description will be given of the above-mentioned intake upstream-side parameter-estimating section 63. The intake upstream-side parameter-estimating section 63 calculates the estimated value Pin_hat of the intake pressure, an estimated value dGiegr_LP_hat of the low-pressure inert gas flow rate, and an estimated value Riegr_in_hat of the in-intermediate-passage inert gas ratio with calculation algorithms, described hereinafter.

First, an estimated value Gin_hat of the connecting portion total gas amount is calculated by the following equation (58):

$$Gin\_hat(k) = Gin\_hat(k-1) + dGair\_IS\_v(k-1) \cdot \Delta T + \\ dGegr\_LP\_hat(k-1)\Delta T - dGgas\_CP(k-1) \cdot \Delta T \tag{58}$$

This equation (58) is equivalent to an equation obtained by replacing the two values Gin and dGegr_LP of the aforementioned equation (2) with the respective estimated values Gin_hat and dGegr_LP_hat thereof, and at the same time replacing the IS passing fresh air flow rate dGair_IS of the aforementioned equation (2) with the imaginary demanded value dGair_IS_v thereof.

Then, the estimated value Pin_hat of the intake pressure is calculated by the following equation (59):

$$\text{Pin\_hat}(k) = \frac{Gin\_hat(k) \cdot R \cdot Tin(k)}{Vin} = \frac{Gin\_hat(k) \cdot R \cdot TA(k)}{Vin} \tag{59}$$

This equation (59) is equivalent to an equation obtained by replacing the two values Pin and Gin of the aforementioned equation (3) with the respective estimated values Pin_hat and Gin_hat thereof.

Further, the estimated value dGiegr_LP_hat of the low-pressure inert gas flow rate is calculated by the following equations (60) to (64):

$$dVlp\_hat(k) = \frac{dGegr\_LP\_hat(k) \cdot R \cdot Tex(k)}{Pex(k)} \tag{60}$$

$$Wlp\_hat(k) = \frac{dVlp\_hat(k)}{Alp} \tag{61}$$

$$\text{dlp\_temp\_hat}(k) = \frac{Llp}{\text{Wlp\_hat}(k)} \quad (62)$$

$$\text{dlp\_hat}(k) = \text{Round}\left(\frac{\text{dlp\_temp\_hat}(k)}{\Delta T}\right) \quad (63)$$

$$\text{dGiegr\_LP\_hat}(k) = \text{dGiegr\_LP\_hat}(k) \cdot \phi(k - \text{dlp\_hat}(k)) \quad (64)$$

The above equations (60) to (64) are equivalent to equations obtained by replacing the six values dVlp, dGegr_LP, Wlp, dlp_temp, dlp, and dGiegr_LP of the aforementioned equations (21) to (25) with the respective estimated values dVlp_hat, dGegr_LP_hat, Wlp_hat, dlp_temp_hat, dlp_hat, and dGiegr_LP_hat thereof.

Further, an estimated value Giegr_in_hat of the in-intermediate-passage inert gas amount is calculated by the following equation (65):

$$\text{Giegr\_in\_hat}(k) = \text{Giegr\_in\_hat}(k-1) + \text{dGiegr\_LP\_hat}(k-1) \cdot \Delta T - \text{dGiegr\_CP\_hat}(k-1) \cdot \Delta T \quad (65)$$

This equation (65) is equivalent to an equation obtained by replacing the three values Giegr_in, dGiegr_LP, and dGiegr_CP of the aforementioned equation (31) with the respective estimated values Giegr_in_hat, dGiegr_LP_hat, and dGiegr_CP_hat thereof. The estimated value dGiegr_CP_hat of the chamber inert gas flow rate is calculated by the intake downstream-side parameter-estimating section 65, as described hereinafter.

Then, the estimated value Riegr_in_hat of the in-intermediate-passage inert gas ratio is calculated by the following equation (66):

$$\text{Riegr\_in\_hat}(k) = \frac{\text{Giegr\_in\_hat}(k)}{\text{Gin\_hat}(k)} \quad (66)$$

This equation (66) is equivalent to an equation obtained by replacing the three values Riegr_in, Giegr_in, and Gin of the aforementioned equation (32) with the respective estimated values Riegr_in_hat, Giegr_in_hat, and Gin_hat thereof.

Figure 10:
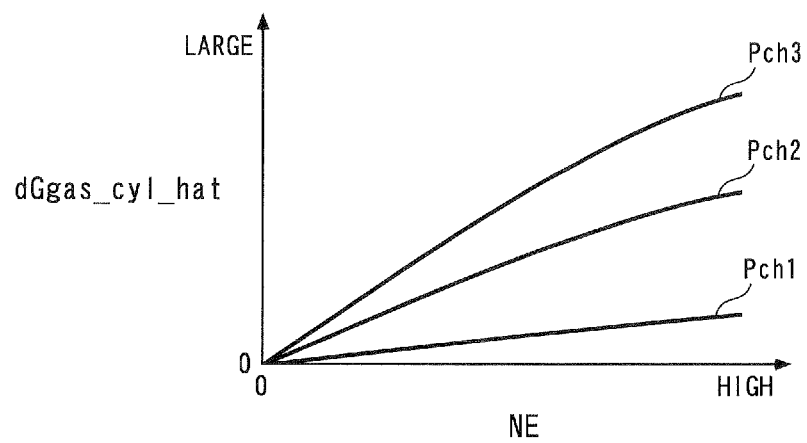
FIG. 10 is a view showing an example of a map for use in calculating an estimated value dGgas_cyl_hat of the in-cylinder gas flow rate.

Next, a description will be given of the above-mentioned in-cylinder gas flow rate-estimating section 64. The in-cylinder gas flow rate-estimating section 64 calculates an estimated value dGgas_cyl_hat of the in-cylinder gas flow rate by searching a map shown in FIG. 10 according to the immediately preceding value NE(k−1) of the engine speed and the immediately preceding value Pch(k−1) of the intake chamber pressure. FIG. 10 is equivalent to a figure obtained by replacing the "in-cylinder gas flow rate dGgas_cyl" on the vertical axis in FIG. 8 with the "estimated value dGgas_cyl_hat of the in-cylinder gas flow rate".

Further, the aforementioned intake downstream-side parameter-estimating section 65 calculates an estimated value dGiegr_cyl_hat of the in-cylinder inert gas total flow rate, an estimated value Gch_hat of the chamber total gas amount, the estimated value dGiegr_CP_hat of the chamber inert gas flow rate, and an estimated value Riegr_ch_hat of the chamber inert gas ratio with calculation algorithms described hereinafter.

First, the estimated value dGiegr_cyl_hat of the in-cylinder inert gas total flow rate is calculated by the following equation (67).

$$\text{dGiegr\_cyl\_hat}(k) = \text{dGgas\_cyl\_hat}(k) \cdot \text{Riegr\_ch\_hat}(k-1) \quad (67)$$

This equation (67) is equivalent to an equation obtained by replacing the three values dGiegr_cyl, dGgas_cyl, and Riegr_ch of the aforementioned equation (44) with the respective estimated values dGiegr_cyl_hat, dGgas_cyl_hat, and Riegr_ch_hat thereof. The estimated value Riegr_ch_hat of the chamber inert gas ratio is calculated by an equation (85), described hereinafter.

Further, the estimated value Gch_hat of the chamber total gas amount is calculated by the following equation (68):

$$\text{Gch\_hat}(k) = \text{Gch\_hat}(k-1) + \text{dGgas\_CP}(k-1) \cdot \Delta T + \text{dGegr\_HP\_hat}(k-1) \cdot \Delta T - \text{dGgas\_cyl\_hat}(k-1) \cdot \Delta T \quad (68)$$

This equation (68) is equivalent to an equation obtained by replacing the three values Gch, dGegr_HP, and dGgas_cyl of the aforementioned equation (33) with the respective estimated values Gch_hat, dGegr_HP_hat, and dGgas_cyl_hat thereof. An estimated value dGegr_HP_hat of the high-pressure EGR gas flow rate is calculated by equations (74) to (78), described hereinafter.

Furthermore, the estimated value dGiegr_CP_hat of the chamber inert gas flow rate is calculated by the following equations (69) to (73):

$$\text{dVcp\_hat}(k) = \frac{\text{dGgas\_CP}(k) \cdot R \cdot TA(k)}{\text{Pin}(k)} \quad (69)$$

$$\text{Wcp\_hat}(k) = \frac{\text{dVcp\_hat}(k)}{Acp} \quad (70)$$

$$\text{dcp\_temp\_hat}(k) = \frac{Lcp}{\text{Wcp\_hat}(k)} \quad (71)$$

$$\text{dcp\_hat}(k) = \text{Round}\left(\frac{\text{dcp\_temp\_hat}(k)}{\Delta T}\right) \quad (72)$$

$$\text{dGiegr\_CP\_hat}(k) = \text{dGgas\_CP}(k) \cdot \text{Riegr\_in\_hat}(k - \text{dcp\_hat}(k)) \quad (73)$$

The above equations (69) to (73) are equivalent to equations obtained by replacing the six values dVcp, Wcp, dcp_temp, dcp, dGiegr_CP, and Riegr_in of the aforementioned equations (26) to (30) with the respective estimated values dVcp_hat, Wcp_hat, dcp_temp_hat, dcp_hat, dGiegr_CP_hat, and Riegr_in_hat thereof.

Further, the estimated value dGegr_HP_hat of the high-pressure EGR gas flow rate is calculated by the following equations (74) to (78):

$$\text{Pch\_hat}(k) = \frac{\text{Gch\_hat}(k) \cdot R \cdot Tch(k)}{Vch} \quad (74)$$

$$\text{dGegr\_HP\_hat\_temp}(k) = A(\alpha HP) \cdot \sqrt{2 \cdot Pem(k) \cdot \rho em(k)} \cdot \Psi\_HP(k) \quad (75)$$

When $\left\{\left(\dfrac{\text{Pch\_hat}(k)}{Pem(k)}\right) > \left(\dfrac{2}{\kappa+1}\right)^{\frac{\kappa}{\kappa-1}}\right\}$, (76)

$$\Psi\_HP(k) = \sqrt{\frac{\kappa}{\kappa-1}\left\{\left(\frac{\text{Pch\_hat}(k)}{Pem(k)}\right)^{\frac{2}{\kappa}} - \left(\frac{\text{Pch\_hat}(k)}{Pem(k)}\right)^{\frac{\kappa+1}{\kappa}}\right\}}$$

When $\left\{\left(\dfrac{\text{Pch\_hat}(k)}{Pem(k)}\right) \leq \left(\dfrac{2}{\kappa+1}\right)^{\frac{\kappa}{\kappa-1}}\right\}$, (77)

$$\Psi\_HP(k) = \left(\frac{2}{\kappa+1}\right)^{\frac{\kappa}{\kappa+1}} \sqrt{\frac{\kappa}{\kappa+1}}$$

$$\text{dGegr\_HP\_hat}(k) = \text{KVNS\_HP}(k) \cdot \text{dGegr\_HP\_hat\_temp}(k) \quad (78)$$

The above equations (74), (76), and (77) are equivalent to equations obtained by replacing the intake chamber pressure Pch of the aforementioned equations (34), (36), and (37) with an estimated value Pch_hat of the intake chamber pressure, and the above equation (75) is equivalent to an equation obtained by replacing the high-pressure EGR gas flow rate dGegr_HP of the aforementioned equation (35) with a basic estimated value dGegr_HP_hat_temp of the high-pressure EGR gas flow rate. That is, the basic estimated value dGegr_HP_hat_temp of the high-pressure EGR gas flow rate is calculated using the model equation (75) to which the equation of the nozzle is applied.

Further, in the above equation (78), KVNS_HP represents a high-pressure modification value, and is calculated by the model modifier 70, as described hereinafter. As expressed by the equation (78), the estimated value dGegr_HP_hat of the high-pressure EGR gas flow rate is calculated by multiplying the basic estimated value dGegr_HP_hat_temp by the high-pressure modification value KVNS_HP. More specifically, the estimated value dGegr_HP_hat of the high-pressure EGR gas flow rate is calculated by modifying the basic estimated value dGegr_HP_hat_temp calculated by the model equation (75), using the high-pressure modification value KVNS_HP. In this case, as described above, the equation (75) is the model equation to which the equation of the nozzle is applied, so that the modification of the basic estimated value dGegr_HP_hat_temp using the high-pressure modification value KVNS_HP is equivalent to modification of the model.

Then, an estimated value dGiegr_HP_hat of the high-pressure inert gas flow rate is calculated by the following equations (79) to (83):

$$dVhp\_hat(k) = \frac{dGegr\_HP\_hat(k) \cdot R \cdot Tem(k)}{Pem(k)} \quad (79)$$

$$Whp\_hat(k) = \frac{dVhp\_hat(k)}{Ahp} \quad (80)$$

$$dhp\_temp\_hat(k) = \frac{Lhp}{Whp\_hat(k)} \quad (81)$$

$$dhp\_hat(k) = \text{Round}\left(\frac{dhp\_temp\_hat(k)}{\Delta T}\right) \quad (82)$$

$$dGiegr\_HP\_hat(k) = dGegr\_HP\_hat(k) \cdot \phi(k - dhp\_hat(k)) \quad (83)$$

The above equations (79) to (83) are equivalent to equations obtained by replacing the six values dVhp, dGegr_HP, Whp, dhp_temp, dhp, and dGiegr_HP of the aforementioned equations (39) to (43) with the respective estimated values dVhp_hat, dGegr_HP_hat, Whp_hat, dhp_temp_hat, dhp_hat, and dGiegr_HP_hat thereof.

Further, an estimated value Giegr_ch_hat of the chamber inert gas total amount is calculated by the following equation (84):

$$Giegr\_ch\_hat(k)=Giegr\_ch\_hat(k-1)+dGiegr\_CP\_hat(k-1)\cdot\Delta T+dGiegr\_HP\_hat(k-1)\cdot\Delta T-dGiegr\_cyl\_hat(k-1)\cdot\Delta T \quad (84)$$

This equation (84) is equivalent to an equation obtained by replacing the four values Giegr_ch, dGiegr_CP, dGiegr_HP, and dGiegr_cyl of the aforementioned equation (45) with the respective estimated values Giegr_ch_hat, dGiegr_CP_hat, dGiegr_HP_hat, and dGiegr_cyl_hat thereof.

Then, the estimated value Riegr_ch_hat of the chamber inert gas ratio is calculated by the following equation (85):

$$Riegr\_ch\_hat(k) = \frac{Giegr\_ch\_hat(k)}{Gch\_hat(k)} \quad (85)$$

This equation (85) is equivalent to an equation obtained by replacing the three values Riegr_ch, Giegr_ch, and Gch of the aforementioned equation (46) with the respective estimated values Riegr_ch_hat, Giegr_ch_hat, and Gch_hat thereof.

Next, a description will be given of the aforementioned in-cylinder low-pressure inert gas flow rate-estimating section 66. This in-cylinder low-pressure inert gas flow rate-estimating section 66 calculates an estimated value dGiegr_cyl_LP_hat of the in-cylinder low-pressure inert gas flow rate with a calculation algorithm, described hereinafter. The estimated value dGiegr_cyl_LP_hat of the in-cylinder low-pressure inert gas flow rate represents an estimation of the flow rate of in-cylinder low-pressure inert gas flowing into the cylinders 3a.

First, when high-pressure EGR gas flowing from the high-pressure EGR device 12 into the intake chamber 5b is regarded as fresh air, an estimated value Giegr_ch_LP_hat of an amount of low-pressure inert gas flowing into the intake chamber 5b is calculated by the following equation (86):

$$Giegr\_ch\_LP\_hat(k)=Giegr\_ch\_LP\_hat(k-1)\cdot\Delta T+dGiegr\_CP\_hat(k-1)\cdot\Delta T-dGiegr\_cyl\_LP\_hat(k-1)\cdot\Delta T \quad (86)$$

Further, an estimated value Riegr_ch_LP_hat of the inert gas ratio in the intake chamber 5b is calculated by the following equation (87):

$$Riegr\_ch\_LP\_hat(k) = \frac{Giegr\_ch\_LP\_hat(k)}{Gch\_hat(k)} \quad (87)$$

Then, the estimated value dGiegr_cyl_LP_hat of the in-cylinder low-pressure inert gas flow rate is calculated using the thus calculated estimated value Riegr_ch_LP_hat of the inert gas ratio by the following equation (88):

$$dGiegr\_cyl\_LP\_hat(k)=dGgas\_cyl\_hat(k)\cdot Riegr\_ch\_LP\_hat(k-1) \quad (88)$$

Next, a description will be given of the aforementioned fresh air flow rate-estimating section 67. The fresh air flow rate-estimating section 67 calculates an estimated value dGafm_hat of the flow rate of fresh air (estimated gas state parameter) by the following equations (89) to (93):

$$dVafm(k) = \frac{dGafm(k) \cdot R \cdot TA(k)}{PA(k)} \quad (89)$$

$$Wafm(k) = \frac{dVafm(k)}{Aafm} \quad (90)$$

$$dafm\_temp(k) = \frac{Lafm}{Wafm(k)} \quad (91)$$

$$dafm(k) = \text{Round}\left(\frac{dafm\_temp(k)}{\Delta T}\right) \quad (92)$$

$$dGafm\_hat(k) = dGair\_IS\_v(k - dafm(k)) \quad (93)$$

As is clear from a comparison between the above equations (89) to (93) and the aforementioned equations (16) to (20), the equations (89) to (92) are identical to the equations (16) to (19), and the equation (93) is equivalent to an equation obtained by replacing the fresh air flow rate dGafm of the equation (20) with the estimated value dGafm_hat thereof, and the IS passing fresh air flow rate dGair_IS of the equation (20) with the imaginary demanded value dGair_IS_v thereof. In the equation (89), an immediately preceding value dGafm_hat(k−1) of the estimated value of the fresh air flow rate may be used in place of the current value dGafm(k) of the fresh air flow rate.

Figure 11:
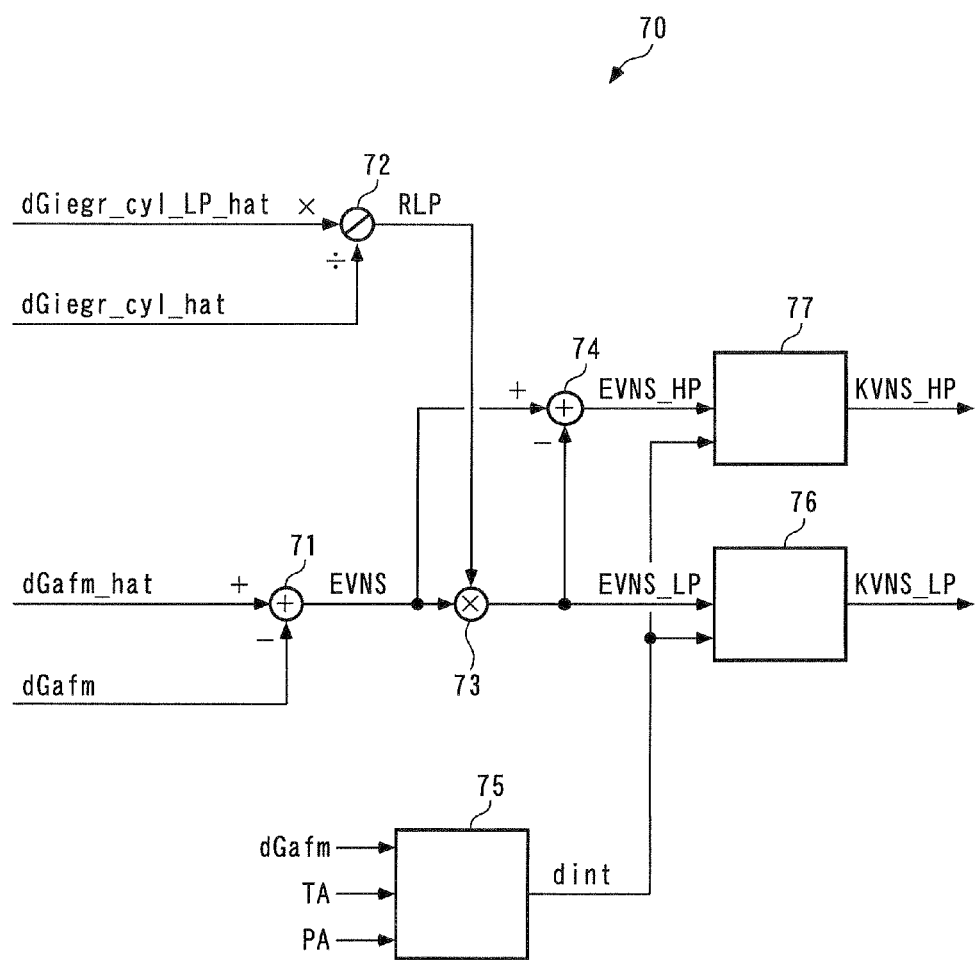
FIG. 11 is a diagram of a model modifier.

Next, the aforementioned model modifier 70 will be described with reference to FIG. 11. The model modifier 70 calculates the above-mentioned low-pressure modification value KVNS_LP and the high-pressure modification value KVNS_HP by a method, described hereinafter, and as shown in FIG. 11, includes subtractors 71 and 74, a divider 72, a multiplier 73, a dead time-calculating section 75, a low-pressure modification value-calculating section 76, and a high-pressure modification value-calculating section 77.

First, the subtractor 71 calculates an error EVNS by the following equation (94):

$$EVNS(k) = dGafm\_hat(k-1) - dGafm(k-1) \quad (94)$$

Further, the divider 72 calculates a low-pressure inert gas ratio RLP by the following equation (95):

$$RLP(k) = \frac{dGiegr\_cyl\_LP\_hat(k-1)}{dGiegr\_cyl\_hat(k-1)} \quad (95)$$

Furthermore, the multiplier 73 calculates a low-pressure error EVNS_LP by the following equation (96):

$$EVNS\_LP(k) = RLP(k) \cdot EVNS(k) \quad (96)$$

On the other hand, the subtractor 74 calculates a high-pressure error EVNS_HP by the following equation (97):

$$EVNS\_HP(k) = (1 - RLP(k)) \cdot EVNS(k) \quad (97)$$

Further, the dead time-calculating section 75 calculates dead time dint taken for intake air to flow from the air flow sensor 22 to the cylinders 3a by the following equations (98) to (101). The equations (98) and (99) are identical to the equations (16) and (17) mentioned in the modeling method described hereinabove.

$$dVafm(k) = \frac{dGafm(k) \cdot R \cdot TA(k)}{PA(k)} \quad (98)$$

$$Wafm(k) = \frac{dVafm(k)}{Aafm} \quad (99)$$

$$dint\_temp(k) = \frac{Lafm + Lcp}{Wafm(k)} \quad (100)$$

$$dint(k) = \text{Round}\left(\frac{dint\_temp(k)}{\Delta T}\right) \quad (101)$$

In the above equation (100), dint_temp represents the basic value of the dead time (in units of time), and as expressed by the above equation (101), the dead time dint is calculated by turning a value obtained by dividing the basic value dint_temp by the control period $\Delta T$ into an integer, and therefore is calculated as a value obtained by converting the basic value dint_temp to the number of times of execution of control.

The low-pressure modification value-calculating section 76 calculates the low-pressure modification value KVNS_LP by a method, described hereinafter.

First, a first LP (low-pressure) pressure ratio Rplp1 is calculated by the following equation (102):

$$Rplp1(k) = \frac{Pin\_hat(k - dint(k))}{Pex(k - dint(k))} \quad (102)$$

In the above equation (102), an estimated value Pin_hat(k−dint(k)) of intake pressure before the dead time dint, and an exhaust pressure Pex(k−dint(k)) before the dead time dint are used because the low-pressure error EVNS_LP is estimated to have been caused by a state of the pressure ratio before the dead time dint.

Figure 12:
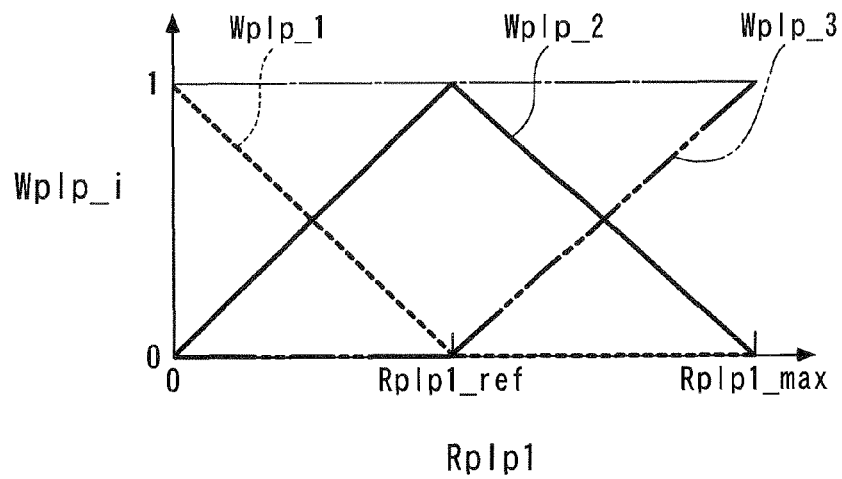
FIG. 12 is a view showing an example of a map for use in calculating a first LP pressure ratio weight function Wplp_i.

Then, a first LP pressure ratio weight function Wplp_i (i=1 to 3) is calculated by searching a map shown in FIG. 12 according to the first LP pressure ratio Rplp1. The first LP pressure ratio weight function Wplp_i is calculated as a vector composed of the elements of three values Wplp_1, Wplp_2, and Wplp_3. In FIG. 12, Rplp1_ref represents a predetermined value of the first LP pressure ratio Rplp1, and Rplp1_max represents the maximum value of values of the first LP pressure ratio Rplp1 variable during operation of the engine 3.

As shown in FIG. 12, when a region in which the first LP pressure ratio Rplp1 is variable is divided into two areas, i.e. an area of 0≤Rplp1<Rplp1_ref and an area of Rplp1_ref≤Rplp1≤Rplp1_max, the three first LP pressure ratio weight functions Wplp_i are set as described hereinafter, respectively. First, in the area of 0≤Rplp1<Rplp1_ref, the first LP pressure ratio weight function Wplp_1 is set to a maximum value of 1 at Rplp1=0 and to a smaller positive value as the first LP pressure ratio Rplp1 is larger, while in the area of Rplp1_ref≤Rplp1≤Rplp1_max, it is set to 0.

In the area of 0≤Rplp1<Rplp1_ref, the second first LP pressure ratio weight function Wplp_2 is set to a larger positive value as the first LP pressure ratio Rplp1 is larger, while in the area of Rplp1_ref≤Rplp1≤Rplp1_max, it is set to a maximum value of 1 at Rplp1=Rplp1_ref and to a smaller positive value as the first LP pressure ratio Rplp1 is larger. Further, in the area of 0≤Rplp1<Rplp1_ref, the third first LP pressure ratio weight function Wplp_3 is set to 0, while in the area of Rplp1_ref≤Rplp1≤Rplp1_max, it is set to a maximum value of 1 at Rplp1=Rplp1_max and to a larger positive value as the first LP pressure ratio Rplp1 is larger.

Furthermore, the first and second first LP pressure ratio weight functions Wplp_1 and Wplp_2 are set such that they cross each other in the area of 0 Rplp1<Rplp1_ref, and the sum thereof becomes equal to the maximum value 1 of each first LP pressure ratio weight function Wplp_i. Similarly, the second and third first LP pressure ratio weight functions Wplp_2 and Wplp_3 are set such that they cross each other in the area of Rplp1_ref≤Rplp1≤Rplp1_max, and the sum thereof becomes equal to the maximum value 1 of each first LP pressure ratio weight function Wplp_i.

Then, a first low-pressure opening αLP1 is calculated by the following equation (103):

$$\alpha LP1(k) = \alpha LP(k - dint(k)) \quad (103)$$

In the above equation (103), a low-pressure opening αLP (k−dint(k)) is used as the first low-pressure opening αLP1 in control timing before the dead time dint because the low-pressure error EVNS_LP is estimated to have been caused by the state of the pressure ratio in the control timing before the dead time dint.

Figure 13:
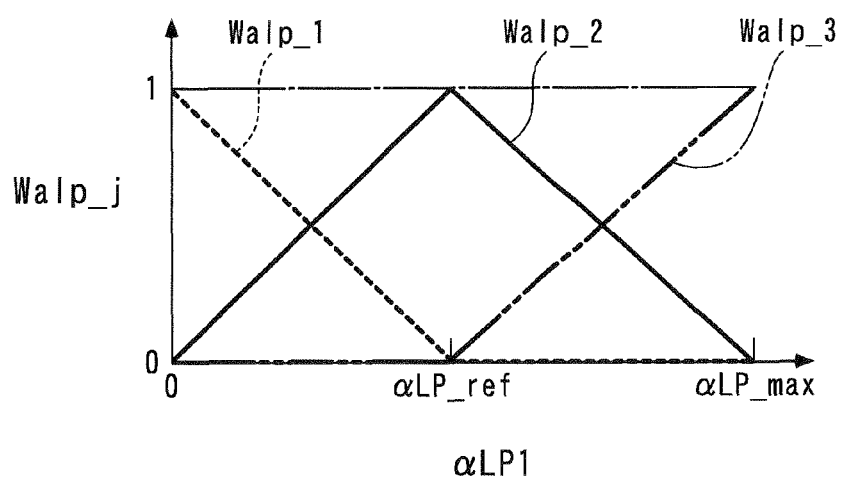
FIG. 13 is a view showing an example of a map for use in calculating a first low-pressure opening weight function Walp_j.

Next, a first low-pressure opening weight function Walp_j (j=1 to 3) is calculated by searching a map shown in FIG. 13 according to the first low-pressure opening αLP1. The first low-pressure opening weight function Walp_j is calculated as a vector composed of the elements of three values Walp_1, Walp_2, and Walp_3. In FIG. 13, αLP_ref represents a predetermined value of the low-pressure opening αLP, and αLP_max represents the maximum value of values of the low-pressure opening αLP, i.e. the first low-pressure opening αLP1 variable during operation of the engine 3. These points are similarly applied to the following description.

As shown in FIG. 13, when a region in which the first low-pressure opening αLP1 is variable is divided into two areas, i.e. an area of 0≤αLP1<αLP_ref and an area of αLP_ref≤αLP1≤αLP_max, the three first low-pressure opening weight functions Walp_j are set as described hereinafter, respectively. First, in the area of 0≤αLP1≤αLP_ref, the first low-pressure opening weight function Walp_1 is set to a maximum value of 1 at αLP1=0 and to a smaller positive value as the first low-pressure opening αLP1 is larger, while in the area of αLP_ref≤αLP1≤αLP_max, it is set to 0.

In the area of 0≤αLP1<αLP_ref, the second first low-pressure opening weight function Walp_2 is set to a larger positive value as the first low-pressure opening αLP1 is larger, while in the area of αLP_ref≤αLP1≤αLP_max, it is set to a maximum value of 1 at αLP1=αLP_ref and to a smaller positive value as the first low-pressure opening αLP1 is larger. Further, in the area of 0≤αLP1<αLP_ref, the third first low-pressure opening weight function Walp_3 is set to 0, while in the area of αLP_ref≤αLP1≤αLP_max, it is set to a maximum value of 1 at αLP1=αLP_max and to a larger positive value as the first low-pressure opening αLP1 is larger.

Furthermore, the first and second first low-pressure opening weight functions Walp_1 and Walp_2 are set such that they cross each other in the area of 0≤αLP1<αLP_ref, and the sum thereof becomes equal to the maximum value 1 of each first low-pressure opening weight function Walp_j. Similarly, the second and third first low-pressure opening weight functions Walp_2 and Walp_3 are set such that they cross each other in the area of αLP_ref≤αLP1≤αLP_max, and the sum thereof becomes equal to the maximum value 1 of each first low-pressure opening weight function Walp_j.

Subsequently, a modified error WE_lp_ij is calculated by the following equation (104):

$$WE\_lp\_ij(k) = Wplp\_i(k) \cdot Walp\_j(k) \cdot EVNS\_LP(k) \quad (104)$$

The modified error WE_lp_ij is calculated as a matrix composed of the elements of nine values, by multiplying the low-pressure error EVNS_LP by the two kinds of weight functions Wplp_i and Walp_j, and hence it is calculated as a value obtained by distributing the low-pressure error EVNS_LP to four areas formed by combining the two areas of the first LP pressure ratio Rplp1 and the two areas of the first low-pressure opening αLP1, and weighting the distribution using the values Wplp_i and Walp_j.

Further, a low-pressure local correction value D_lp_ij is calculated with a sliding mode control algorithm expressed by the following equations (105) and (106):

$$\sigma lp\_ij(k) = WE\_lp\_ij(k) - POLE\_v \cdot WE\_lp\_ij(k-1) \quad (105)$$

$$D\_lp\_ij(k) = Krch\_v \cdot \sigma lp\_ij(k) + Kadp\_v \cdot \sum_{n=0}^{k} \sigma lp\_ij(n) \quad (106)$$

In the above equation (105), σlp_ij represents a switching function, and POLE_v represents a switching function-setting parameter set such that the relationship of −1<POLE_v<0 holds. Further, in the above equation (106), Krch_v represents a predetermined reaching law gain, and Kadp_v represents a predetermined adaptive law gain.

As described above, the low-pressure local correction value D_lp_ij is calculated as a matrix composed of the elements of nine values for causing the modified error WE_lp_ij, i.e. the low-pressure error EVNS_LP to converge to 0. In other words, the low-pressure local correction value D_lp_ij is calculated such that the estimated value dGafm_hat of the fresh air flow rate is caused to converge to the fresh air flow rate dGafm.

Further, a second LP pressure ratio Rplp2 is calculated by the following equation (107):

$$Rplp2(k) = \frac{Pin\_hat(k-1)}{Pex(k-1)} \quad (107)$$

Figure 14:
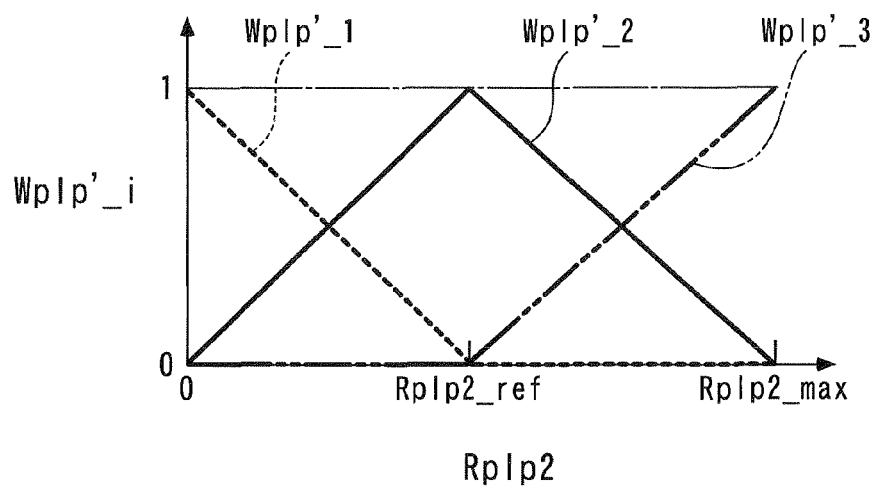
FIG. 14 is a view showing an example of a map for use in calculating a second LP pressure ratio weight function Wplp'_i.

Then, a second LP pressure ratio weight function Wplp'_i (i=1 to 3) is calculated by searching a map shown in FIG. 14 according to the second LP pressure ratio Rplp2. In FIG. 14, Rplp2_ref represents a predetermined value of the second LP pressure ratio Rplp2, and Rplp2_max represents the maximum value of values of the second LP pressure ratio Rplp2 variable during the operation of the engine 3. This FIG. 14 map is equivalent to a map obtained by replacing, in the above-mentioned FIG. 12 map, the first LP pressure ratio Rplp1 on the horizontal axis with the second LP pressure ratio Rplp2, and the three first LP pressure ratio weight functions Wplp_i with the three second LP pressure ratio weight functions Wplp'_i, respectively, and detailed description thereof is omitted.

Subsequently, a second low-pressure opening αLP2 is calculated by the following equation (108):

$$\alpha LP2(k) = \alpha LP(k-1) \quad (108)$$

Figure 15:
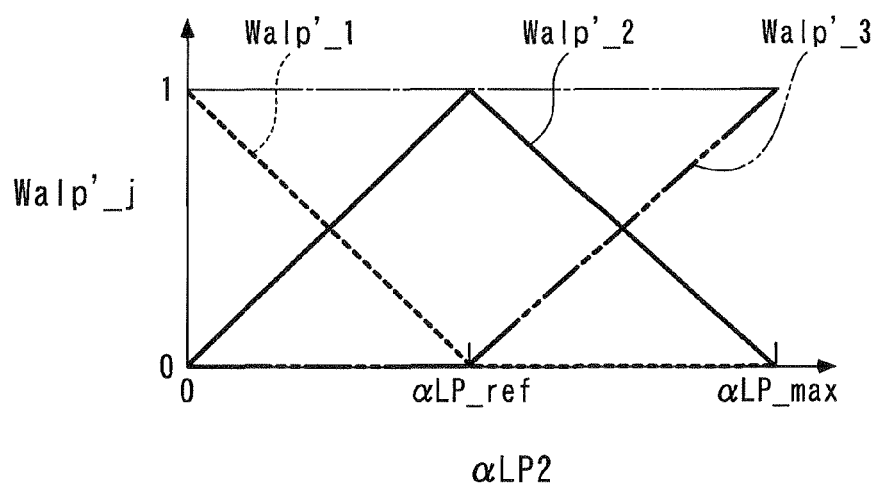
FIG. 15 is a view showing an example of a map for use in calculating a second low-pressure opening weight function Walp'_j.

Next, a second low-pressure opening weight function Walp'_j (j=1 to 3) is calculated by searching a map shown in FIG. 15 according to the second low-pressure opening αLP2. This FIG. 15 map corresponds to a map obtained by replacing, in the above-mentioned FIG. 13 map, the first low-pressure opening αLP1 on the horizontal axis with the second low-pressure opening αLP2, and the three first low-pressure opening weight functions Walp'_j with the three second low-pressure opening weight functions Walp'_j, respectively, and detailed description thereof is omitted.

Then, finally, the low-pressure modification value KVNS_LP is calculated by the following equation (109):

$$KVNS\_LS(k) = \sum_{i=1}^{3} \sum_{j=1}^{3} Wplp'\_i(k) \cdot Walp'\_j(k) \cdot D\_lp\_ij(k) \quad (109)$$

As described hereinabove, the low-pressure modification value KVNS_LP is calculated as the total sum of values obtained by multiplying the low-pressure local correction value D_lp_ij by the weight functions Wplp'_i and Walp'_j. In this case, the above-described first and second LP pressure ratios Rplp1 and Rplp2 are pressure ratios between the estimated value Pin_hat of the intake pressure and the exhaust pressure Pex, which are different from each other in calculation timing, and the first low-pressure opening αLP1 and the second low-pressure opening αLP2 are the low-pressure openings αLP different from each other in calculation timing. Therefore, the low-pressure modification value KVNS_LP is calculated a total sum of values weighted in respective four areas formed by combining the two areas of the pressure ratio and the two areas of the low-pressure opening αLP, such that the low-pressure error EVNS_LP converges to 0. Therefore, even when a modeling error occurs in a model used by the inert gas-estimating section 60, generating an error EVNS, i.e. a low-pressure error EVNS_LP, it is possible to accurately correct the modeling error in each area defined by the pressure ratio and the low-pressure opening αLP by using the low-pressure modification value KVNS_LP calculated as described above.

Next, a description will be given of the aforementioned high-pressure modification value-calculating section 77. As will be described hereinafter, the high-pressure modification value-calculating section 77 calculates the high-pressure modification value KVNS_HP by the same method as employed by the low-pressure modification value-calculating section 76 described hereinabove.

First, a first HP pressure ratio Rphp1 is calculated by the following equation (110):

$$Rphp1(k) = \frac{Pch\_hat(k - dint(k))}{Pem(k - dint(k))} \tag{110}$$

In the above equation (110), an estimated value Pch_hat (k−dint(k)) of the intake chamber pressure before the dead time dint, and an exhaust manifold pressure Pem(k−dint(k)) before the dead time dint are used for the same reason as given in the description of the method of calculating the low-pressure modification value KVNS_LP.

Figure 16:
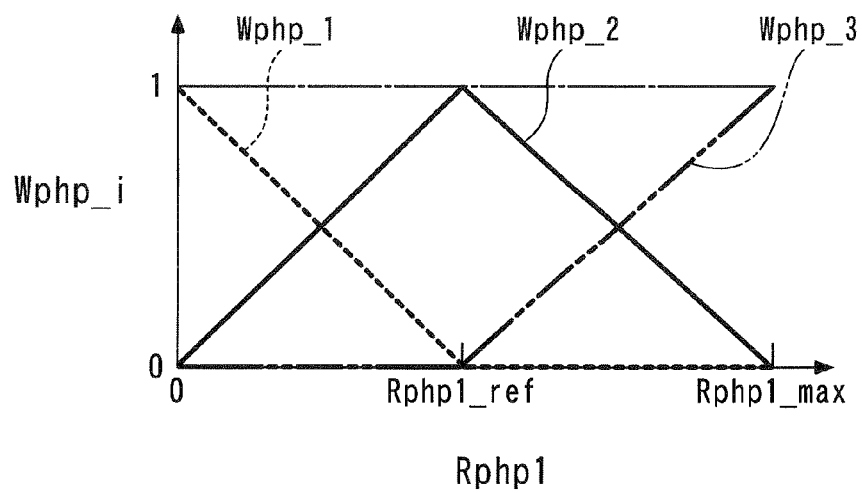
FIG. 16 is a view showing an example of a map for use in calculating a first HP pressure ratio weight function Wphp_i.

Then, a first HP pressure ratio weight function Wphp_i (i=1 to 3) is calculated by searching a map shown in FIG. 16 according to the first HP pressure ratio Rphp1. The first HP pressure ratio weight function Wphp_i is calculated as a vector composed of the elements of three values Wphp_1, Wphp_2, and Wphp_3. In FIG. 16, Rphp1_ref represents a predetermined value of the first HP pressure ratio Rphp1, and Rphp1_max represents the maximum value of values of the first HP pressure ratio Rphp1 variable during the operation of the engine 3.

Referring to FIG. 16, when a region in which the first HP pressure ratio Rphp1 is variable is divided into two areas, i.e. an area of 0≤Rphp1<Rphp1_ref and an area of Rphp1_ref≤Rphp1≤Rphp1_max, the three first HP pressure ratio weight functions Wphp_i are set as described hereinafter, respectively. First, in the area of 0≤Rphp1<Rphp1_ref, the first HP pressure ratio weight function Wphp_1 is set to a maximum value of 1 when Rphp1=0 holds and to a smaller positive value as the first HP pressure ratio Rphp1 is larger, while in the area of Rphp1_ref≤Rphp1≤Rphp1_max, it is set to 0.

In the area of 0≤Rphp1<Rphp1_ref, the second first HP pressure ratio weight function Wphp_2 is set to a larger positive value as the first HP pressure ratio Rphp1 is larger, while in the area of Rphp1_ref≤Rphp1≤Rphp1_max, it is set to a maximum value of 1 at Rphp1=Rphp1_ref and to a smaller positive value as the first HP pressure ratio Rphp1 is larger. Further, in the area of 0≤Rphp1<Rphp1_ref, the third first HP pressure ratio weight function Wphp_3 is set to 0, while in the area of Rphp1_ref≤Rphp1≤Rphp1_max, it is set to a maximum value of 1 at Rphp1=Rphp1_max and to a larger positive value as the first HP pressure ratio Rphp1 is larger.

Furthermore, the first and second first HP pressure ratio weight functions Wphp_1 and Wphp_2 are set such that they cross each other in the area of 0≤Rphp1<Rphp1_ref, and the sum thereof becomes equal to the maximum value 1 of each first HP pressure ratio weight function Wphp_i. Similarly, the second and third first HP pressure ratio weight functions Wphp_2 and Wphp_3 are set such that they cross other in the area of Rphp1_ref≤Rphp1≤Rphp1_max, and the sum thereof becomes equal to the maximum value 1 of each first HP pressure ratio weight function Wphp_i.

Then, a first high-pressure opening αHP1 is calculated by the following equation (111):

$$\alpha HP1(k) = \alpha HP(k = dint(k)) \tag{111}$$

In the above equation (111), a high-pressure opening αHP (k−dint(k)) is used as the first high-pressure opening αHP1 in the control timing before the dead time dint because the high-pressure error EVNS_HP is estimated to have been caused by the state of the pressure ratio in the control timing before the dead time dint.

Figure 17:
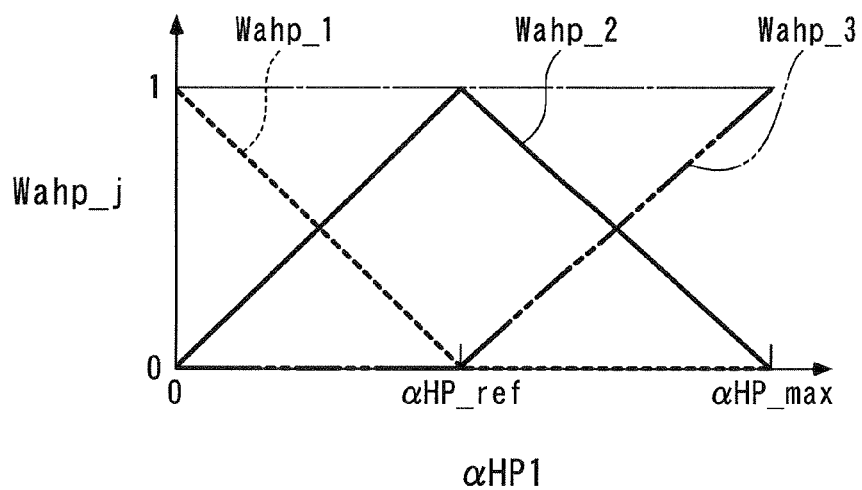
FIG. 17 is a view showing an example of a map for use in calculating a first high-pressure opening weight function Wahp_j.

Next, a first high-pressure opening weight function Wahp_j (j=1 to 3) is calculated by searching a map shown in FIG. 17 according to the first high-pressure opening αHP1. The first high-pressure opening weight function Wahp_j is calculated as a vector composed of the elements of three values Wahp_1, Wahp_2, and Wahp_3. In FIG. 17, αHP_ref represents a predetermined value of the high-pressure opening αHP, and αHP_max represents the maximum value of values of the high-pressure opening αHP, i.e. the first high-pressure opening αHP1 variable during the operation of the engine 3. These points are similarly applied to the following description.

As shown in FIG. 17, when a region in which the first high-pressure opening αHP1 is variable is divided into two areas, i.e. an area of 0≤αHP1<αHP_ref and an area of αHP_ref≤αHP1≤αHP_max, the three first high-pressure opening weight functions Wahp_j are set as described hereinafter, respectively. First, in the area of 0≤αHP1<αHP_ref, the first first high-pressure opening weight function Wahp_1 is set to a maximum value of 1 at αHP1=0 and to a smaller positive value as the first high-pressure opening αHP1 is larger, while in the area of αHP_ref≤αHP1≤αHP_max, it is set to 0.

In the area of 0≤αHP1<αHP_ref, the second first high-pressure opening weight function Wahp_2 is set to a larger positive value as the first high-pressure opening αHP1 is larger, while in the area of αHP_ref≤αHP1≤αHP_max, it is set to a maximum value of 1 at αHP1=αHP1_ref and to a smaller positive value as the first high-pressure opening αHP1 is larger. Further, in the area of 0≤αHP1<αHP_ref, the third first high-pressure opening weight function Wahp_3 is set to 0, while in the area of αHP_ref≤αHP1≤αHP_max, it is set to a maximum value of 1 at αHP1=αHP_max and to a larger positive value as the first high-pressure opening αHP1 is larger.

Furthermore, the first and second first high-pressure opening weight functions Wahp_1 and Wahp_2 are set such that they cross each other in the area of 0≤αHP1<αHP_ref, and the sum thereof becomes equal to the maximum value 1 of each first high-pressure opening weight function Wahp_j. Similarly, the second and third first high-pressure opening weight functions Wahp_2 and Wahp_3 are set such that they cross each other in the area of αHP_ref≤αHP1≤αHP_max, and the sum thereof becomes equal to the maximum value 1 of each first high-pressure opening weight function Wahp_j.

Subsequently, a modified error WE_hp_ij is calculated by the following equation (112):

$$WE\_hp\_ij(k) = Wphp\_i(k) \cdot Wahp\_j(k) \cdot EVNS\_HP(k) \tag{112}$$

The modified error WE_hp_ij is calculated as a matrix composed of the elements of nine values, by multiplying the high-pressure error EVNS_HP by the two kinds of weight functions Wphp_i and Wahp_j, and hence it is calculated as a value obtained by distributing the high-pressure error EVNS_HP to four areas formed by combining the two areas of the first HP pressure ratio Rphp1 and the two areas of the first high-pressure opening αHP1, thereby weighting the distribution with the values Wphp_i and Wahp_j.

Further, a high-pressure local correction value D_hp_ij is calculated with a sliding mode control algorithm expressed by the following equations (113) and (114):

$$\sigma\text{hp\_ij}(k) = \text{WE\_hp\_ij}(k) - \text{POLE\_v} \cdot \text{WE\_hp\_ij}(k-1) \quad (113)$$

$$\text{D\_hp\_ij}(k) = \text{Krch\_v} \cdot \sigma\text{hp\_ij}(k) + \text{Kadp\_v} \cdot \sum_{n=0}^{k} \sigma\text{hp\_ij}(n) \quad (114)$$

In the above equation (113), σhp_ij represents a switching function, and POLE_v represents a switching function-setting parameter set such that the relationship of $-1<\text{POLE\_v}<0$ holds. Further, in the above equation (114), Krch_v represents a predetermined reaching law gain, and Kadp_v represents a predetermined adaptive law gain.

As described above, the high-pressure local correction value D_hp_ij is calculated as a matrix composed of the elements of nine values for causing the modified error WE_hp_ij, i.e. the high-pressure error EVNS_HP to converge to 0. In other words, the high-pressure local correction value D_hp_ij is calculated such that the estimated value dGafm_hat of the fresh air flow rate is caused to converge to the fresh air flow rate dGafm.

Further, a second HP pressure ratio Rphp2 is calculated by the following equation (115):

$$Rphp2(k) = \frac{\text{Pch\_hat}(k-1)}{\text{Pem}(k-1)} \quad (115)$$

Figure 18:
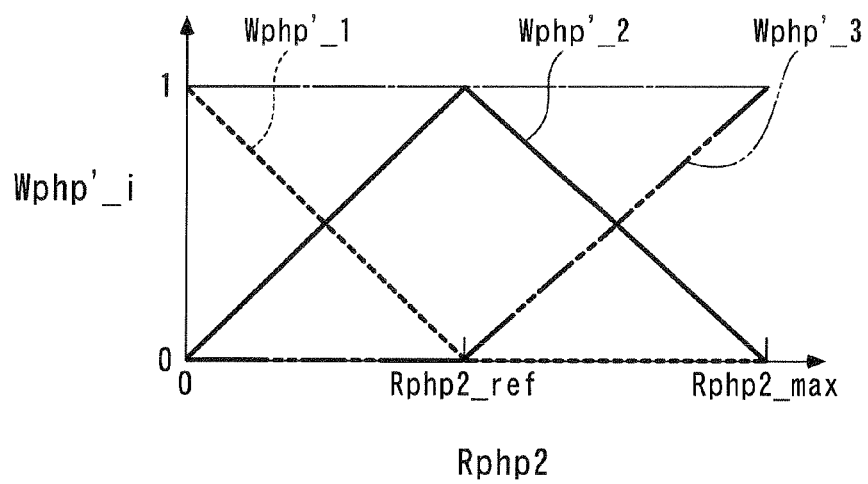
FIG. 18 is a view showing an example of a map for use in calculating a second HP pressure ratio weight function Wphp'_i.

Then, a second HP pressure ratio weight function Wphp'_i (i=1 to 3) is calculated by searching a map shown in FIG. 18 according to the second HP pressure ratio Rphp2. In FIG. 18, Rphp2_ref represents a predetermined value of the second HP pressure ratio Rphp2, and Rphp2_max represents the maximum value of values of the second HP pressure ratio Rphp2 variable during the operation of the engine 3. This FIG. 18 map corresponds to a map obtained by replacing, in the above-mentioned FIG. 16 map, the first HP pressure ratio Rphp1 on the horizontal axis with the second HP pressure ratio Rphp2, and the three first HP pressure ratio weight functions Wphp_i with the three second HP pressure ratio weight functions Wphp'_i, respectively, and detailed description thereof is omitted.

Subsequently, a second high-pressure opening αHP2 is calculated by the following equation (116):

$$\alpha HP2(k) = \alpha HP(k-1) \quad (116)$$

Figure 19:
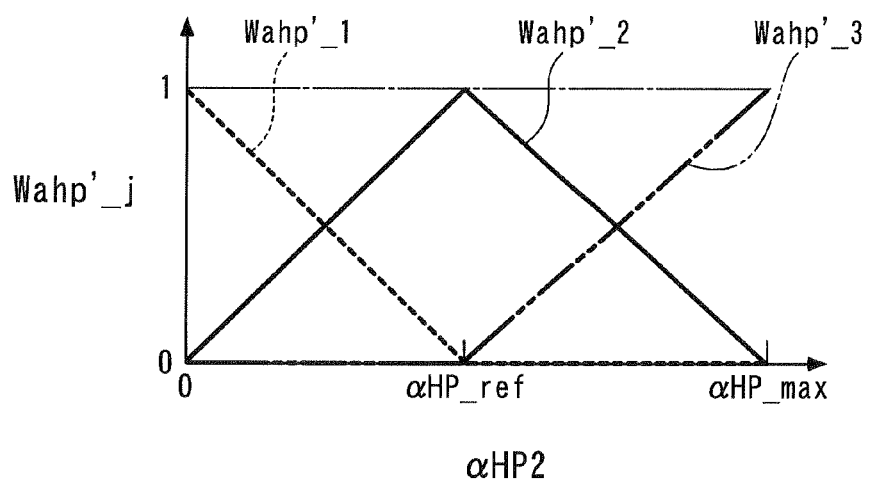
FIG. 19 is a view showing an example of a map for use in calculating a second high-pressure opening weight function Wahp'_j.

Next, a second high-pressure opening weight function Wahp'_j (j=1 to 3) is calculated by searching a map shown in FIG. 19 according to the second high-pressure opening αHP2. This FIG. 19 map is equivalent to a map obtained by replacing, in the above-mentioned FIG. 17 map, the first high-pressure opening αHP1 on the horizontal axis with the second high-pressure opening αHP2, and the three first high-pressure opening weight functions Wahp_j with the three second high-pressure opening weight functions Wahp'_j, respectively, and detailed description thereof is omitted.

Then, finally, the high-pressure modification value KVNS_HP is calculated by the following equation (117):

$$\text{KVNS\_HS}(k) = \sum_{i=1}^{3} \sum_{j=1}^{3} \text{Wphp}'\_i(k) \cdot \text{Wahp}'\_j(k) \cdot \text{D\_hp\_ij}(k) \quad (117)$$

As described hereinabove, the high-pressure modification value KVNS_HP is calculated as the total sum of values obtained by multiplying the high-pressure local correction value D_hp_ij by the weight functions Wphp'_i and Wahp'_j. In this case, the above-described first and second HP pressure ratios Rphp1 and Rphp2 are pressure ratios between the estimated value Pch_hat of the intake chamber pressure and the exhaust manifold pressure Pem, which are different from each other in calculation timing, and the first high-pressure opening αHP1 and the second high-pressure opening αHP2 are the high-pressure openings αHP different from each other in calculation timing. Therefore, the high-pressure modification value KVNS_HP is calculated as a total sum of values weighted in respective four areas formed by combining the two areas of the pressure ratio and the two areas of the high-pressure opening αHP, such that the high-pressure error EVNS_HP converges to 0. Therefore, even when a modeling error occurs in a model used by the inert gas-estimating section 60, generating an error EVNS, i.e. a high-pressure error EVNS_HP, it is possible to accurately correct the modeling error in each area defined by the pressure ratio and the low-pressure opening αHP by using the high-pressure modification value KVNS_HP calculated as described above.

Next, a description will be given of the aforementioned low-pressure opening controller 80. The low-pressure opening controller 80 calculates a target low-pressure opening αLP_cmd with a control algorithm, described hereinafter. In the present embodiment, the low-pressure opening controller 80 corresponds to the EGR control means and the first EGR control input-calculating means, and the target low-pressure opening αLP_cmd corresponds to a first EGR control input. First, a low-pressure control input U_lp is calculated with a control algorithm to which is applied a sliding mode control algorithm, expressed by the following equations (118) to (120).

$$\text{Eie\_lp}(k) = \text{dGiegr\_LP\_hat}(k) - \text{dGiegr\_LP\_cmd}(k) \quad (118)$$

$$\sigma\text{ie\_lp}(k) = \text{Eie\_lp}(k) - \text{POLE\_lp} \cdot \text{Eie\_lp}(k-1) \quad (119)$$

$$U\_lp(k) = \text{Krch\_lp} \cdot \sigma\text{ie\_lp}(k) + \text{Kadp\_lp} \cdot \sum_{i=0}^{k} \sigma\text{ie\_lp}(i) + \frac{\text{dGiegr\_LP\_cmd}(k)}{\phi(k - \text{dlp\_hat}(k))} \quad (120)$$

As expressed by the above equation (118), a follow-up error Eie_lp (first difference) is calculated as the difference between the estimated value dGiegr_LP_hat of the low-pressure inert gas flow rate (amount of inert gas in the first EGR gas) and a target low-pressure inert gas flow rate dGiegr_LP_cmd. Further, in the equation (119), σie_lp represents a switching function, and POLE_lp represents a switching function-setting parameter set such that the relationship of $-1<\text{POLE\_lp}<0$ holds. Furthermore, in the above equation (120), Krch_lp represents a predetermined reaching law gain, and Kadp_lp represents a predetermined adaptive law gain.

Further, the third term dGiegr_LP_cmd(k)/φ(k−dlp_hat(k)) on the right side of the above equation (120) is a feedforward term for compensating for the response delay or dead time of the low-pressure EGR control valve 11c and the low-pressure EGR passage 11a. In this case, the low-pressure EGR control valve 11c is capable of directly controlling not the inert gas flow rate but the EGR amount, and therefore in the equation (120), a value obtained by converting the target low-pressure inert gas flow rate dGiegr_LP_cmd to the EGR amount is used as the feedforward term.

Then, the target low-pressure opening αLP_cmd is calculated using the thus calculated low-pressure control input U_lp by the following equation (121):

$$\alpha LP\_cmd(k) = Flp(U\_lp(k)) \quad (121)$$

In the above equation (121), Flp represents a conversion function for converting the low-pressure control input U_lp to the target low-pressure opening αLP_cmd. The target low-pressure opening αLP_cmd may be calculated by a method of searching a map according to the low-pressure control input U_lp, in place of the above equation (121).

As described above, the low-pressure opening controller 80 calculates the target low-pressure opening αLP_cmd with the control algorithm expressed by the following equations (118) to (120), to which is applied the sliding mode control algorithm, such that the estimated value dGiegr_LP_hat of the low-pressure inert gas flow rate is caused to converge to the target low-pressure inert gas flow rate dGiegr_LP_cmd. That is, the target low-pressure opening αLP_cmd is calculated such that not the estimated value of the flow rate of low-pressure inert gas flowing into the cylinders 3a but the estimated value of the flow rate of low-pressure inert gas flowing into the connecting portion 5c of the intake passage 5 becomes equal to a target value thereof. This is because the low-pressure EGR device 11 has characteristics that the response thereof is low and dead time is long due to the long distance over which the low-pressure EGR gas flows from the exhaust passage 10 to the cylinders 3a, and hence when the flow rate of low-pressure inert gas flowing into the cylinders 3a is controlled to its target value, controllability is degraded, thereby making it impossible to ensure high control accuracy. To avoid this inconvenience, the target low-pressure opening a LP_cmd is calculated as described above.

Figure 20:
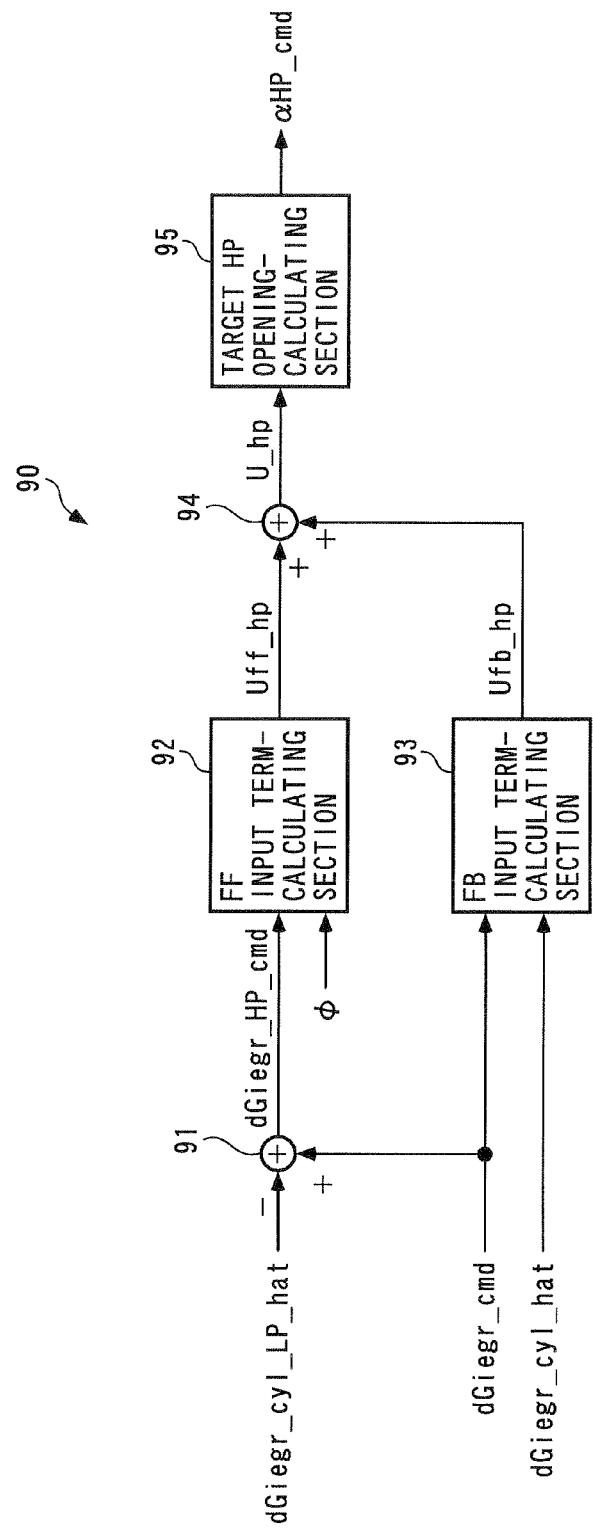
FIG. 20 is a diagram of a high-pressure opening controller.

Next, the aforementioned high-pressure opening controller 90 will be described with reference to FIG. 20. The high-pressure opening controller 90 calculates the target high-pressure opening αHP_cmd with a control algorithm, described hereinafter. In the present embodiment, the HP opening controller 90 corresponds to the EGR control means and the second EGR control input-calculating means, and the target high-pressure opening αHP_cmd corresponds to a second EGR control input. As shown in FIG. 20, the HP opening controller 90 includes a subtractor 91, a feedforward input term-calculating section 92, a feedback input term-calculating section 93, an adder 94, and a target high-pressure opening-calculating section 95.

First, the subtractor 91 calculates a target high-pressure inert gas flow rate dGiegr_HP_cmd by the following equation (122):

$$dGiegr\_HP\_cmd(k) = dGiegr\_cmd(k) - dGiegr\_cyl\_LP\_hat(k) \quad (122)$$

As expressed by the above equation (122), the target high-pressure inert gas flow rate dGiegr_HP_cmd is calculated by subtracting the estimated value dGiegr_cyl_LP_hat of the in-cylinder low-pressure inert gas flow rate from the target inert gas total flow rate dGiegr_cmd, and hence it is calculated as a value for supplementing the insufficient amount of inert gas supplied to the cylinders 3a by the low-pressure EGR device 11 using the high-pressure EGR device 12.

Then, the feedforward input term-calculating section 92 calculates a feedforward input term Uff_hp as a feedforward term, as described hereinafter. First, a target high-pressure EGR gas flow rate dGegr_HP_cmd is calculated by the following equation (123):

$$dGegr\_HP\_cmd(k) = \frac{dGiegr\_HP\_cmd(k)}{\phi(k - dhp\_hat(k))} \quad (123)$$

As expressed by the above equation (123), the target high-pressure EGR gas flow rate dGegr_HP_cmd is calculated by dividing the current value dGiegr_HP_cmd(k) of the target high-pressure inert gas flow rate by a detected equivalent ratio $\phi(k-dhp\_hat(k))$ in control timing before the estimated value dhp_hat of the dead time. This is because the high-pressure EGR control valve 12c can directly control not the inert gas flow rate but the EGR amount, and therefore in the equation (123), the target high-pressure inert gas flow rate dGiegr_HP_cmd is converted to the EGR amount to thereby cause dead time taken for exhaust gases to flow from the exhaust passage 10 to the intake chamber 5b via the high-pressure EGR passage 12a, to be reflected on a result of calculation of the target high-pressure EGR gas flow rate dGegr_HP_cmd.

Then, finally, the feedforward input term Uff_hp is calculated by the following equation (124):

$$Uff\_hp(k) = \frac{dGegr\_HP\_cmd(k) - Kff \cdot dGegr\_HP\_cmd(k-1)}{1 - Kff} \quad (124)$$

This equation (124) is derived by regarding the response delay of the high-pressure EGR control valve 12c as a first-order lag system and applying an inverse transfer function compensation method to the response delay. Further, in the equation (124), Kff represents a first-order lag compensation coefficient, and is set such that the relationship of 0<Kff≤1 holds.

On the other hand, the feedback input term-calculating section 93 calculates a feedback input term Ufb_hp with a sliding mode control algorithm expressed by the following equations (125) to (127):

$$Eie\_hp(k) = dGiegr\_cyl\_hat(k) - dGiegr\_cmd(k) \quad (125)$$

$$\sigma ie\_hp(k) = Eie\_hp(k) - POLE\_hp \cdot Eie\_hp(k-1) \quad (126)$$

$$Ufb\_hp(k) = Krch\_hp \cdot \sigma ie\_hp(k) + Kadp\_hp \cdot \sum_{i=0}^{k} \sigma ie\_hp(i) \quad (127)$$

As expressed by the above equation (125), a follow-up error Eie_hp is calculated as the difference between the estimated value dGiegr_cyl_hat of the in-cylinder inert gas total flow rate and the target inert gas total flow rate dGiegr_cmd. In the present embodiment, the follow-up error Eie_hp corresponds to the second difference, the estimated value dGiegr_cyl_hat of the in-cylinder inert gas total flow rate to the total amount of inert gas, and the target inert gas total flow rate dGiegr_cmd to a predetermined second target value. Further, in the above equation (126), σie_hp represents a switching function, and POLE_hp represents a switching function-setting parameter set such that the relationship of −1<POLE_lp<POLE_hp<0 holds. The reason why the values of the two switching function-setting parameters POLE_lp and POLE_hp are set to have the above-mentioned relationship will be described hereinafter. Furthermore, in the above equation (127), Krch_hp represents a predetermined reaching law gain, and Kadp_hp represents a predetermined adaptive law gain.

With the above-described control algorithm, the feedback input term Ufb_hp is calculated such that the estimated value dGiegr_cyl_hat of the in-cylinder inert gas total flow rate is caused to converge to the target inert gas total flow rate dGiegr_cmd.

Further, the adder 94 calculates a high-pressure control input U_hp as the sum of the feedforward input term Uff_hp and the feedback input term Ufb_hp, as expressed by the following equation (128):

$$U\_hp(k)=U\!f\!f\_hp(k)+U\!f\!b\_hp(k) \quad (128)$$

Then, the target high-pressure opening-calculating section 95 calculates the target high-pressure opening αHP_cmd using the high-pressure control input U_hp calculated as above, by the following equation (129):

$$\alpha HP\_cmd(k)=Fhp(U\_hp(k)) \quad (129)$$

In the above equation (129), Fhp represents a conversion function for converting the high-pressure control input U_hp to the target high-pressure opening αHP_cmd. The target high-pressure opening αHP_cmd may be calculated by a method of searching a map according to the high-pressure control input U_lp, in place of the above equation (129).

As described above, the high-pressure opening controller 90 calculates the target high-pressure opening αHP_cmd with the sliding mode control algorithm expressed by the following equations (125) to (127) such that the estimated value dGiegr_cyl_hat of the in-cylinder inert gas total flow rate is caused to converge to the target inert gas total flow rate dGiegr_cmd. In this case, the low-pressure opening controller 80 and the high-pressure opening controller 90 use the sliding mode control algorithms, which are a kind of feedback control, so that if the convergence rate of the follow-up error Eie_lp in the low-pressure opening controller 80 to 0, and the convergence rate of the follow-up error Eie_hp in the high-pressure opening controller 90 to 0 are the same, there is a fear that the two feedback controls interfere with each other. In addition, as described hereinabove, the low-pressure EGR device 11 has the characteristic that the response thereof is lower than that of the high-pressure EGR device 12 since the low-pressure EGR device 11 has a longer path for supplying EGR gas.

Therefore, in the present embodiment, in order that the convergence rate of the follow-up error Eie_hp in the high-pressure opening controller 90, which controls one of the devices 11 and 12 with the higher response, to 0 is made faster than the convergence rate of the follow-up error Eie_lp in the low-pressure opening controller 80 to 0, and that the two feedback controls of the two controllers 80 and 90 are prevented from interfering with each other, the two switching function-setting parameters POLE_lp and POLE_hp are set such that the relationship of POLE_lp<POLE_hp holds.

Although in the low-pressure opening controller 80 and the high-pressure opening controller 90, the target low-pressure opening αLP_cmd and the target high-pressure opening αHP_cmd are calculated with the sliding mode control algorithms, by way of example, this is not limitative, but the controllers 80 and 90 may be configured such that they calculate the above values with feedback control algorithms, such as a back-stepping control algorithm, a model prediction control algorithm, and a PID control algorithm.

Next, the EGR control process executed by the ECU 2 according to the present embodiment will be described with reference to FIG. 21. As will be described hereinafter, the EGR control process controls the EGR amount, i.e. the amount of inert gas flowing into the cylinders 3a, by controlling the low-pressure opening αLP and the high-pressure opening αHP, and is executed at the aforementioned predetermined control period ΔT.

Figure 21:
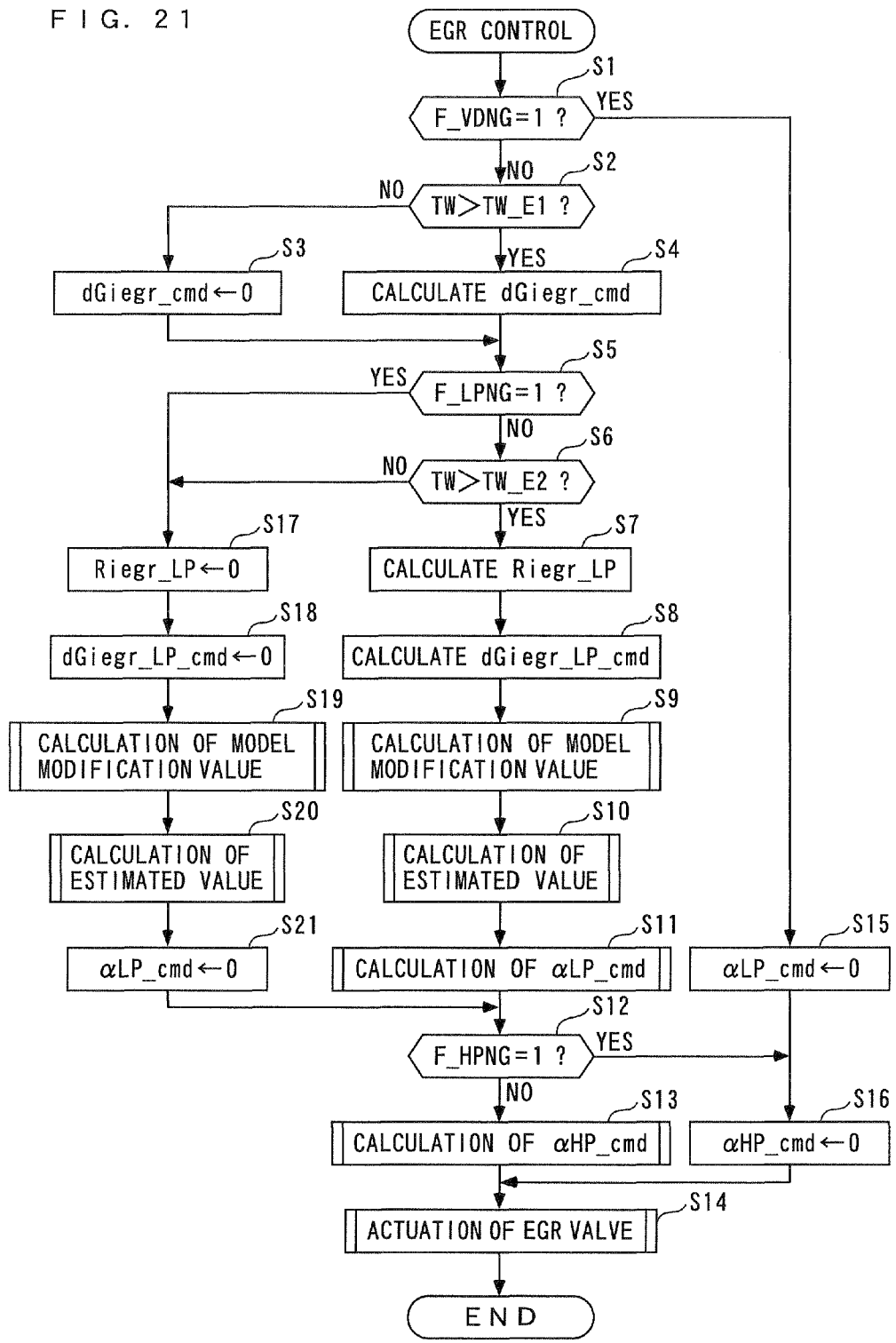
FIG. 21 is a flowchart of an EGR control process.

As shown in FIG. 21, first, in a step 1 (shown as S1 in abbreviated form in FIG. 21; the following steps are also shown in abbreviated form), it is determined whether or not an intake device failure flag F_VDNG is equal to 1. When it is determined in a determination process, not shown, that at least one of the aforementioned two intake shutter mechanisms 6 and 9 and turbocharger 7 is faulty, the intake device failure flag F_VDNG is set to 1, and otherwise set to 0.

If the answer to the question of the step 1 is negative (NO), i.e. if the two intake shutter mechanisms 6 and 9 and the turbocharger 7 are all normal, the process proceeds to a step 2, wherein it is determined whether or not the engine coolant temperature TW is higher than a first predetermined temperature TW_E1. If the answer to this question is negative (NO), it is determined that the engine coolant temperature TW is low, and no inert gas should be supplied to the cylinders 3a, and the process proceeds to a step 3, wherein the target inert gas total flow rate dGiegr_cmd is set to 0.

On the other hand, if the answer to the question of the step 2 is affirmative (YES), it is determined that inert gas should be supplied to the cylinders 3a, and the process proceeds to a step 4, wherein the target inert gas total flow rate dGiegr_cmd is calculated by the method of searching the FIG. 4 map, as described heretofore.

In a step 5 following the above-described step 3 or 4, it is determined whether or not a low-pressure failure determination flag F_LPNG is equal to 1. When it is determined in a determination process, not shown, that the aforementioned low-pressure EGR control valve 11c is faulty, the low-pressure failure determination flag F_LPNG is set to 1, and otherwise set to 0.

If the answer to the question of the step 5 is negative (NO), i.e. if the low-pressure EGR control valve 11c is normal, the process proceeds to a step 6, wherein it is determined whether or not the engine coolant temperature TW is higher than a second predetermined temperature TW_E2. This second predetermined temperature TW_E2 is set to a value higher than the first predetermined temperature TW_E1.

If the answer to the question of the step 6 is affirmative (YES), it is determined that an LP inert gas supply operation by the low-pressure EGR device 11 should be executed, and the process proceeds to a step 7, wherein the low-pressure-side distribution ratio Riegr_LP is calculated by the method of searching the FIG. 5 map, as described heretofore.

Next, in a step 8, the target low-pressure inert gas flow rate dGiegr_LP_cmd is calculated by the aforementioned equation (1).

Next, the process proceeds to a step 9, wherein the low-pressure and high-pressure modification values KVNS_LP and KVNS_HP are calculated using the aforementioned equations (94) to (117) and the above-described methods of searching the maps in FIGS. 12 to 19.

In a step 10 following the step 9, an estimated value calculation process is carried out. This estimated value calculation process calculates the above-mentioned various estimated values, and specifically, is executed, as shown in FIG. 22.

Figure 22:
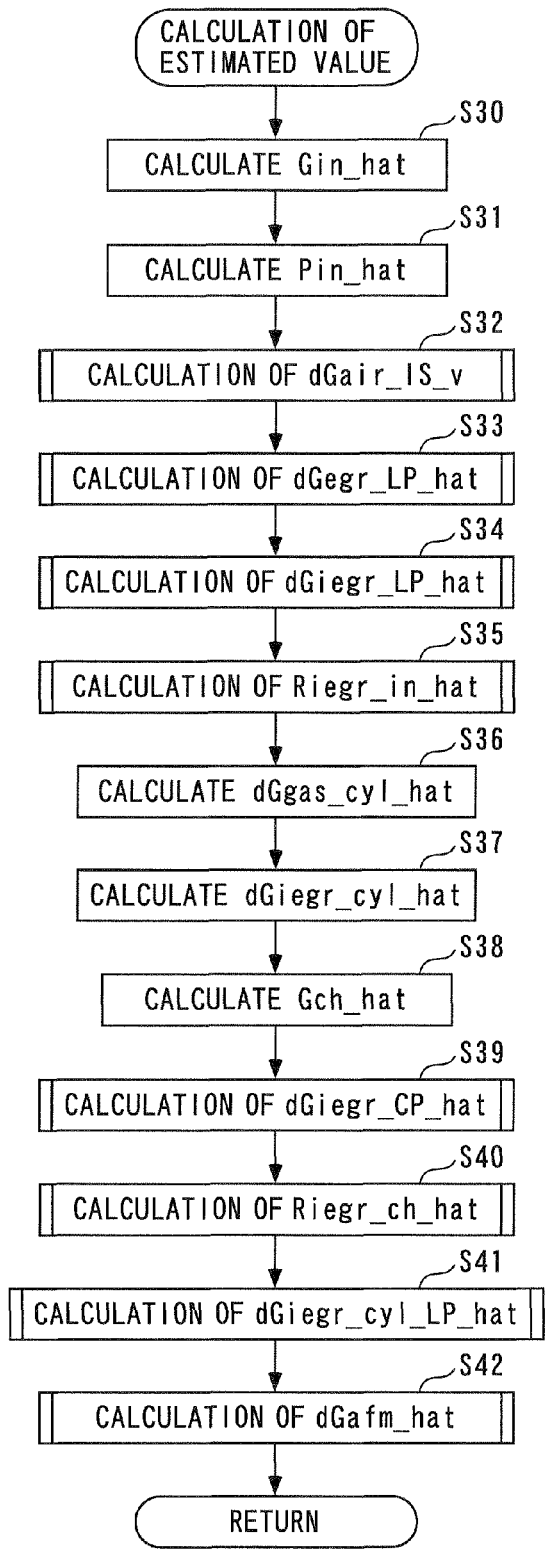
FIG. 22 is a flow chart of an estimated value calculation process.

Referring to FIG. 22, first, in a step 30, the estimated value Gin_hat of the connecting portion total gas amount is calculated by the aforementioned equation (58). Then, the process proceeds to a step 31, wherein the estimated value Pin_hat of the intake pressure is calculated by the aforementioned equation (59).

Next, in a step 32, the imaginary demanded value dGair_IS_v of the IS passing fresh air flow rate is calculated by the aforementioned equations (50) to (52). In a step 33 following the step 32, the estimated value dGegr_LP_hat of the low-pressure EGR gas flow rate is calculated by the aforementioned equations (53) to (57).

Subsequently, the process proceeds to a step 34, wherein the estimated value dGiegr_LP_hat of the low-pressure inert gas flow rate is calculated by the aforementioned equations (60) to (64). After that, in a step 35, the estimated value Riegr_in_hat of the in-intermediate-passage inert gas ratio is calculated by the aforementioned equations (65) and (66).

In a step 36 following the step 35, the estimated value dGgas_cyl_hat of the in-cylinder gas flow rate is calculated by the method of searching the FIG. 10 map, as described hereinabove, and then in a step 37, the estimated value dGiegr_cyl_hat of the in-cylinder inert gas total flow rate is calculated by the aforementioned equation (67).

Next, in a step 38, the estimated value Gch_hat of the chamber total gas amount is calculated by the aforementioned equation (68). After that, the process proceeds to a step 39, wherein the estimated value dGiegr_CP_hat of the chamber inert gas flow rate is calculated by the aforementioned equations (69) to (73).

In a step 40 following the step 39, the estimated value Riegr_ch_hat of the chamber inert gas ratio is calculated by the aforementioned equations (74) to (85), and then in a step 41, the estimated value dGiegr_cyl_LP_hat of the in-cylinder low-pressure inert gas flow rate is calculated by the aforementioned equations (86) to (88).

Next, the process proceeds to a step 42, wherein the estimated value dGafm_hat of the fresh air flow rate is calculated by the aforementioned equations (89) to (93), followed by terminating the present process.

Referring again to FIG. 21, after the estimated value calculation process in the step 10 is executed, as described above, the process proceeds to a step 11, wherein the target low-pressure opening αLP_cmd is calculated by the aforementioned equations (118) to (121).

Then, the process proceeds to a step 12, wherein it is determined whether or not a high-pressure failure determination flag F_HPNG is equal to 1. When it is determined in a determination process, not shown, that the aforementioned high-pressure EGR control valve 12c is faulty, the high-pressure failure determination flag F_HPNG is set to 1, and otherwise set to 0.

If the answer to the question of the step 12 is negative (NO), i.e. if the high-pressure EGR control valve 12c is normal, the process proceeds to a step 13, wherein the target high-pressure opening αHP_cmd is calculated by the aforementioned equations (122) to (129).

Then, the process proceeds to a step 14, wherein control input signals corresponding to the target low-pressure opening αLP_cmd and the target high-pressure opening αHP_cmd, calculated as above, are supplied to the low-pressure EGR control valve 11c and the high-pressure EGR control valve 12c, respectively, to thereby drive the EGR control valves 11c and 12c. This controls the low-pressure opening αLP and the high-pressure opening αHP such that they become equal to the target low-pressure opening αLP_cmd and the target high-pressure opening αHP_cmd, respectively. After the step 14 is executed, as described above, the present process is terminated.

On the other hand, if the answer to the question of the step 12 is affirmative (YES), i.e. if the high-pressure EGR control valve 12c is faulty, it is determined that an HP inert gas supply operation by the high-pressure EGR device 12 should not be executed, and the process proceeds to a step 16, wherein the target high-pressure opening αHP_cmd is set to 0. Then, the step 14 is executed, as described above. In this case, the target high-pressure opening αHP_cmd is set to 0, whereby the high-pressure EGR control valve 12c is caused to be fully closed, followed by terminating the present process.

On the other hand, if the answer to the question of the step 5 is affirmative (YES), i.e. if the low-pressure EGR control valve 11c is faulty, or if the answer to the question of the step 6 is negative (NO), i.e. if TW≤TW_E2 holds, it is determined that the LP inert gas supply operation by the low-pressure EGR device 11 should not be executed, and the process proceeds to a step 17, wherein the low-pressure-side distribution ratio Riegr_LP is set to 0. Then, in a step 18, the target low-pressure inert gas flow rate dGiegr_LP_cmd is set to 0.

Next, the process proceeds to a step 19, wherein the low-pressure and high-pressure modification values KVNS_LP and KVNS_HP are calculated by the same method as employed in the above-described step 9. In a step 20 following the step 19, the estimated value calculation process is executed by the same method as employed in the above-described step 10.

Then, in a step 21, the target low-pressure opening αLP_cmd is set to 0. After that, as described above, the step 12 et seq. is carried out, followed by terminating the present process.

On the other hand, if the answer to the question of the step 1 is affirmative (YES), i.e. if at least one of the two intake shutter mechanisms 6 and 9 and the turbocharger 7 is faulty, in respective steps 15 and 16, both the target low-pressure opening αLP_cmd and the target high-pressure opening αHP_cmd are set to 0. Then, as described hereinabove, the step 14 is executed. In this case, since the target low-pressure opening αLP_cmd and the target high-pressure opening αHP_cmd are both set to 0, both the low-pressure EGR control valve 11c and the high-pressure EGR control valve 12c are caused to be fully closed. The step 14 is executed, as described above, followed by terminating the present process.

Next, an intake device control process executed by the ECU 2 according to the present embodiment will be described with reference to FIG. 23. As described hereinafter, this intake device control process controls the flow rate and pressure of gases in the intake passage 5 by controlling the vane opening αtb, the intake shutter opening αin, and the high-pressure shutter opening αinHP, and is executed at the aforementioned predetermined control period ΔT.

Figure 23:
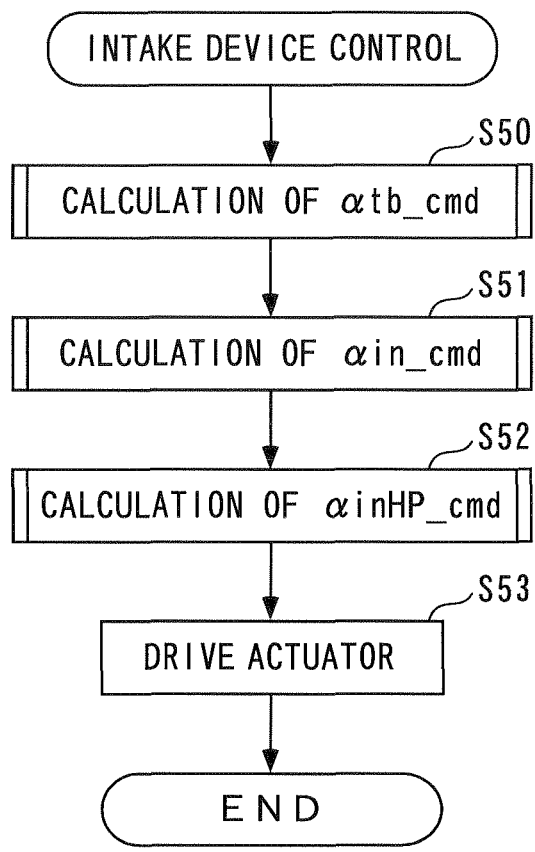
FIG. 23 is a flow chart of an intake device control process.

As shown in FIG. 23, first, in a step 50, the target vane opening αtb_cmd is calculated. This target vane opening αtb_cmd is normally calculated by the aforementioned equations (8) to (11), and when the predetermined high-pressure operating conditions, described hereinafter, are satisfied, it is calculated using an equation obtained by replacing the intake chamber pressure Pch and the target boost pressure Pch_cmd with a boost pressure Pboost and a target boost pressure Pboost_cmd. The boost pressure Pboost represents a pressure upstream of the high-pressure intake shutter 9a, and at the same time downstream of the compressor blade 7a, and is detected by a sensor, not shown.

Then, the process proceeds to a step 51, wherein the target intake shutter opening αin_cmd is calculated by the aforementioned equations (12) to (15).

Next, in a step 52, a target high-pressure shutter opening αinHP_cmd is calculated. Specifically, the target high-pressure shutter opening αinHP_cmd is normally set to a predetermined fully-open value so as to cause the high-pressure intake shutter 9a to be fully open, but only when the predetermined high-pressure operating conditions are satisfied, it is calculated with a feedback control algorithm such that the intake chamber pressure Pch converges to the target boost pressure Pch_cmd. In this case, while the high-pressure intake shutter 9a is being caused to be fully open, when the above-described target high-pressure opening αHP_cmd≠0 holds, and at the same time the differential pressure ΔP between the intake chamber pressure Pch and the exhaust manifold pressure Pem is lower than a predetermined value ΔPch_cp, it is determined that the predetermined high-pressure operating conditions are satisfied. Further, in the feedback control, a value obtained by subtracting the predetermined value ΔPch_cp from the exhaust manifold pressure Pem is used as the target boost pressure Pch_cmd.

In a step 53 following the step 52, control input signals corresponding to the three target openings αtb_cmd, αin_cmd, and αinHP_cmd calculated as above are supplied to the vane actuator 7d, the IS actuator 6b, and the high-pressure IS actuator 9b, respectively, to thereby drive the respective actuators 7d, 6b, and 9b. Thus, the vane opening αtb is controlled to the target vane opening αtb_cmd, the intake shutter opening αin is controlled to the target intake shutter opening αin_cmd, and the high-pressure shutter opening αinHP is controlled to the target high-pressure shutter opening αinHP_cmd, followed by terminating the present process.

Figure 24:
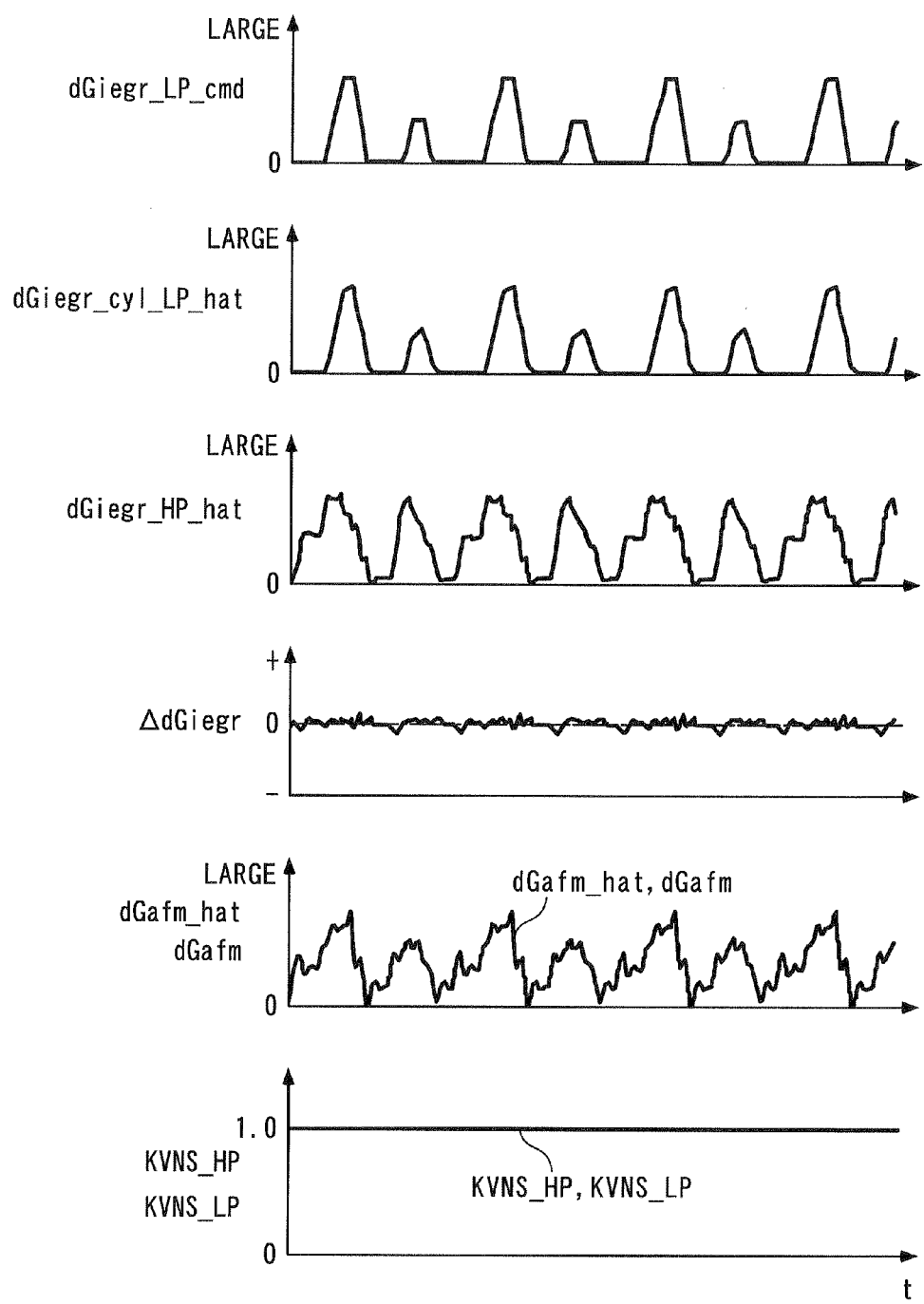
FIG. 24 is a timing diagram showing an example of results of a simulation in a case where models are configured such that there is no modeling error in EGR control by the EGR control apparatus according to the first embodiment.
Figure 25:
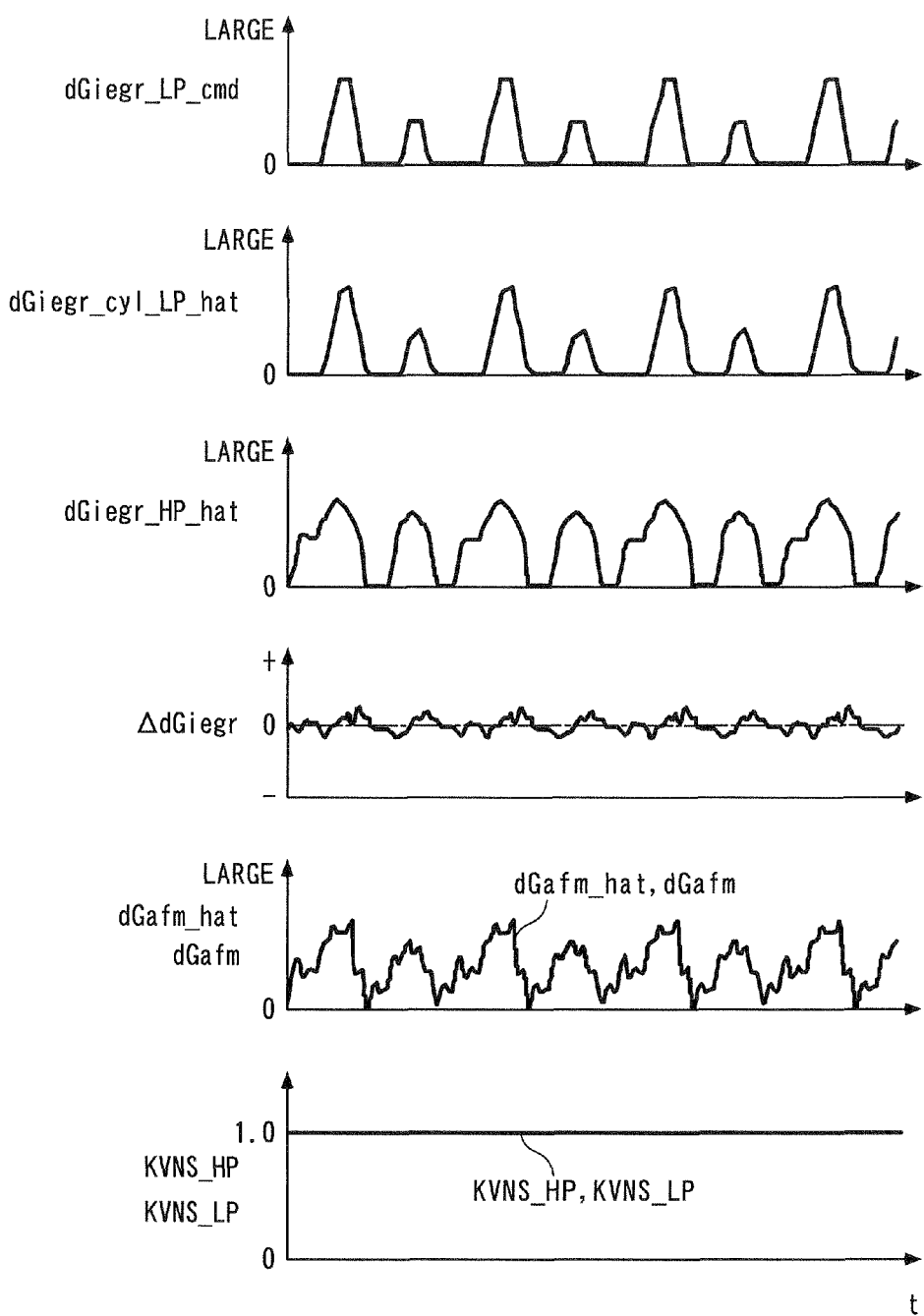
FIG. 25 is a timing diagram showing, for comparison, an example of results of a simulation in the case where the models are configured such that there is no modeling error, when an equation for calculating the target high-pressure inert gas flow rate dGiegr_HP_cmd is changed.
Figure 26:
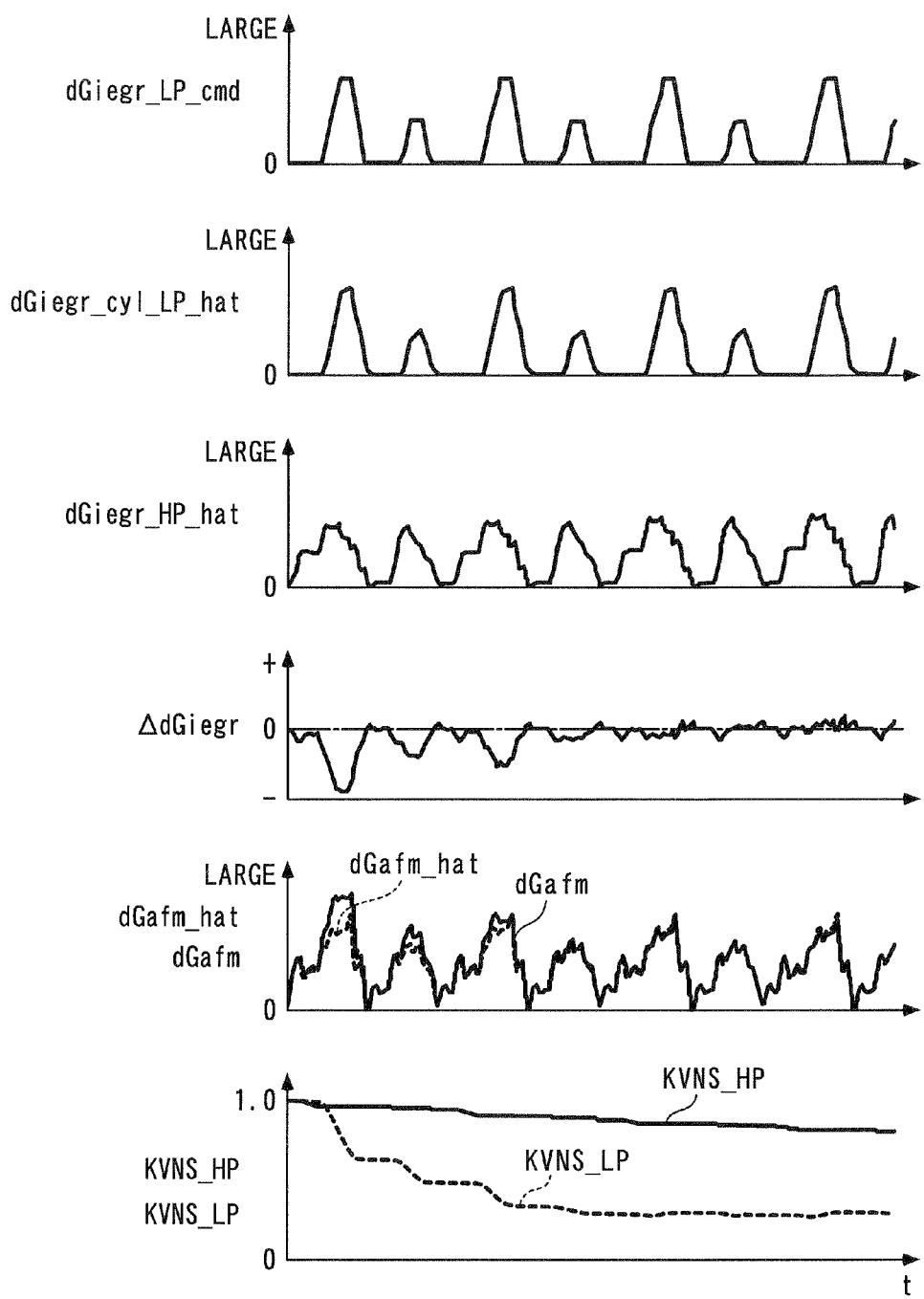
FIG. 26 is a timing diagram showing an example of results of a simulation in a case where the models are configured such that there is a modeling error in the EGR control by the EGR control apparatus according to the first embodiment.
Figure 27:
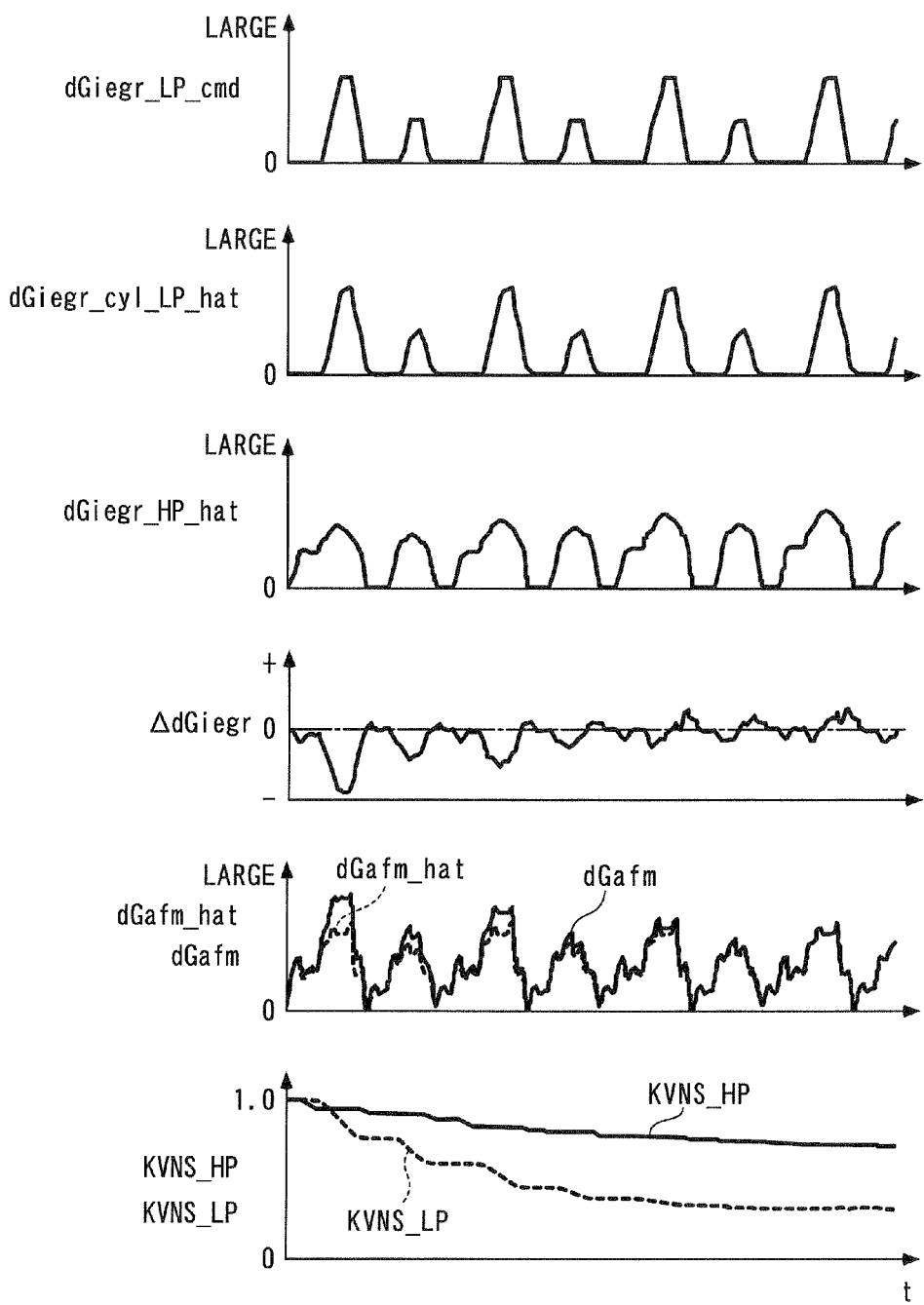
FIG. 27 is a timing diagram showing, for comparison, an example of results of a simulation in the case where the models are configured such that there is a modeling error, when the equation for calculating the target high-pressure inert gas flow rate dGiegr_HP_cmd is changed.

Next, a description will be given of results of a simulation of the EGR control which is carried out by the EGR control apparatus 1 configured as above according to the present embodiment (hereinafter referred to as the "control results"). First, FIG. 24 shows an example of the control results according to the present embodiment in a case where the above-described models are configured such that there is no modeling error, and FIG. 26 shows an example of the control results according to the present embodiment in a case where the above-described models are configured such that there is a modeling error. On the other hand, FIG. 25 shows, for comparison with the FIG. 24 example, an example of the control results in the case where the above-described models are configured such that there is no modeling error when the following equation (130) is used as the equation for calculating the target high-pressure inert gas flow rate dGiegr_HP_cmd in place of the aforementioned equation (122). FIG. 27 shows, for comparison with the FIG. 26 example, an example of the control results in the case where the above-described models are configured such that there is a modeling error when the following equation (130) is used as the equation for calculating the target high-pressure inert gas flow rate dGiegr_HP_cmd in place of the aforementioned equation (122).

$$dGiegr\_HP\_cmd(k)=dGiegr\_cmd(k)-dGiegr\_LP\_cmd(k) \quad (130)$$

As is clear from the comparison between the equation (130) and the aforementioned equation (122), the above comparative examples show the control results when the target high-pressure inert gas flow rate dGiegr_HP_cmd is calculated using the aforementioned target low-pressure inert gas flow rate dGiegr_LP_cmd, in place of the estimated value dGiegr_cyl_LP_hat of the in-cylinder low-pressure inert gas flow rate.

Further, in FIGS. 24 to 27, ΔdGiegr represents the difference between the estimated value dGiegr_cyl_hat of the in-cylinder inert gas total flow rate and the target inert gas total flow rate dGiegr_cmd (=dGiegr_cyl_hat−dGiegr_cmd).

First, referring to FIGS. 24 and 25, in the case of the control results shown therein, since the models are configured such that there is no modeling error, there is no need to correct modeling errors, and both the two modification values KVNS_LP and KVNS_HP are held at 1.0. Further, when the control results are compared, in the control results according to the present embodiment, the degree of deviation of the difference ΔdGiegr from 0 is small and ensures high control accuracy. In contrast, in the control results illustrated in the comparative example, the difference ΔdGiegr exhibits an oscillating repeated behavior about 0, and undergoes larger changes than those of the control results according to the present embodiment, whereby it is understood that the control accuracy is low.

Next, referring to FIGS. 26 and 27, in the case of the FIG. 26 control results according to the present embodiment, the absolute value of the difference ΔdGiegr is maximized immediately after the start of the simulation, and then as the control proceeds, it decreases since the model modified by the two modification values KVNS_LP and KVNS_HP becomes closer to the actual relationship between the parameters. After the estimated value dGafm_hat of the fresh air flow rate has become equal to the fresh air flow rate dGafm, the absolute value of the difference ΔdGiegr is in the vicinity of 0, whereby it is understood that it is possible to ensure high control accuracy. In contrast, in the case of the control results illustrated in the FIG. 27 comparative example, also after the estimated value dGafm_hat of the fresh air flow rate has become equal to the fresh air flow rate dGafm, the difference ΔdGiegr exhibits the oscillating repeated behavior about 0. Therefore, it is understood that the control accuracy is low. In other words, it is understood that the method of calculating the target high-pressure inert gas flow rate dGiegr_HP_cmd using the estimated value dGiegr_cyl_LP_hat of the in-cylinder low-pressure inert gas flow rate, which is employed in the present embodiment, can ensure a higher control accuracy than the method of using the target low-pressure inert gas flow rate dGiegr_LP_cmd, which is employed in the comparative example.

This is, as described hereinabove, because the low-pressure EGR device 11 has the characteristics that the response thereof is low and dead time is long due to the long distance over which the low-pressure EGR gas flows from the exhaust passage 10 to the cylinders 3a, and hence when the target high-pressure inert gas flow rate dGiegr_HP_cmd is calculated using the target low-pressure inert gas flow rate dGiegr_LP_cmd, in place of the estimated value dGiegr_cyl_LP_hat of the in-cylinder low-pressure inert gas flow rate, the controllability of the target high-pressure inert gas flow rate is lowered.

As described above, according to the EGR control apparatus 1 of the first embodiment, the low-pressure opening controller 80 calculates the target low-pressure opening αLP_cmd using the sliding mode control algorithm expressed by the aforementioned equations (118) to (120) such that the follow-up error Eie_lp which is the difference between the estimated value dGiegr_LP_hat of the low-pressure inert gas flow rate and the target low-pressure inert gas flow rate dGiegr_LP_cmd converges to 0. Then, the control input signal corresponding to the target low-pressure opening αLP_cmd is supplied to the low-pressure EGR control valve 11c, whereby the low-pressure opening αLP is controlled such that it becomes equal to the target low-pressure opening αLP_cmd. In other words, the low-pressure opening αLP is feedback-controlled such that the estimated value dGiegr_L-

P_hat of the low-pressure inert gas flow rate converges to the target low-pressure inert gas flow rate dGiegr_LP_cmd.

Further, the high-pressure opening controller 90 calculates the feedback input term Ufb_hp using the sliding mode control algorithm expressed by the aforementioned equations (125) to (127) such that the follow-up error Eie_hp which is the difference between the estimated value dGiegr_cyl_hat of the in-cylinder inert gas total flow rate and the target low-pressure inert gas flow rate dGiegr_LP_cmd converges to 0. Then, the control input signal corresponding to the target high-pressure opening αHP_cmd is supplied to the high-pressure EGR control valve 12c, whereby the high-pressure opening αHP is controlled such that it becomes equal to the target high-pressure opening αHP_cmd. In other words, the high-pressure opening αHP is feedback-controlled such that the estimated value dGiegr_cyl_hat of the in-cylinder inert gas total flow rate converges to the target inert gas total flow rate dGiegr_cmd.

Here, as described hereinabove, the convergence rate of the follow-up error Eie_hp to 0 is set to be higher than that of the follow-up error Eie_lp to 0, which makes it possible to prevent the feedback control by the low-pressure opening controller 80 and the feedback control by the high-pressure opening controller 90 from interfering with each other. Further, the low-pressure EGR device 11 has characteristics that it is higher in response delay and longer in dead time than the high-pressure EGR device 12, and hence even when the convergence rate of the follow-up error Eie_hp to 0 is set to be higher than that of the follow-up error Eie_lp to 0, the difference in response characteristics makes it possible to positively realize such convergence rates. Further, the high-pressure EGR device 12, which is high in responsiveness, can accurately supply an amount of inert gas which cannot be secured by the low-pressure EGR device 11 alone, which is low in responsiveness. In addition to this, the use of the response-designating control algorithm as the feedback control algorithm makes it possible to cause the two follow-up errors Eie_hp and Eie_lp to converge to 0 by exponential behaviors. From the above, it is possible to improve the stability of the combustion state, reduce exhaust emissions, and improve operability.

Further, in the case of the high-pressure opening controller, the target high-pressure opening αHP_cmd is calculated based on the sum of the feedforward input term Uff_hp and the feedback input term Ufb_hp. The feedforward input term Uff_hp is calculated by subtracting the estimated value dGiegr_cyl_LP_hat of the in-cylinder low-pressure inert gas flow rate from the target inert gas total flow rate dGiegr_cmd to thereby calculate the target high-pressure inert gas flow rate dGiegr_HP_cmd, and applying an inverse transfer function compensation method to the target high-pressure EGR gas flow rate dGegr_HP_cmd obtained by converting the target high-pressure inert gas flow rate dGiegr_HP_cmd to an EGR flow rate. Further, the feedback input term Ufb_hp is calculated, as described above, such that the difference Eie_hp between the estimated value dGiegr_cyl_hat of the in-cylinder inert gas total flow rate and the target inert gas total flow rate dGiegr_cmd converges to 0. Therefore, the target high-pressure opening αHP_cmd is calculated by the above-described method, and hence, if the amount of inert gas supplied to the cylinders 3a by the EGR control via the low-pressure EGR device 11 is insufficient, the EGR control by the high-pressure EGR device 12 is executed in a manner compensating for the insufficiency.

On the other hand, in the case of the low-pressure opening controller 80, the target low-pressure inert gas flow rate dGiegr_LP_cmd is calculated by the aforementioned equation (1), as the product of the low-pressure-side distribution ratio Riegr_LP and the target inert gas total flow rate dGiegr_cmd, and with the settings illustrated in FIG. 5, the low-pressure-side distribution ratio Riegr_LP is calculated such that when the combination of the engine speed NE and the demanded torque TRQDRV is in a predetermined region, Riegr_LP>50 holds, and at the same time, as the engine speed NE is higher or as the demanded torque TRQDRV is larger, it has a larger value.

Thus, when the combination of the engine speed NE and the demanded torque TRQDRV is in a predetermined region, Riegr_LP>50 holds, and hence the amount of inert gas in the low-pressure EGR gas supplied to the cylinders 3a is controlled to be larger than the amount of inter gas in the high-pressure EGR gas supplied to the cylinders 3a. Therefore, when it is necessary to lower the in-cylinder gas temperature and compression end temperature because of the engine 3 being in a region in which the engine load is medium or higher and at the same time the engine speed is medium or higher, a larger amount of the lower-temperature one of inert gas in the high-pressure EGR gas and inter gas in the low-pressure EGR gas can be supplied to the cylinders 3a. Moreover, the low-pressure-side distribution ratio Riegr_LP is calculated in a predetermined region such that it has a larger value as the engine speed NE is higher or the demanded torque TRQDRV is larger. Therefore, as a degree of demand of the low-temperature inert gas is larger because of the engine speed NE being higher or the load being larger, it is possible to appropriately supply in accordance with the demand a larger amount of low-temperature inert gas to the cylinder 3a, whereby it is possible to appropriately lower the in-cylinder gas temperature and the compression end temperature. With the control described above, it is possible to further improve the stability of combustion state, reduce exhaust emissions, and further improve operability.

Although in the first embodiment, the EGR control apparatus 1 of the present invention is applied to the diesel engine 3, by way of example, this is not limitative, but it can be applied to various types of engines other than the diesel engine, e.g. engines powered by gasoline, HPG, alcoholic fuel, or mixtures of gasoline and other kinds of fuel.

Further, although in the first embodiment, the high-pressure EGR device 12 is used as the second EGR device, by way of example, the second EGR device according to the present invention is not limited to this, but any suitable device may be used as the second EGR device insofar as it supplies EGR gas to the cylinders via a path shorter than that of the first EGR device. For example, a variable valve mechanism which changes the amount of burned gases remaining in the cylinders, i.e. an internal EGR amount by changing the valve-opening timing or the valve-closing timing of at least one of the intake valve and the exhaust valve may be used as the second EGR device. In this case, the target value of the internal EGR amount, the value of a control input signal delivered to the actuator of the variable valve mechanism, or the like may be calculated in place of the above-described target high-pressure opening αHP_cmd.

Further, in the present embodiment, as the load parameter, the demanded torque TRQDRV is employed by way of example, the load parameter in the present invention is not limited to this, but any suitable parameter may be employed insofar as it represents load on the engine. For example, the accelerator pedal opening AP may be used as the load parameter, for example.

On the other hand, although in the first embodiment, the sliding mode control algorithm expressed by the equations (118) to (120) and (125) to (127) is used as the predetermined first and second feedback control algorithms, by way of example, the predetermined first and second feedback control algorithms according to the present invention is not limited to this, but any suitable algorithm may be used as the predetermined first and second feedback control algorithms insofar as it is capable of causing the first difference and the second difference to converge to 0. For example, a feedback control algorithm, such as the back-stepping control algorithm, the model prediction control algorithm, or the PID control algorithm, may be used as the predetermined feedback control algorithm.

On the other hand, although in the first embodiment, the aforementioned equation (94) is used as the equation for calculating the error EVNS, by way of example, this is not limitative, but as the equation for calculating the error EVNS, there may be used the following equation (131):

$$EVNS(k) = \phi\_hat(k-1) - \phi(k-1) \quad (131)$$

In the above equation (131), $\phi\_hat$ represents the estimated value of the detected equivalent ratio and is calculated by the following equations (132) to (135):

$$Gcyl\_hat(k) = dGgas\_cyl\_hat(k) \cdot \frac{Ncyl \cdot NE(k)}{2 \cdot 60} \quad (132)$$

$$Giegr\_hat(k) = dGiegr\_cyl\_hat(k) \cdot \frac{Ncyl \cdot NE(k)}{2 \cdot 60} \quad (133)$$

$$Gair\_hat(k) = Gcyl\_hat(k) - Giegr\_hat(k) \quad (134)$$

$$\phi\_hat(k) = \frac{Gfuel(k)}{Gair\_hat(k)} \quad (135)$$

The above equations (132) to (134) correspond to equations obtained by replacing the five values Gcyl, dGgas_cyl, Giegr, dGiegr_cyl, and Gair of the aforementioned equations (47) to (49) with the respective estimated values Gcyl_hat, dGgas_cyl_hat, Giegr_hat, dGiegr_cyl_hat, and Gair_hat thereof. Further, in the above equation (135), Gfuel represents the fuel injection amount of fuel injected from each fuel injection valve 4, and is calculated in a fuel injection control process, not shown.

Figure 28:
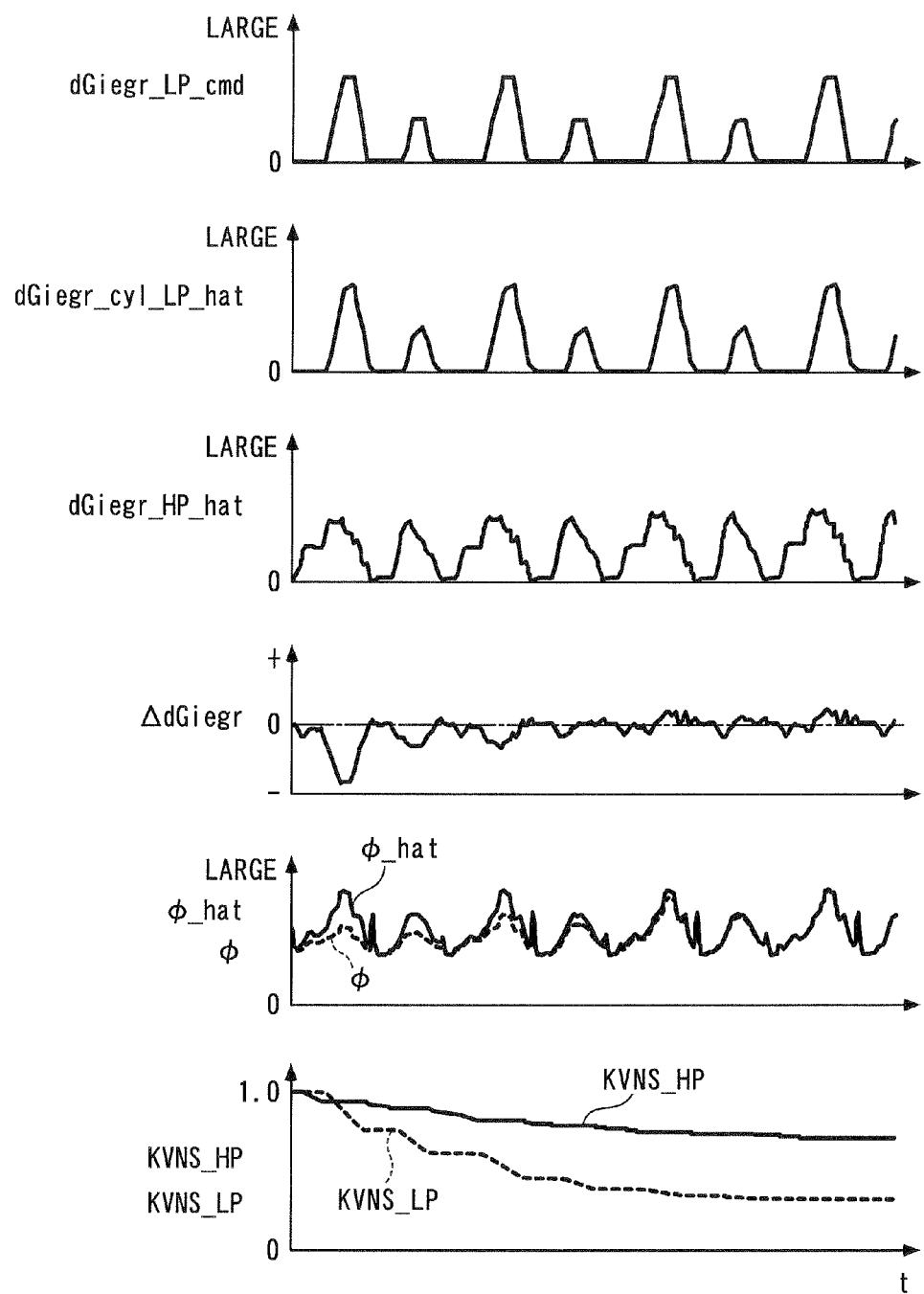
FIG. 28 is a timing diagram showing an example of results of a simulation in a case where an equation for calculating an error EVNS is changed and models are configured such that there is a modeling error, in the EGR control by the EGR control apparatus according to the first embodiment.

Here, assuming that the error EVNS is calculated by the above-described equation (131), it is necessary to use dead time taken for exhaust gases to flow from the cylinders 3a to the LAF sensor 28 in place of the aforementioned dead time dint, in calculating the two modification values KVNS_LP and KVNS_HP by the model modifier 70. FIG. 28 shows an example of the control results in a case where the error EVNS is calculated by the equation (131), the two modification values KVNS_LP and KVNS_HP are calculated using the dead time taken for exhaust gases to flow from the cylinders 3a to the LAF sensor 28, and the configuration is performed such that there is a modeling error.

In the case of the control results illustrated in FIG. 28, the absolute value of the difference ΔdGiegr, after being maximized immediately after the start of the simulation, decreases as the control proceeds, and is in the vicinity of 0 after the estimated value $\phi\_hat$ of the detected equivalent ratio becomes equal to the detected equivalent ratio $\phi$. Thus, it is understood that high control accuracy can be ensured, similarly to the control results described above with reference to FIG. 26.

Assuming that the method of the above-mentioned equation (131) using the results of detection by the LAF sensor 28 and the method of the aforementioned equation (94) using the results of detection by the air flow sensor 22 are compared with each other, as the methods of calculating the error EVNS, when the engine 3 is in a steady operating condition, the method of using the results of detection by the air flow sensor 22 is more excellent in the accuracy of correction of the modeling error than the method of using the results of detection by the LAF sensor 28. This is because the results of detection by the LAF sensor 28 is more liable to be adversely affected by variations in flow rate characteristics between the fuel injection valves 4, and aging thereof.

On the other hand, when the engine 3 is in a transient operating condition, the method of using the results of detection by the LAF sensor 28 is more excellent in the accuracy of correcting the modeling error than the method of using the results of detection by the air flow sensor 22. This is because the distance from the cylinders 3a to a detection position of the air flow sensor 22 is longer than the distance from the cylinders 3a to a detection position of the LAF sensor 28, whereby dead time in the air flow sensor 22 becomes longer than dead time in the LAF sensor 28. This makes the air flow sensor 22 liable to be lowered in the accuracy of estimating (calculating) dead time used for calculation of the error EVNS.

Further, although in the first embodiment, the low-pressure inert gas ratio RLP is calculated using the aforementioned equation (95), by way of example, the low-pressure inert gas ratio RLP may be calculated using the following equation (136):

$$RLP(k) = \frac{dGiegr\_LP\_cmd(k)}{dGiegr\_cmd(k)} \quad (136)$$

When the method of using the above equation (136) and the method of using the aforementioned equation (95) are compared with each other as the methods of calculating the low-pressure inert gas ratio RLP, the method of using the equation (95) calculates the estimated value dGiegr_cyl_LP_hat of the in-cylinder low-pressure inert gas flow rate while taking the delay and the dead time of the intake system into account, so that it is possible at normal times to ensure a higher calculation accuracy than in the case of using the equation (136).

On the other hand, when a large modeling error suddenly occurs in any of the various models described hereinabove e.g. due to the failure of the CSF 13b, the accuracy of calculating the estimated value dGiegr_cyl_LP_hat of the in-cylinder low-pressure inert gas flow rate is also lowered, and hence it is possible to ensure a higher calculation accuracy when the equation (136) is used. In short, the method of using the above equation (136) makes it possible to ensure higher robustness.

Further, in the engine 3, when an exhaust resistance downstream of the connecting portion of the exhaust passage 10 for connecting between the exhaust passage 10 and the low-pressure EGR passage 11a is small, PA≈Pex holds, so that in the computing equation using the exhaust pressure Pex according to the first embodiment, the atmospheric pressure PA may be used in place of the exhaust pressure Pex. In addition, also when the exhaust resistance downstream of the above connecting portion of the exhaust passage 10 is large, a correction value for correcting the exhaust resistance may be calculated by searching a map according to parameters, such as the engine speed NE, and using the atmospheric pressure PA corrected by the thus calculated correction value in place of the exhaust pressure Pex.

Furthermore, although the first embodiment is an example in which the two EGR control valves 11c and 12c are regarded as nozzles and the equations of the nozzles are used as models used for calculating the estimated values dGegr_LP_hat and dGegr_HP_hat of the low-pressure and high-pressure EGR gas flow rates, this is not limitative, but the two EGR control valves 11c and 12c may be regarded as orifices, and as models used for calculating the estimated values dGegr_LP_hat and dGegr_HP_hat of the respective low-pressure and high-pressure EGR gas flow rates, the equations of the orifices may be used.

Next, an EGR control apparatus 1A according to a second embodiment of the present invention will be described with reference to FIG. 29. The EGR control apparatus 1A according to the second embodiment is distinguished from the above-described EGR control apparatus 1 according to the first embodiment only in that it is provided with an inert gas-estimating section 160 shown in FIG. 29 in place of the above-described inert gas-estimating section 60, and in the other respects, the EGR control apparatus 1A according to the second embodiment has the same construction as the EGR control apparatus 1 according to the first embodiment. Therefore, the following description will be given mainly of the different points, while component elements of the EGR control apparatus 1A, identical to those of the EGR control apparatus 1, are designated by identical reference numerals, and detailed description thereof is omitted.

Figure 29:
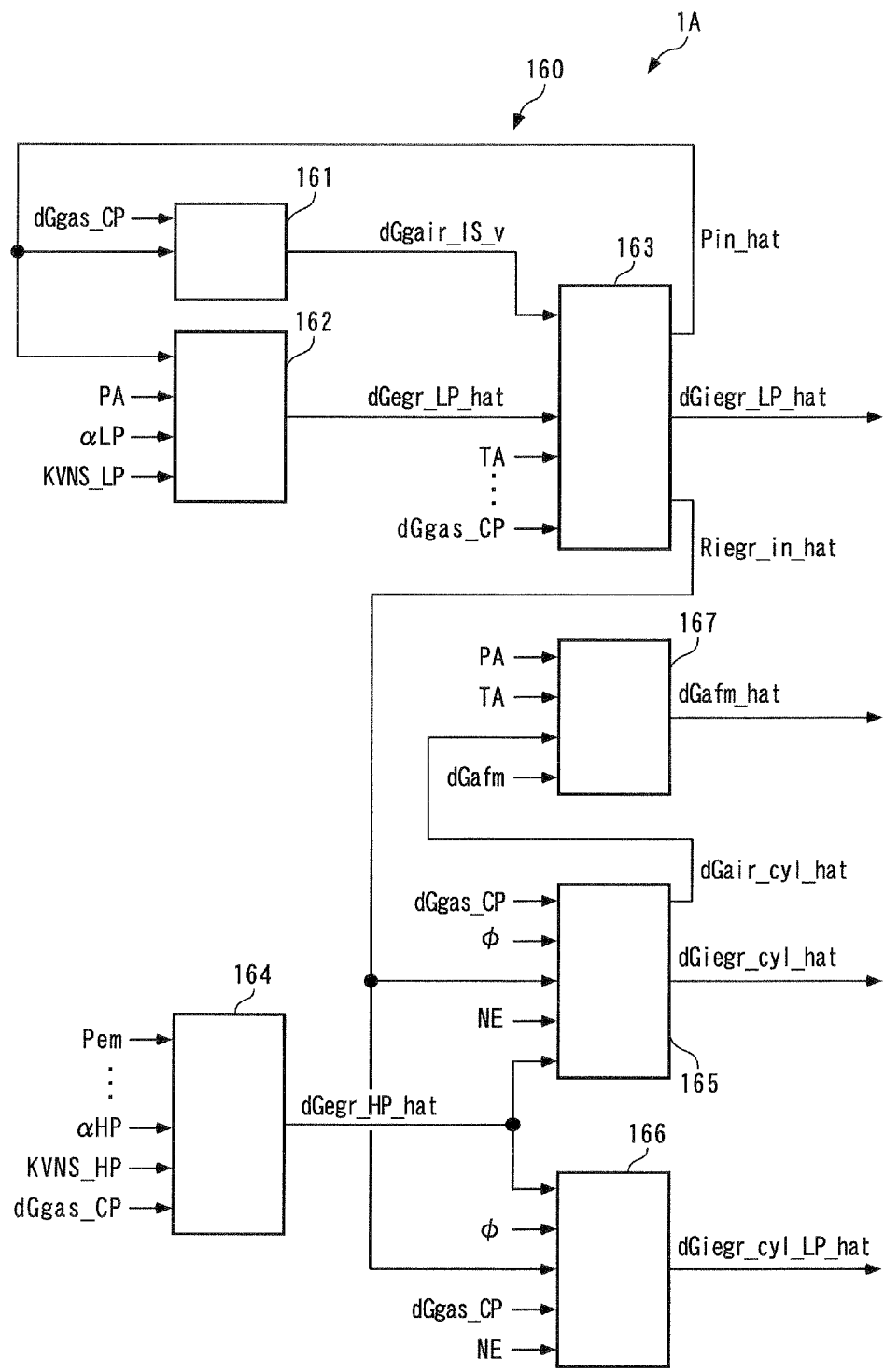
FIG. 29 is a block diagram of an inert gas-estimating section of an EGR control apparatus according to a second embodiment.

As shown in FIG. 29, the inert gas-estimating section 160 includes an imaginary intake pressure controller 161, a low-pressure EGR gas flow rate-estimating section 162, an intake upstream-side parameter-estimating section 163, a high-pressure EGR gas flow rate-estimating section 164, an in-cylinder gas flow rate-estimating section 165, an in-cylinder low-pressure inert gas flow rate-estimating section 166, and a fresh air flow rate-estimating section 167.

First, the imaginary intake pressure controller 161 calculates the imaginary demanded value dGair_IS_v of the IS passing fresh air flow rate by the same computing equations (50) to (52) as employed in the aforementioned imaginary intake pressure controller 61.

Figure 30:
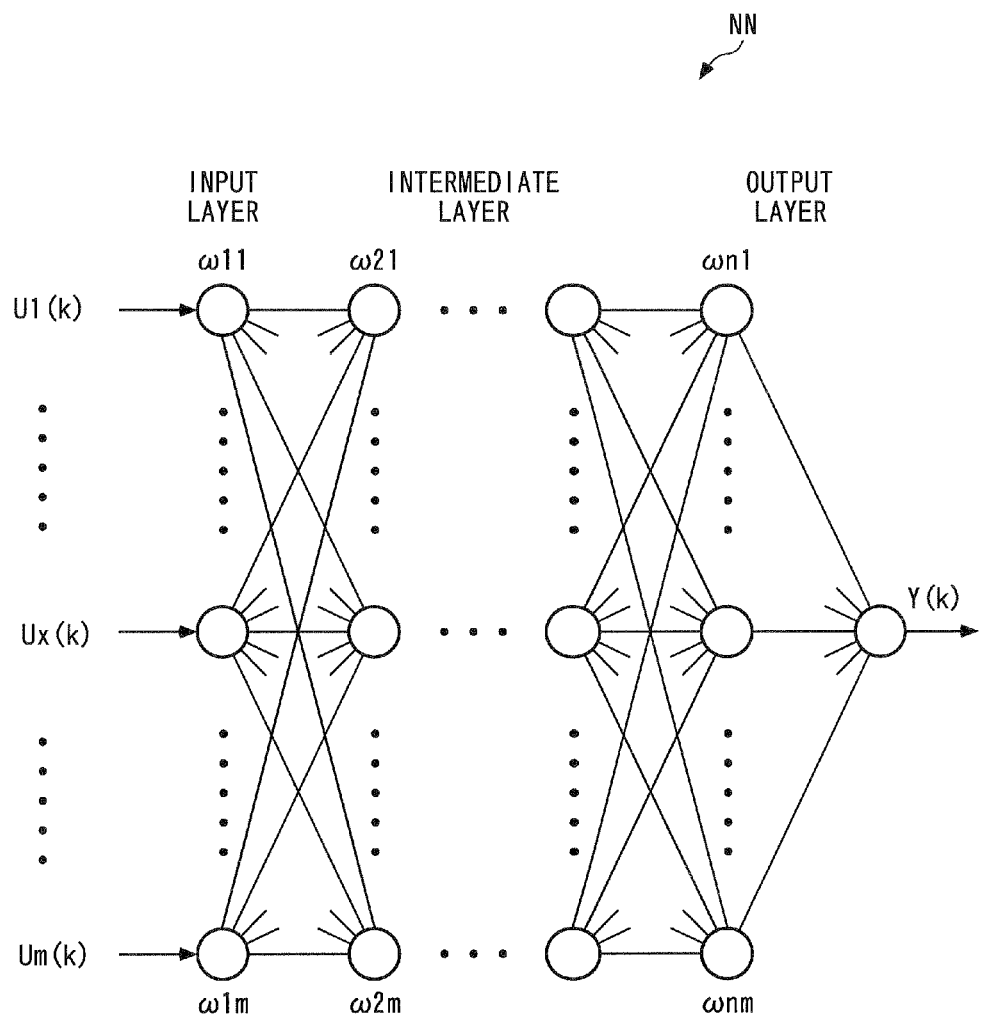
FIG. 30 is a schematic diagram of a hierarchical neural network used in the inert gas-estimating section of according to the second embodiment.

Further, the four estimating sections 162 and 164 to 166 calculate various types of estimated values using a neural network, as will be described hereinafter. As shown in FIG. 30, the neural network employed in the present embodiment is a hierarchical neural network NN which comprises an input layer, an intermediate layer, and an output layer. The input layer includes m (m is an integer not smaller than 2) neurons (only three of which are shown). The intermediate layer includes m×(n−1) (n is an integer not smaller than 2) neurons (only six of which are shown). The output layer includes m+1 neurons.

In the case of the hierarchical neural network NN, assuming that an input U is defined by the following equation (137), and j=1 to m, in the input layer, a value of V1j is calculated with an algorithm expressed by the following equations (138) to (140):

$$U(k) = [U1(k), U2(k), \ldots Um(k)]^T \tag{137}$$

$$T1j(k) = Uj(k) \tag{138}$$

$$V1j(k) = f(T1j(k)) \tag{139}$$

$$f(x) = \frac{1}{1 + e^{-\beta x}} + \varepsilon \tag{140}$$

In the above equation (139), f represents a sigmoid function, and is defined by the above equation (140). In the equation (140), β represents a slope gain of the sigmoid function, and ε represents an offset value of the sigmoid function. The slope gain β and the offset value E are determined with optimization algorithms, such as a genetic algorithm.

The value V1j calculated as above by the input layer is input to the intermediate layer. Then, the intermediate layer, assuming that i=2 to n, calculates a value Vij with an algorithm expressed by the following equations (141) and (142):

$$Tij(k) = \sum_{N=1}^{m} \omega i - 1N \cdot Vi - 1N(k) \tag{141}$$

$$Vij(k) = f(Tij(k)) \tag{142}$$

In the above equation (141), ω represents a weight factor, and is determined with a learning algorithm, such as an error propagation method, or an optimization algorithm, such as a genetic algorithm. The value Vij calculated as above by the intermediate layer is input to the output layer. Then, the output layer calculates an output Y with an algorithm expressed by the following equations (143) to (145):

$$Tnj(k) = \sum_{N=1}^{m} \omega nN \cdot VnN(k) \tag{143}$$

$$Y(k) = g(Tnj(k)) \tag{144}$$

$$g(x) = \frac{\alpha}{1 + e^{-\gamma x}} + \delta \tag{145}$$

In the above equation (144), g represents a sigmoid function, and is defined by the above equation (145). In the equation (145), α represents an output gain of the sigmoid function, γ represents a slope gain of the sigmoid function, and δ represents an offset value of the sigmoid function. The output gain α, the slope gain γ, and the offset value δ are determined with an optimization algorithm, such as a genetic algorithm.

Next, a description will be given of the above-mentioned low-pressure EGR gas flow rate-estimating section 162. The low-pressure EGR gas flow rate-estimating section 162 calculates the low-pressure EGR gas flow rate dGegr_LP using the same hierarchical neural network as described above with reference to FIG. 30. More specifically, assuming that an input to the hierarchical neural network is represented by Ua indicative of an input comprising four elements expressed by an equation (146) described hereinafter, the input layer calculates a value Va1j with an algorithm expressed by the following equations (147) to (149):

$$Ua(k) = [Ua1(k), Ua2(k), Ua3(k), Ua4(k)]^T \tag{146}$$
$$= [\text{Pin\_hat}(k), PA(k), Tex(k), \alpha LP(k)]^T$$

$$Ta1j(k) = Uaj(k) \tag{147}$$

$$Va1j(k) = fa(Ta1j(k)) \tag{148}$$

$$fa(x) = \frac{1}{1 + e^{-\beta a x}} + \varepsilon a \tag{149}$$

In the above equation (148), fa represents a sigmoid function defined by the above equation (149). In the equation (149), βa represents a slope gain of the sigmoid function, and εa represents an offset value of the sigmoid function. The values βa and εa are determined with optimization algorithms, such as a genetic algorithm, as described above.

The value Va1j calculated as above by the input layer is input to the intermediate layer. Then, the intermediate layer calculates a value Vaij with an algorithm expressed by the following equations (150) and (151)

$$Taij(k) = \sum_{N=1}^{4} \omega ai - 1N \cdot Vai - 1N(k) \quad (150)$$

$$Vaij(k) = fa(Tij(k)) \quad (151)$$

In the above equation (150), ωa represents a weight factor, and is determined with a learning algorithm, such as the error propagation method, or an optimization algorithm, such as a genetic algorithm. The value Vaij calculated as above by the intermediate layer is input to the output layer. Then, the output layer calculates an output Ya with an algorithm expressed by the following equations (152) to (154):

$$\text{Tan} j(k) = \sum_{N=1}^{4} \omega anN \cdot VanN(k) \quad (152)$$

$$Ya(k) = ga(\text{Tan} j(k)) \quad (153)$$

$$ga(x) = \frac{\alpha a}{1 + e^{-\gamma ax}} + \delta a \quad (154)$$

In the above equation (153), ga represents a sigmoid function defined by the above equation (154). In the equation (154), αa represents an output gain of the sigmoid function, γa represents a slope gain of the sigmoid function, and δa represents an offset value of the sigmoid function. The values αa, γa, and δa are determined with optimization algorithms, such as a genetic algorithm, as described above.

Then, finally, the estimated value dGegr_LP_hat of the low-pressure EGR gas flow rate is calculated by the following equation (155):

$$dGegr\_LP\_hat(k) = KVNS\_LP(k) \cdot Ya(k) \quad (155)$$

As shown in the above equation (155), the estimated value dGegr_LP_hat of the low-pressure EGR gas flow rate is calculated by modifying the output Ya of the hierarchical neural network using the low-pressure modification value KVNS_LP. This corresponds to calculating the estimated value dGegr_LP_hat of the low-pressure EGR gas flow rate using a model modified by the low-pressure modification value KVNS_LP.

When the weight factor ωa of the neural network, used by the low-pressure EGR gas flow rate-estimating section 162, is to be learned, the low-pressure modification value KVNS_LP is set to 1, and then the learning of the weight factor ωa is executed.

Next, a description will be given of the above-mentioned intake upstream-side parameter-estimating section 163. The intake upstream-side parameter-estimating section 163 calculates the estimated value Pin_hat of the intake pressure, the estimated value dGiegr_LP_hat of the low-pressure inert gas flow rate, and the estimated value Riegr_in_hat of the in-intermediate-passage inert gas ratio by the same computing equations (58) to (73) as employed in the intake upstream-side parameter-estimating section 63 according to the first embodiment.

Next, a description will be given of the aforementioned high-pressure EGR gas flow rate-estimating section 164. The high-pressure EGR gas flow rate-estimating section 164 calculates the estimated value dGegr_HP_hat of the high-pressure EGR gas flow rate using the same hierarchical neural network as described above with reference to FIG. 30. More specifically, assuming that an input to the hierarchical neural network is represented by Ub indicative of an input comprising six elements expressed by an equation (156) described hereinafter, the input layer calculates a value Vb1j with an algorithm expressed by the following equations (157) to (159):

$$Ub(k) = [Ub1(k), Ub2(k), Ub3(k), Ub4(k), Ub5(k), \quad (156)$$
$$Ub6(k)]^T$$
$$= [Pem(k), Tch(k), Tem(k), \alpha HP(k),$$
$$dGgas\_CP(k), NE(k)]^T$$

$$Tb1j(k) = Ubj(k) \quad (157)$$

$$Vb1j(k) = fb(Tb1j(k)) \quad (158)$$

$$fb(x) = \frac{1}{1 + e^{-\beta bx}} + \varepsilon b \quad (159)$$

In the above equation (158), fb represents a sigmoid function defined by the above equation (159). In the equation (159), βb represents a slope gain of the sigmoid function, and εb represents an offset value of the sigmoid function. The values βb and εb are determined with optimization algorithms, such as a genetic algorithm, as described above.

The value Vb1j calculated as above by the input layer is input to the intermediate layer. Then, the intermediate layer calculates a value Vbij with an algorithm expressed by the following equations (160) and (161):

$$Tbij(k) = \sum_{N=1}^{6} \omega bi - 1N \cdot Vbi - 1N(k) \quad (160)$$

$$Vbij(k) = fb(Tij(k)) \quad (161)$$

In the above equation (160), ωb represents a weight factor, and is determined with a learning algorithm, such as the error propagation method, or an optimization algorithm, such as a genetic algorithm. The value Vbij calculated as above by the intermediate layer is input to the output layer. Then, the output layer calculates an output Yb with an algorithm expressed by the following equations (162) to (164):

$$Tbnj(k) = \sum_{N=1}^{6} \omega bnN \cdot VbnN(k) \quad (162)$$

$$Yb(k) = gb(Tbnj(k)) \quad (163)$$

$$gb(x) = \frac{\alpha b}{1 + e^{-\gamma bx}} + \delta b \quad (164)$$

In the above equation (163), gb represents a sigmoid function defined by the above equation (164). In the equation (164), αb represents an output gain of the sigmoid function, γb represents a slope gain of the sigmoid function, and δb represents an offset value of the sigmoid function. The values αb, γb, and δb are determined with optimization algorithms, such as a genetic algorithm, as described above.

Then, finally, the estimated value dGegr_HP_hat of the high-pressure EGR gas flow rate is calculated by the following equation (165):

$$dGegr\_HP\_hat(k) = KVNS\_HP(k) \cdot Yb(k) \qquad (165)$$

As shown in the above equation (165), the estimated value dGegr_HP_hat of the high-pressure EGR gas flow rate is calculated by modifying the output Yb of the hierarchical neural network using the high-pressure modification value KVNS_HP. This is equivalent to calculation of the estimated value dGegr_HP_hat of the high-pressure EGR gas flow rate using a model modified by the high-pressure modification value KVNS_HP.

When the weight factor ωb of the neural network, used by the high-pressure EGR gas flow rate-estimating section 164, is to be learned, the high-pressure modification value KVNS_HP is set to 1, and the learning of the weight factor ωb is executed.

Next, a description will be given of the aforementioned in-cylinder gas flow rate-estimating section 165. The in-cylinder gas flow rate-estimating section 165 calculates an estimated value dGair_cyl_hat of an in-cylinder fresh air flow rate, and the estimated value dGiegr_cyl_hat of the in-cylinder inert gas total flow rate, using the same hierarchical neural network as described above with reference to FIG. 30. First, a method of calculating the estimated value dGair_cyl_hat of the in-cylinder fresh air flow rate will be described. In this case, assuming that an input to the hierarchical neural network is represented by Uc indicative of an input comprising five elements expressed by an equation (166) described hereinafter, the input layer calculates a value Vc1j with an algorithm expressed by the following equations (167) to (169):

$$Uc(k) = [Uc1(k), Uc2(k), Uc3(k), Uc4(k), Uc5(k)]^T \qquad (166)$$
$$= [dGegr\_HP\_hat(k), \phi(k), Riegr\_in\_hat(k),$$
$$dGgas\_CP(k), NE(k)]^T$$

$$Tc1j(k) = Ucj(k) \qquad (167)$$

$$Vc1j(k) = fc(Tc1j(k)) \qquad (168)$$

$$fc(x) = \frac{1}{1+e^{-\beta c x}} + \varepsilon c \qquad (169)$$

In the above equation (168), fc represents a sigmoid function defined by the above equation (169). In the equation (169), βc represents a slope gain of the sigmoid function, and εc represents an offset value of the sigmoid function. The values βc and εc are determined with optimization algorithms, such as a genetic algorithm, as described above.

The value Vc1j calculated as above by the input layer is input to the intermediate layer. Then, the intermediate layer calculates a value Vcij with an algorithm expressed by the following equations (170) and (171):

$$Tcij(k) = \sum_{N=1}^{5} \omega ci - 1N \cdot Vci - 1N(k) \qquad (170)$$

$$Vcij(k) = fc(Tij(k)) \qquad (171)$$

In the above equation (170), ωc represents a weight factor, and is determined with a learning algorithm, such as the error propagation method, or an optimization algorithm, such as a genetic algorithm. The value Vcij calculated as above by the intermediate layer is input to the output layer. Then, the output layer calculates an output Yc with an algorithm expressed by the following equations (172) to (174):

$$Tcnj(k) = \sum_{N=1}^{5} \omega cnN \cdot VcnN(k) \qquad (172)$$

$$Yc(k) = gc(Tcnj(k)) \qquad (173)$$

$$gc(x) = \frac{\alpha c}{1+e^{-\gamma c x}} + \delta c \qquad (174)$$

In the above equation (173), gc represents a sigmoid function defined by the above equation (174). In the equation (174), αc represents an output gain of the sigmoid function, γc represents a slope gain of the sigmoid function, and δc represents an offset value of the sigmoid function. The values αc, γc, and δc are determined with optimization algorithms, such as a genetic algorithm, as described above.

Then, finally, the estimated value dGair_cyl_hat of the in-cylinder fresh air flow rate is set to the output Yc of the hierarchical neural network, as expressed by the following equation (175):

$$dGair\_cyl\_hat(k) = Yc(k) \qquad (175)$$

Next, a description will be given of a method of calculating the estimated value dGiegr_cyl_hat of the in-cylinder inert gas total flow rate by the in-cylinder gas flow rate-estimating section 165. In this case, assuming that an input to the hierarchical neural network is represented by Ud indicative of an input comprising four elements expressed by an equation (176) described hereinafter, the input layer calculates a value Vd1j with an algorithm expressed by the following equations (177) to (179):

$$Ud(k) = [Ud1(k), Ud2(k), Ud3(k), Ud4(k)]^T \qquad (176)$$
$$= [dGegr\_HP\_hat(k), Riegr\_in\_hat(k),$$
$$dGgas\_CP(k), NE(k)]^T$$

$$Td1j(k) = Udj(k) \qquad (177)$$

$$Vd1j(k) = fd(Td1j(k)) \qquad (178)$$

$$fd(x) = \frac{1}{1+e^{-\beta d x}} + \varepsilon d \qquad (179)$$

In the above equation (178), fd represents a sigmoid function defined by the above equation (179). In the equation (179), βd represents a slope gain of the sigmoid function, and εd represents an offset value of the sigmoid function. The values βd and εd are determined with optimization algorithms, such as a genetic algorithm, as described above.

The value Vd1j calculated as above by the input layer is input to the intermediate layer. Then, the intermediate layer calculates a value Vdij with an algorithm expressed by the following equations (180) and (181):

$$Tdij(k) = \sum_{N=1}^{4} \omega di - 1N \cdot Vdi - 1N(k) \qquad (180)$$

$$Vdij(k) = fd(Tij(k)) \qquad (181)$$

In the above equation (180), ωd represents a weight factor, and is determined with a learning algorithm, such as the error propagation method, or an optimization algorithm, such as a genetic algorithm. The value Vdij calculated as above by the intermediate layer is input to the output layer. Then, the output layer calculates an output Yd with an algorithm expressed by the following equations (182) to (184):

$$Tdnj(k) = \sum_{N=1}^{4} \omega dnN \cdot VdnN(k) \tag{182}$$

$$Yd(k) = gd(Tdnj(k)) \tag{183}$$

$$gd(x) = \frac{\alpha d}{1 + e^{-\gamma dx}} + \delta d \tag{184}$$

In the above equation (183), gd represents a sigmoid function defined by the above equation (184). In the equation (184), αd represents an output gain of the sigmoid function, γd represents a slope gain of the sigmoid function, and δd represents an offset value of the sigmoid function. The values αd, γd, and δd are determined with optimization algorithms, such as a genetic algorithm, as described above.

Then, finally, the estimated value dGiegr_cyl_hat of the in-cylinder inert gas total flow rate is set to the output Yd of the hierarchical neural network, as expressed by the following equation (185):

$$dGiegr\_cyl\_hat(k) = Yd(k) \tag{185}$$

Next, a description will be given of the aforementioned in-cylinder low-pressure inert gas flow rate-estimating section 166. The in-cylinder low-pressure inert gas flow rate-estimating section 166 calculates the estimated value dGiegr_cyl_LP_hat of the in-cylinder low-pressure inert gas flow rate using the same hierarchical neural network as described above with reference to FIG. 30. More specifically, assuming that an input to the hierarchical neural network is represented by Ue indicative of an input comprising five elements expressed by an equation (186) described hereinafter, the input layer calculates a value Ve1j with an algorithm expressed by the following equations (187) to (189):

$$Ue(k) = [Ue1(k), Ue2(k), Ue3(k), Ue4(k), Ue5(k)]^T \tag{186}$$
$$= [dGegr\_HP\_hat(k), \phi(k), Riegr\_in\_hat(k),$$
$$dGgas\_CP(k), NE(k)]^T$$

$$Te1j(k) = Uej(k) \tag{187}$$

$$Ve1j(k) = fe(Te1j(k)) \tag{188}$$

$$fe(x) = \frac{1}{1 + e^{-\beta ex}} + \varepsilon e \tag{189}$$

In the above equation (188), fe represents a sigmoid function defined by the above equation (189). In the equation (189), βe represents a slope gain of the sigmoid function, and εe represents an offset value of the sigmoid function. The values βe and εe are determined with optimization algorithms, such as a genetic algorithm, as described above.

The value Ve1j calculated as above by the input layer is input to the intermediate layer. Then, the intermediate layer calculates 1 value Veij with an algorithm expressed by the following equations (190) and (191):

$$Teij(k) = \sum_{N=1}^{5} \omega ei - 1N \cdot Vei - 1N(k) \tag{190}$$

$$Veij(k) = fe(Tij(k)) \tag{191}$$

In the above equation (190), ωe represents a weight factor, and is determined with a learning algorithm, such as the error propagation method, or an optimization algorithm, such as a genetic algorithm. The value Veij calculated as above by the intermediate layer is input to the output layer. Then, the output layer calculates an output Ye with an algorithm expressed by the following equations (192) to (194):

$$Tenj(k) = \sum_{N=1}^{5} \omega enN \cdot VenN(k) \tag{192}$$

$$Ye(k) = ge(Tenj(k)) \tag{193}$$

$$ge(x) = \frac{\alpha e}{1 + e^{-\gamma ex}} + \delta e \tag{194}$$

In the above equation (193), ge represents a sigmoid function defined by the above equation (194). In the equation (194), αe represents an output gain of the sigmoid function, γe represents a slope gain of the sigmoid function, and δe represents an offset value of the sigmoid function. The values αe, γe, and δe are determined with optimization algorithms, such as a genetic algorithm, as described above.

Then, finally, the estimated value dGiegr_cyl_LP_hat of the in-cylinder low-pressure inert gas flow rate is set to the output Yc of the hierarchical neural network, as expressed by the following equation (195):

$$dGiegr\_cyl\_LP\_hat(k) = Ye(k) \tag{195}$$

On the other hand, the fresh air flow rate-estimating section 167 calculates the estimated value dGafm_hat of the fresh air flow rate by the following equations (196) to (200):

$$dVafm(k) = \frac{dGafm(k) \cdot R \cdot TA(k)}{PA(k)} \tag{196}$$

$$Wafm(k) = \frac{dVafm(k)}{Aafm} \tag{197}$$

$$dint\_temp(k) = \frac{Lafm + Lcp}{Wafm(k)} \tag{198}$$

$$dint(k) = \text{Round}\left(\frac{dint\_temp(k)}{\Delta T}\right) \tag{199}$$

$$dGafm\_hat(k) = dGair\_cyl\_hat(k - dint(k)) \tag{200}$$

In the above equation (196), the current value dGafm(k) of the fresh air flow rate may be replaced by the immediately preceding value dGafm_hat(k−1) of the estimated value of the fresh air flow rate.

Next, a description will be given of an EGR control process executed by the ECU 2 according to the second embodiment. The EGR control process according to the second embodiment is distinguished from the EGR control process described hereinabove with reference to FIG. 21 only in details of the estimated value calculation processes in the steps 10 and 20, and hence only an estimated value calculation process according to the present embodiment will be described with reference to FIG. 31.

Figure 31:
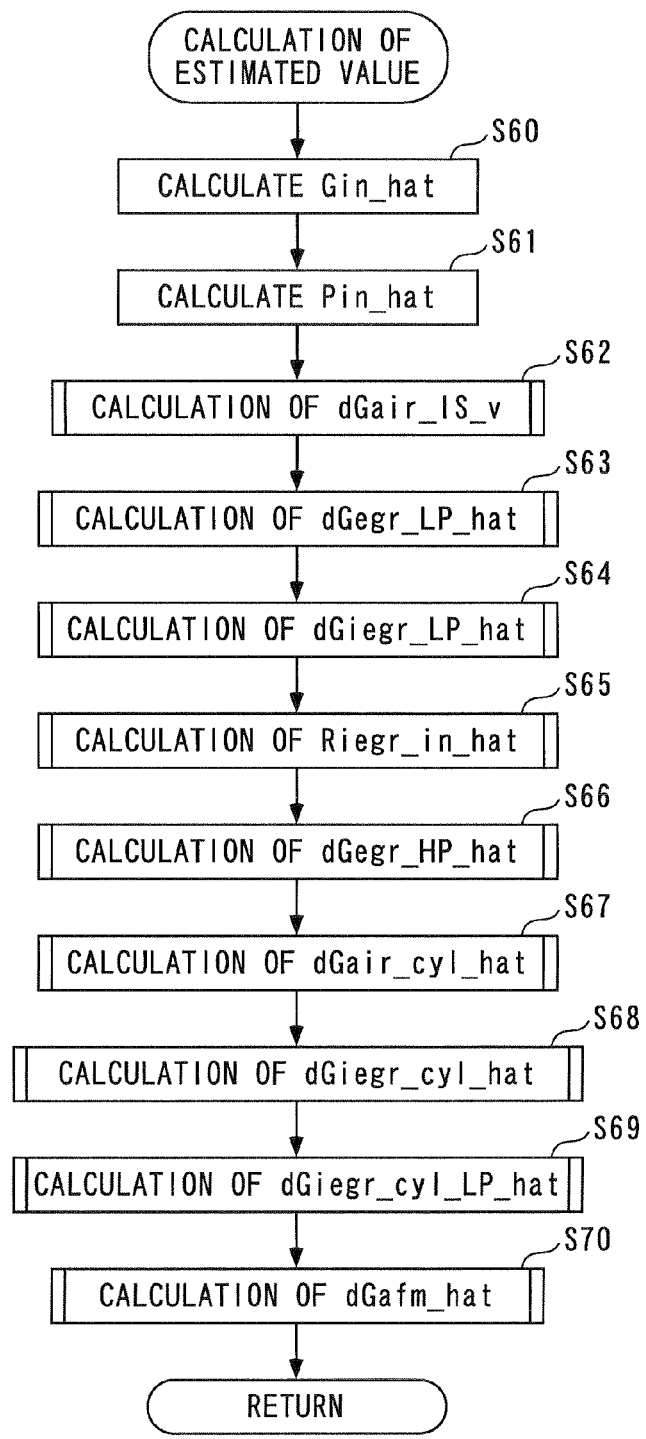
FIG. 31 is a flow chart of an estimated value calculation process according to the second embodiment.

As shown in FIG. 31, in this estimated value calculation process, first, in a step 60, the estimated value Gin_hat of the connecting portion total gas amount is calculated by the aforementioned equation (58). Then, the process proceeds to a step 61, wherein the estimated value Pin_hat of the intake pressure is calculated by the aforementioned equation (59).

Next, in a step 62, the imaginary demanded value dGair_IS v of the IS passing fresh air flow rate is calculated by the aforementioned equations (50) to (52). In a step 63 following the step 62, the estimated value dGegr_LP_hat of the low-pressure EGR gas flow rate is calculated by the aforementioned equations (146) to (155).

Subsequently, the process proceeds to a step 64, wherein the estimated value dGiegr_LP_hat of the low-pressure inert gas flow rate is calculated by the aforementioned equations (60) to (64). After that, in a step 65, the estimated value Riegr_in_hat of the in-intermediate-passage inert gas ratio is calculated by the aforementioned equations (65) and (66).

In a step 66 following the step 65, the estimated value dGegr_HP_hat of the high-pressure EGR gas flow rate is calculated by the aforementioned equations (156) to (165). Then, in a step 67, the estimated value dGair_cyl_hat of the in-cylinder fresh air flow rate is calculated by the aforementioned equations (166) to (175).

Next, in a step 68, the estimated value dGiegr_cyl_hat of the in-cylinder inert gas total flow rate is calculated by the aforementioned equations (176) to (185). Then, the process proceeds to a step 69, wherein the estimated value dGiegr_cyl_LP_hat of the in-cylinder low-pressure inert gas flow rate is calculated by the aforementioned equations (186) to (195).

Subsequently, the process proceeds to a step 70, wherein the estimated value dGafm_hat of the fresh air flow rate is calculated by the aforementioned equations (196) to (200), followed by terminating the present process.

According to the EGR control apparatus 1A of the second embodiment, configured as described above, it is possible to obtain the same advantageous effects as provided by the EGR control apparatus 1 of the first embodiment. Further, the inert gas-estimating section 160 according to the second embodiment calculates various estimated values by using physical equation models and neural network models in combination. In general, in the case of a controlled object with strong non-linearity, such as the EGR system or the intake and exhaust system of the engine, when the controlled object is about to be modeled by a modeling method using physical equations alone, it is difficult to properly represent the dynamic characteristics of the controlled object in a transient state. However, in the case of the modeling method using the physical equation models and the neural network models in combination, which is employed by the inert gas-estimating section 160 according to the second embodiment, it is possible to properly and easily represent such non-linear dynamic characteristics, whereby it is possible to calculate various estimated values while accurately compensating for the non-linearity of the controlled object. Particularly, since the high-pressure opening controller 90 uses the thus calculated estimated value dGiegr_cyl_LP_hat of the in-cylinder low-pressure inert gas flow rate for calculation of the target high-pressure opening a HP_cmd, it is possible to further improve the control accuracy of high-pressure EGR gas when the engine 3 is in a transient state, and as a consequence, it is possible to further improve the control accuracy of the EGR control.

Although in the second embodiment, the hierarchical neural network is employed as a neural network, by way of example, this is not limitative, but in the present invention, a mesh neural network, an RBF (radial basis function) neural network, a chaos neural network, a recurrent neutral network, and so forth may be used as the neural network.

Further, in the elements of the inputs Ub, Uc, Ud, and Ue shown in the respective equations (156), (166), (176), and (186), a value corresponding to the operation amount of the vane actuator 7d, i.e. the vane opening αtb may be used in place of the chamber gas flow rate dGgas_CP.

Further, also in the second embodiment, the error EVNS may be calculated by the aforementioned equation (131), and the low-pressure inert gas ratio RLP may be calculated by the aforementioned equation (136).

It is further understood by those skilled in the art that the foregoing are preferred embodiments of the invention, and that various changes and modifications may be made without departing from the spirit and scope thereof.

What is claimed is:

1. An EGR control apparatus for an internal combustion engine, in which a first EGR device supplies part of burned gases to cylinders as a first EGR gas via an intake passage, and a second EGR device supplies another part of the burned gases to cylinders as a second EGR gas via a path shorter than a path of the first EGR device, comprising:

engine speed-detecting means for detecting engine speed which is rotational speed of the engine;

load parameter-detecting means for detecting a load parameter representative of load on the engine; and EGR control means for controlling an amount of the first EGR gas and an amount of the second EGR gas via the first EGR device and the second EGR device, respectively, according to the detected engine speed and the detected load parameter, wherein said EGR control means controls the amount of the first EGR gas and the amount of the second EGR gas such that when a combination of the load represented by the load parameter and the engine speed is in a predetermined region, an in-cylinder first inert gas amount which is an amount of inert gas excluding oxygen in the first EGR gas supplied to the cylinders exceeds a second inert gas amount which is an amount of inert gas excluding oxygen in the second EGR gas supplied to the cylinders, and the in-cylinder first inert gas amount more exceeds the second inert gas amount as the engine speed is higher or the load represented by the load parameter is larger, wherein said EGR control means comprises:

first inert gas amount-calculating means for calculating a first inert gas amount which is an amount of inert gas excluding oxygen in the first EGR gas supplied to the intake passage;

in-cylinder inert gas total amount-calculating means for calculating an in-cylinder inert gas total amount which is a total amount of inert gases excluding oxygen in the first EGR gas and the second EGR gas supplied to the cylinders;

target value-calculating means for calculating a first target value which is a target of the first inert gas amount, and a second target value which is a target of the in-cylinder inert gas total amount, according to the engine speed and the load parameter;

first EGR control means for controlling the amount of the first EGR gas via the first EGR device, such that the calculated first inert gas amount converges to the calculated first target value; and second EGR control means for controlling the amount of the second EGR gas via the second EGR device, such that the calculated in-cylinder inert gas total amount converges to the calculated second target value, wherein said target value-calculating means calculates the first target value and the second target value such that when a combination of the load represented by the load parameter and the engine speed is in the predetermined region, the in-cylinder first inert gas amount exceeds the second inert gas amount, and the in-cylinder first inert gas amount more exceeds the second inert gas amount as the engine speed is higher or the load represented by the load parameter is larger.

2. An EGR control apparatus for an internal combustion engine, in which a first EGR device supplies part of burned gases to cylinders as a first EGR gas via an intake passage, and a second EGR device supplies another part of the burned gases to cylinders as a second EGR gas via a path shorter than a path of the first EGR device, comprising:

first EGR control input-calculating means for calculating a first EGR control input for controlling the first EGR device, using a predetermined first feedback control algorithm, such that a first difference which is a difference between a first inert gas amount that is an amount of inert gas excluding oxygen in the first EGR gas and a predetermined first target value converges to 0;

first EGR control means for controlling the first EGR device using the calculated first EGR control input;

second EGR control input-calculating means for calculating a second EGR control input for controlling the second EGR device, using a predetermined second feedback control algorithm, such that a second difference which is a difference between an in-cylinder inert gas total amount that is a total amount of inert gases excluding oxygen in the first EGR gas and the second EGR gas which are supplied to the cylinders and a predetermined second target value converges to 0;

second EGR control means for controlling the second EGR device using the calculated second EGR control input, first inert gas amount-calculating means for calculating the first inert gas amount;

in-cylinder inert gas total amount-calculating means for calculating the in-cylinder inert gas total amount; and target value-calculating means for calculating the first target value and the second target value;

wherein with the predetermined first feedback control algorithm and the predetermined second feedback control algorithm, a rate of convergence of the first difference to 0 and a rate of convergence of the second difference to 0 are set such that the rate of convergence of the second difference to 0 is higher than the rate of convergence of the first difference to 0, wherein said first EGR control input-calculating means calculates the first EGR control input, using the predetermined first feedback control algorithm, such that the first difference which is a difference between the calculated first inert gas amount and the calculated first target value converges to 0, and wherein said second EGR control input-calculating means calculates the second EGR control input, using the predetermined second feedback control algorithm, such that the second difference which is a difference between the calculated in-cylinder inert gas total amount and the calculated second target value converges to 0.

3. The EGR control apparatus as claimed in claim 2, wherein the predetermined first feedback control algorithm and the predetermined second feedback control algorithm are predetermined response-designating control algorithms.

4. The EGR control apparatus as claimed in claim 2, wherein the predetermined first feedback control algorithm and the predetermined second feedback control algorithm are predetermined response-designating control algorithms.

* * * * *